US006373584B1

(12) United States Patent
Barney et al.

(10) Patent No.: US 6,373,584 B1
(45) Date of Patent: Apr. 16, 2002

(54) SYSTEM FOR CONTROLLING PRINTING PRESS AND ACCESSORIES AND AUXILIARIES THEREFOR

(75) Inventors: Alan F. Barney, Bethel; Arnold M. Heitmann, Fairfield; Jeffrey D. Kotecki, Newtown; Peter J. Hubbard, Norwalk, all of CT (US)

(73) Assignee: Baldwin Graphic Products, Shelton, CT (US)

( * ) Notice: Subject to any disclaimer, the term of this patent is extended or adjusted under 35 U.S.C. 154(b) by 0 days.

(21) Appl. No.: 08/823,625

(22) Filed: Mar. 25, 1997

Related U.S. Application Data

(63) Continuation of application No. 08/144,819, filed on Oct. 28, 1993, which is a continuation-in-part of application No. 08/128,896, filed on Sep. 29, 1993, now abandoned.

(51) Int. Cl.[7] .................................................. G06K 15/00
(52) U.S. Cl. .......................................... 358/1.15; 355/85
(58) Field of Search ........................... 358/1.1, 1.5, 1.9, 358/1.12, 1.13, 1.14, 1.15, 1.17; 355/22, 32, 85, 86, 88, 89

(56) References Cited

U.S. PATENT DOCUMENTS

| | | | | | |
|---|---|---|---|---|---|
| 3,930,447 | A | | 1/1976 | Murray | 101/365 |
| 4,318,176 | A | | 3/1982 | Stratton et al. | 364/469 |
| 4,346,446 | A | | 8/1982 | Erbstein et al. | 364/551 |
| 4,366,542 | A | | 12/1982 | Anselrode | 364/469 |
| 4,495,582 | A | | 1/1985 | Dessert et al. | 364/469 |
| 4,639,881 | A | | 1/1987 | Zingher | 364/521 |
| 4,655,135 | A | | 4/1987 | Brovman | 101/426 |
| 4,656,941 | A | | 4/1987 | Brovman | 101/426 |
| 4,665,824 | A | | 5/1987 | Greiner et al. | 101/426 |
| 4,792,910 | A | | 12/1988 | Lange | 364/519 |
| 4,847,775 | A | | 7/1989 | Roch et al. | 364/469 |
| 5,010,820 | A | | 4/1991 | Löffler | 101/484 |
| 5,029,526 | A | | 7/1991 | Kipphan et al. | 101/350 |
| 5,029,527 | A | | 7/1991 | Jeschke et al. | 101/365 |
| 5,079,738 | A | | 1/1992 | Bockenfeld | 395/800 |
| 5,091,859 | A | | 2/1992 | Zingher et al. | 364/471 |
| 5,101,474 | A | | 3/1992 | Schlegal et al. | 395/114 |
| 5,146,548 | A | * | 9/1992 | Bijhagte | 345/117 |
| 5,170,711 | A | | 12/1992 | Maier et al. | 101/365 |
| 5,241,483 | A | * | 8/1993 | Povret et al. | 364/469 |
| 5,287,007 | A | | 2/1994 | Rodi et al. | 307/38 |
| 5,305,055 | A | * | 4/1994 | Ebner et al. | 355/200 |
| 5,363,446 | A | * | 11/1994 | Ruppertz et al. | 380/4 |
| 5,365,847 | A | * | 11/1994 | Pers | 101/248 |

FOREIGN PATENT DOCUMENTS

| | | |
|---|---|---|
| EP | 0160167 | 11/1985 |
| EP | 0375958 | 7/1990 |
| EP | 0419811 | 4/1991 |
| FR | 2673396 | 9/1992 |
| GB | 2188171 | 9/1987 |
| GB | 2254448 | 10/1992 |

* cited by examiner

*Primary Examiner*—Gabriel Garcia
(74) *Attorney, Agent, or Firm*—Morgan & Finnegan, LLP

(57) ABSTRACT

A system for producing a finished printed product exhibiting print specific conditions by automatically translating print or job specific conditions to an appropriate set of machine specific functions associated with printing press machines and auxiliaries so as to manipulate and obtain a final desired set of print specific conditions. The system includes software control means for controlling the printing press machines and auxiliaries, and an input device allowing a pressman to enter print specific data into the system.

20 Claims, 30 Drawing Sheets

CHAR RECEIVE
240
INT
GET CHAR
UART OE, FE, MF ERROR ?
YES
NO
STORE CHAR IN BUFFER
ADJUST BUFFER PNTR IDX
START INTER CHAR TIMER
SET FLAG INTER CHAR TIMER RUNNING
TOKEN AT THIS STATION ?
YES
NO
241
RCVD 1ST CHAR ?
YES
NO
BROAD CAST?
YES
NO
SEARCH DEST ADDR TABLE

FIG.20D—1
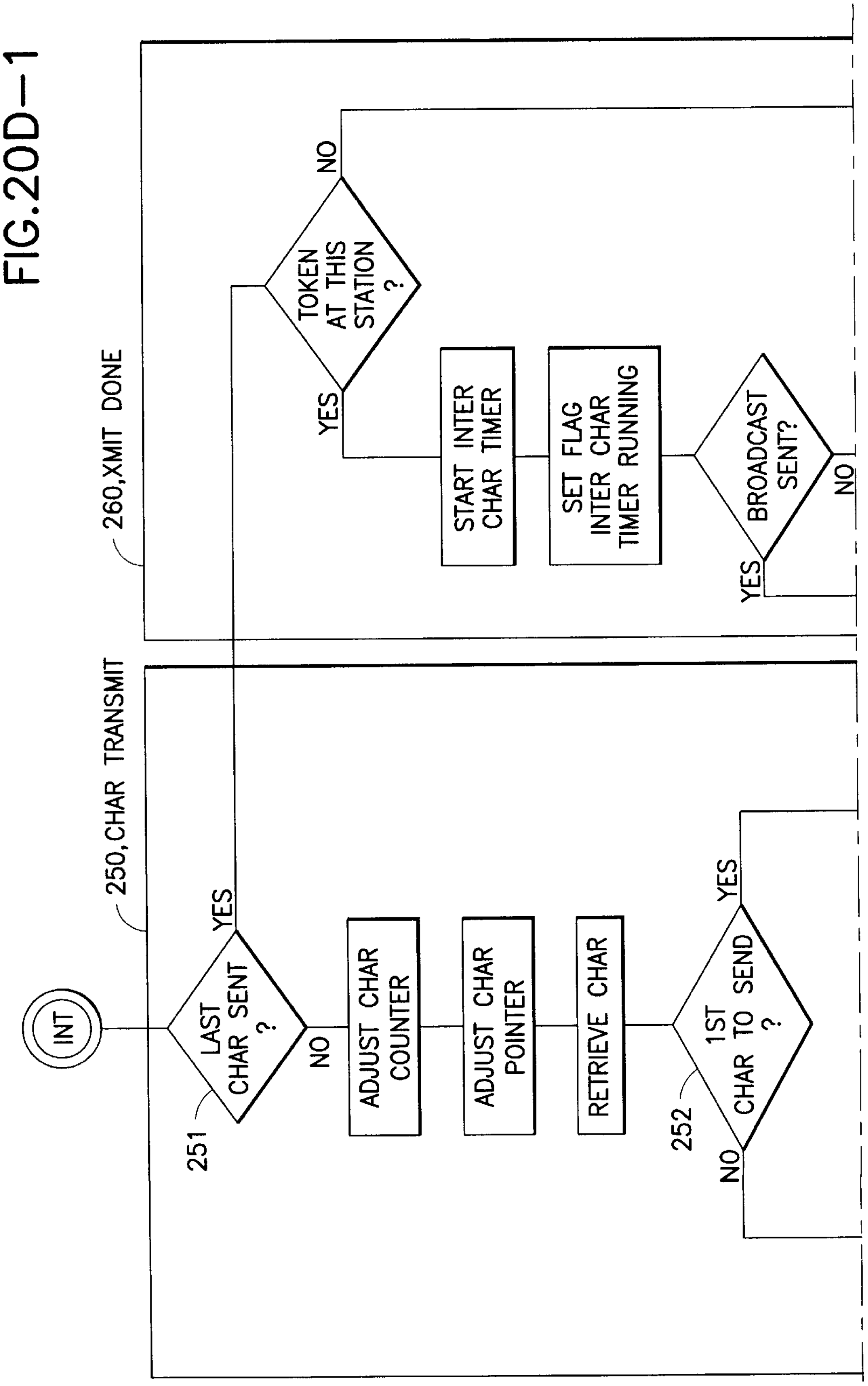

NOTES:

DEFINITION: 'TRAFFIC' IS ONE OR MORE 'MESSAGE'S REQUIRED TO BE HANDLED WHILE A CHANNEL IS OPEN.

TRAFFIC #1 IS COMPOSED OF THE MESSAGE OR MESSAGES THAT WILL BE HANDLED IF THE CHANNEL FUNCTIONS NORMALLY.

TRAFFIC #2, #3, ETC., ARE THE MESSAGE OR MESSAGES TO BE HANDLED IN THE CASE OF A CHANNEL MALFUNCTION. THEY ARE ALWAYS POSITIONED IN THE ARRAY IN THE SAME ORDER.

DEFINITION: 'MESSAGE' IS A SET OF CHARACTERS ARRANGED IN A SPECIFIC ORDER, COMPOSED OF 2 TYPES-OVERHEAD AND DATA.

220

OVERHEAD CHARACTERS ARE:
#1-DESTINATION ADDRESS
#2-ORIGIN ADDRESS
#3-MESSAGE TYPE CODE
#4-DATA FIELD SIZE

DATA FIELD

#N-SUM 0 CHECK SUM

DATA FIELD CHARACTERS :

OVERHEAD CHARACTERS: #1-#4

#5-DATA CHARACTER 1
#6-DATA CHARACTER 2
#7-DATA CHARACTER 3
⋮
#ON-20-DATA CHARACTER (N-2)

OVERHEAD CHARACTERS: #N

FIG.21E

DEFINITION: 'CHARACTER' IS A 9-BIT REPRESENTATION USED AS A MESSAGE ELEMENT. THE 9TH BIT IS USED TO MARK THE FIRST CHARACTER IN A MESSAGE.

DESTINATION ADDRESS-CHANNEL FAR END LOGICAL (NOT PHYSICAL) ADDRESS IN 6-BIT NOTATION. MEMORY SOURCE IS EEPROM STORED OPTION.

ORIGIN ADDRESS-CHANNEL NEAR END LOGICAL (NOT PHYSICAL) ADDRESS IN 6-BIT NOTATION. MEMORY SOURCE IS EEPROM STORED OPTION.

NOTE:
6-BIT NOTATION, THE 2 MOST SIGNIFICANT BITS I.D. THE PHYSICAL RING AND THE 4 LEAST SIGNIFICANT BITS I.D. THE PHYSICAL RING ADDRESS.

MESSAGE TYPE CODE-COMPOSITION AND ACTION/ RESPONSE I.D. MEMORY SOURCE IS EEPROM STORED OPTION OR CONSTANT IN PROM.

DATA FIELD SIZE-NUMBER OF CHARACTERS IN THE DATA FIELD, MAY BE 0 TO 35
MEMORY SOURCE IS A VARIABLE IN RAM.

DATA FIELD (IF USED)- ACTUAL INFORMATION BEING TRANSFERRED.
MEMORY SOURCE IS A FILE OR ARRAY IN RAM.

SUM 0 CHECK SUM-2'S COMPLEMENT OF THE ARITHMETIC SUM OF ALL THE PRECEDING CHARACTERS (9TH BIT NOT INCLUDED)

SYSTEM FOR CONTROLLING PRINTING PRESS AND ACCESSORIES AND AUXILIARIES THEREFOR

CROSS REFERENCE TO RELATED APPLICATIONS

This is a continuation of application Ser. No. 08/144,819, filled Oct. 28, 1993, which is a continuation-in-part of Applicants' parent application Ser. No. 08/128,896, filed Sep. 29, 1993 now abandoned.

FIELD OF THE INVENTION

This invention generally relates to a system for operating, monitoring and controlling a plurality of elements, such as printing press machinery and associated accessories and auxiliaries. More particularly, the invention relates to a unified system for operating, monitoring, and controlling a plurality of elements, such as printing press machinery and associated auxiliaries and accessories with a central control element which eliminates the redundancy of controls normally associated with each individual printing press machine, accessory or auxiliary, and which produces a desired set of printing conditions characteristic of a finished printed product by automatically relating particular printing job requirements associated with the finished printed product to the appropriate machine language functions of the associated printing press machinery and accessories and/or auxiliaries.

BACKGROUND

The production of final, finished printed products employing conventional offset lithography is oftentimes a complicated task. An offset printing production line generally includes a multitude of printing presses and accessories and/or auxiliaries, all of which must be simultaneously controlled and monitored as a necessary part of obtaining a finished printed product.

Referring to FIG. 13, a typical offset printing production line 130 may include one or more of the following systems: sheet cleaner systems 131; systems 132 for cleaning the impression cylinders and blanket cylinders of printing presses, such as the Automatic Blanket Cleaner ("ABC") produced and sold by Baldwin Technology Company of Stamford, Connecticut; a plurality of printing press units 133 corresponding to a number of ink colors necessary to produce a final printed product; dryer units 136 to dry the various sheets, including but not limited to infrared and/or ultraviolet systems; various ink and solvent supply and circulator systems 137; print temperature management systems 138; and the like.

In prior practice, each of the various systems (hereinafter generally referred to as printing press machinery and accessories and/or auxiliaries) often included separate, individual "control" or "user" stations, each of which had to be individually programmed and controlled by a pressman who was operating the printing line. This, oftentimes, led to undue clutter and confusion in the press operating environment, owing to the extraordinary number of separate control systems. Moreover, each individual control system typically operated with its own unique "machine" language due in part both to the varied number of manufacturers of printing press auxiliaries and accessories, and to the lack of universal machine operating languages. Furthermore, as the pressman's continuous monitoring of the multiple "machine language" control systems was both constant and necessary to achieve a finished printed product having a desired quality level, the quality of the finished product was often dependent both on the skill and experience of the press operator and his familiarity with the printing conditions and/or accessories necessary to produce such finished product.

Another related concern is that the production of the finalized printed product be characterized by a plurality of "printing", "press" or "job" conditions specific to the printing job sought to be implemented by the pressman. These "press" or "job" specific conditions must then somehow be translated by the press operator to "machine specific" functions of the printing accessories that are provided to carry out those "printing" conditions.

For example, the production of a finished work, such as a printed poster, entails the selection of numerous tasks and/or attributes which can be characterized as "printing" or "job" specific. These attributes might include, for example: the type of ink which will be used and the characteristics thereof (such as the degree of ink tack or the degree of ink coverage); the type of paper which the poster will be printed on and the attributes thereof (such as whether coated or non-coated stock will be used, the weight of the stock, whether the paper is virgin or recycled, and similar attributes); and whether any type of coating will be applied to the poster and, if so, whether the coating will be water based or solvent based, as well as the degree of the coverage of that coating as applied to the product (heavy, medium, or light).

After a press operator has discerned, or otherwise determined, the "printing" or "job" specific conditions associated with a particular printing job, he would then have to "translate" those "job" specific conditions to "machine specific" functions by programming the individual control systems associated with the press, accessories and/or auxiliaries to obtain those print conditions. This would, of course, typically entail the pressman's "interpretation" of the "job specific" or "press language" conditions to translate those conditions to "machine specific" functions appropriate for each press, accessory and/or auxiliary necessary to carry out the printing condition. In short, the pressman would have to manually set each of the press components, accessories and/or auxiliaries, based in part on his given and specific experience or knowledge of the accessories and the printing process in general, to achieve the "job specific" goals.

Thus, for example, a pressman would have to manually program or otherwise set each of the individual presses, accessories and/or auxiliaries to perform associated tasks to the given degree necessary and in an appropriate correlation to achieve individual printing characteristics. For a typical press apparatus or accessory or auxiliary (for example, the "Automatic Blanket Cleaner" mounted to an offset printing unit), the programmer would program the controls in order to, for example, advance the cleaning cloth a certain incremental amount according to a certain frequency of printing and/or operating speed of the press; to release a given amount of cleaning fluid (e.g., number of sprays) and discern a proper mix of cleaning fluid (e.g., ratios of solvent and/or water thereof); all in order to accomplish a particular set of printing job requirements. This is not only tedious and laborious, but requires a tremendous amount of skill and experience on the part of the pressman, who more than likely will have become proficient in his/her "translation" through numerous and various job runs, on the particular presses, accessories and/or auxiliaries with which he is familiar.

As will be evident, there is a great potential for error and material wastage on the part of the pressman who may not yet have achieved a sufficient level of experience to operate a given press system to achieve a desired, finished printed product. Such errors and material wastage would be amplified, of course, when different presses, auxiliaries and/or accessories are encountered by the pressman, and with which he is not yet familiar.

A variety of technological developments are known for controlling printing presses. For example, U.S. Pat. No. 4,847,775 (Roch et al.) for "METHOD AND DEVICE FOR CONTROLLING THE SETTING OF THE COMPONENTS OF A PRINTING AND CUTTING MACHINE" is directed to controlling the discrete functions for the exact press, although the reference is silent with respect to controlling the print specific conditions themselves via control of the printing press auxiliaries and/or accessories necessary to achieve a finished printed product. Similarly, U.S. Pat. No. 4,639,881 (Zingher) for a "DATA INPUT UNIT AND METHOD FOR PRINTING MACHINES" is directed to control of printing machine parameters themselves without addressing the need to control printing condition parameters necessary to obtain a final printed product. Still further, EPO Patent Application 0,160,167 (Stroupe) for a "METHOD AND APPARATUS FOR DISTRIBUTED ELECTRONIC CONTROL OF A PRINTING PRESS" is directed to controlling the operating conditions or aspects of the press itself without addressing the need to control the printing conditions necessary for a finished product through manipulation of the required auxiliaries and/or accessories.

There exists, therefore, a need for a system for monitoring and controlling a plurality of printing press machines, accessories and/or auxiliaries employed in producing a finished printed product, which not only eliminates the redundancy of control systems associated with the various press machinery accessories and/or auxiliaries and the logistical problems thereof, but which also controls printing conditions and rapidly and efficiently translates "press" or "job specific" requirements associated with a finished printed product to the appropriate "machine language" commands which will control each individual printing press auxiliary and/or accessory, thereby facilitating the job of the pressman and eliminating potential error or wastage of product to control a desired set of printing conditions.

Accordingly, a system is provided for controlling and monitoring a plurality of printing press machinery auxiliaries and/or accessories associated with producing a finished printed product to control a desired set of printing conditions.

Further, a centralized system is provided for monitoring and controlling a plurality of printing press machinery, accessories and/or auxiliaries to eliminate the redundancy of separate control systems associated with individual printing press machinery, accessories and/or auxiliaries, and which provides a centralized control of all of the printing press machinery, auxiliaries and/or accessories necessary to control a desired set of printing conditions to produce a finished printed product.

Further,a system is provided for controlling and monitoring a plurality of printing press machinery, accessories and/or auxiliaries, so that printing or job specific conditions associated with a finished printed product are automatically translated to appropriate machine language functions associated with each of the individual printing press machinery, accessories and/or auxiliaries, thereby eliminating the necessity for a pressman to manually interpret job specific conditions and translate the same to machine specific language for the printing press accessories and/or auxiliaries which might be encountered to produce the finished printed product.

Additionally, a centralized system is provided for monitoring and controlling a plurality of printing press machinery accessories and/or auxiliaries which will eliminate the redundancy of the control systems currently existent with each and every printing press machinery, auxiliary and/or accessory associated with a finished printed product and which will automatically translate a given set of printing or job specific conditions as input by the printing press operator and conform the same to an appropriate set of machine specific commands to control the printing press machinery, auxiliaries and/or accessories and manipulate the same to carry out the desired printing conditions in a manner which is rapid and efficient.

The foregoing advantages of the invention are illustrative only and are not intended to be exhaustive or limitative of the advantages which can be realized by the invention. Thus, these and other advantages of the invention will be apparent from description of the invention set forth herein or can be learned from practicing the invention, both as embodied herein or as modified in view of any variations which may be apparent to those skilled in the art. Accordingly, the present invention resides in the novel parts, constructions, arrangements, combinations and improvements herein described and illustrated in the accompanying drawings.

SUMMARY OF THE INVENTION

In accordance with the invention, there is provided a novel system for controlling and monitoring a plurality of various printing press machinery, accessories and/or auxiliaries which are employed in producing a finished printed product.

Briefly described, the system includes means for controlling a plurality of printing press machinery, accessories and/or auxiliaries.

The system features novel software means comprising a database of catalogued information, including a historical database of various printing press or job specific conditions and a historical database of preset machine specific data which can be correlated to a given set of press or job specific data which is input to the system by the pressman and relayed to various printing press machinery, auxiliaries and/or accessories in order to produce a given finished printed product. A touch screen, or other suitable input means, is provided to interface with the control software. The CRT may display a "mock-up" of the printing press operation and line in order to facilitate entry of the desired printing conditions, including the conditions for the accessories and/or auxiliaries that comprise the printing press line in conjunction with the printing press machine or machinery.

In operation, a pressman enters, via the touch screen CRT, all of the specific printing conditions corresponding to a desired finished printed product. The software then compares the desired job specific printing data entered by the pressman to the preset historical database of varied printing conditions contained within the software. The historical database of printing conditions is itself matched to a corresponding set of machine specific conditions present in the historical database of preset machine specific data. Upon determining the appropriate machine specific conditions necessary for implementing the desired printing conditions, the system relays a set of instructions to each of the affected printing press machine or machines, accessories and/or auxiliaries and commands the same to operate at the desired printing conditions and, hence, the final finished printed product.

Advantageously, when confronted with a set of printing conditions and/or associated machine conditions not included within their respective historical databases, the system may "update" its historical databases so as to preserve system flexibility for future job runs. Moreover, the system may be configured in an "open architecture" format, enabling it to accept and translate press specific or job specific input from a variety of sources, rendering the system flexible and accommodating various printing press machinery, auxiliaries and/or accessories which do not operate under identical machine language conditions.

Finally, the software may also include the ability to report critical printing data, including the amount and quantity of material used during printing, the running times for each of the desired printing press machinery, accessories and/or auxiliaries involved, cost associated with the jobs, and other information, rendering the control system uniquely and advantageously flexible.

BRIEF DESCRIPTION OF THE DRAWINGS

The invention will now be described in detail by way of reference to the accompanying drawings, wherein.

DETAILED DESCRIPTION OF THE INVENTION

Brief Overview of Detailed Description

Figure 1:
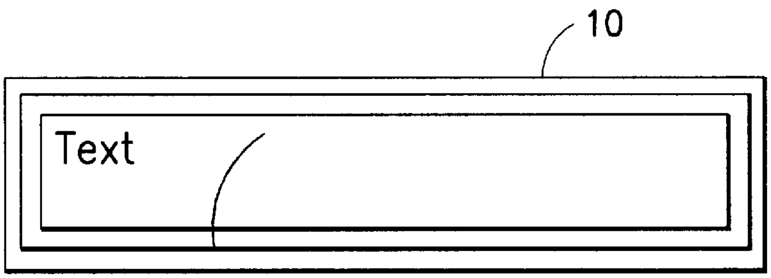
FIG. 1 depicts a text field for the screens.

A brief overview of the detailed description which follows will assist the reader to better understand the components forming the invention, as well as giving the reader an appreciation of the description to follow.

In general, the invention includes parameter translation software which examines press and job specific inputs, as well as auxiliary controller status inputs. The software then applies logical rules utilizing a historical database of information k, a current auxiliary configuration, a parameter translation table and any manual overrides. Through the parametric conversion matrix 195 the system determines programs and commands for the auxiliary specific command outputs necessary to adjust the accessories to achieve a desired set of print specific conclusions.

Press job specific inputs 191 are entered via an operator station touch screen. These inputs include such parameters as paper weight, paper width, ink type, percentage of ink coverage on the plate, and the like. The auxiliary controller status inputs 193 are gathered by the operator station via a communication link and include such indications as library of available programs 194, the current level of consummables (e.g. cloth, solvent, ink, etc.) and the state of safety interlocks on the individual press accessories.

The function of the control logic is to use the press specific inputs 191 and the library of available programs 194 to enter a multi-dimensional matrix 195. The inputs to the matrix 195 are used to find the best match of the available programs for a particular press auxiliary. The press specific inputs 191 are entered individually by the operator or are called up as a pre-determined group by job identification or number. The characteristics of the parameter translation matrix 195 (parametric conversion matrix) are derived from a collation of field experience on different press types using each type of auxiliary and are entered into the operator station permanent memory at the time of installation. A diagrammatic description of the parametric conversion matrix may be found in FIG. 19.

The contents of the parameter translation matrix 195 are occasionally altered as the experience base at a local printing site is updated. This alteration is derived from the operators' input indicating the success index of a last completed auxiliary operation. The indices are tracked and statistically analyzed over time by a statistical trend analyzer 196 to detect emerging trends. Trends are classified over long time periods and are keyed to ratios of utilization time for each auxiliary. The end result of this heuristic or self-learning process is the automatic modification of entries in the parameter translation matrix.

The result of applying the inputs 191 and available program library, entries 194 to the parameter translation matrix 195 is the generation of outputs 192 in format specific to the press accessories and auxiliaries 197, resulting in the desired set of printing conditions. This format may include two types of data.

| | |
|---|---|
| Commands | Stop, Start, Unit select, Mode, and the like; and |
| Programs | Padons, Fluid amounts, Fluid types, Sprays, Temperature set points, Ph set points, and the like necessary to control individual auxiliaries or accessories. |

The command outputs from the operator station are forwarded to the press auxiliary and accessory stations via the communication link to be described in full.

Turning now to the Drawings, in which like numerals depict like components, FIGS. 1–28 1 serve to assist in describing a preferred embodiment of the invention.

For ease of explanation, the invention may be described in conjunction with its various parts, as follows:

A. System Hardware

B. System Software i) Communication System ii) Control System

C. Screen Layouts

A. Description of System Hardware

The system is provided with a software control means (to be more fully described herein). In order to implement software control of the auxiliaries/accessories, a computer having the following hardware specifications and characteristics can be employed, although those skilled in the art will realize and readily discern that other hardware specifications and characteristics will prove suitable:

1) i486 DX2 66 MHz microprocessor;

2) 128 KB external memory cache;

3) 16 MB RAM memory;

4)

a) ISA bus with 6 slots;

b) VESA local bus with 2 slots or SVGA, ports, and IDE and floppy controllers integrated into a motherboard using the internal local bus;

5) 5 or more drive bays, with at least two 5.25" bays;

6) 2 serial ports, 1 parallel port, 1 joystick port;

7) IDE and floppy controller on local bus;

8) 300 MB or larger IDE disk drive;

10) SVGA accelerator with 1 MB video memory (capable of 1024×768 with 256 colors) on local bus 11) 14" or larger color monitor, 1024×768, 70 Mhz, non-interlaced with 0.28 or less dot pitch (to be better described for its touch screen capabilities);

12) 101 key keyboard;

13) Bus mouse (which includes interface card) or Mouse with its own port; and

14) A touchscreen monitor for inputting information, such as desired print specific conditions, into the system.

15) a CD-ROM player which can run off of the parallel port; or

16) One ruggedized joystick and possibly an interface card.

As just mentioned, the system includes software control means for controlling operation of the printing press machinery, auxiliaries and/or accessories. To facilitate use of the software means by the press operator (in a manner to be later described in greater detail), the software control means may include the following user-friendly characteristics and/or universal standards. Of course, one skilled in the art will realize that other user-friendly characteristics or standards can also be employed:

1) Microsoft Windows 3.1, Support—Windows 3.1. The software control means may contain Windows development libraries, GUI tools for building Windows resources, and a linker which can produce Windows executable commands, DLL's, and drivers;

2) Microsoft DOS 6.0 Support—In the event device drivers must be written to access peripherals; The linker should produce DOS executable commands;

3) C/C++ Language and Compiler—C and C++ are the languages most commonly used for both DOS and Windows development;

4) Windows C++ Class Library—Class Libraries aid the developer in using Windows objects;

5) Full set of development tools, such as editor, debugger, browser, trace, and project management facilities. "Borland C++ 3.1 & Application Frameworks" by Borland International meets the above criteria.

The system may also include, for example, means for inputting desired print specific conditions into the system. Such inputting means may include any suitable touch screen CRT as known to those skilled in the art, such as the Sound Acoustic Wave Touchscreen available from Elographics, Inc., the Viewsonic 5E, 14" SVGA, Model No. P284-UVA, with an E281-4025 PC-Bus Controller installed into the computer to facilitate operation of the screen.

Further useful touchscreen CRTs include, for example, the Goldstar 1460 Plus 14" SVGA CRT with integrated Touch Frame together with integrated Hardware-Based Controller, available from Carroll Touch in Round Rock, Tex.

B. Description of Software Control

In the broadest sense, the software control means includes the following three basic components:

1. A Communication Network System

2. A Control System

3. A Screen Layout System

For ease of explanation, each of the three "basic" components will be discussed, in detail, separately.

1. The Network System

The software control system includes a communication network system for transferring data from the control software to and between control equipment of the printing machinery, auxiliaries and/or accessories, and is either designed with or compatible with the control electronics and software of the system. The goal of the communication network is to insure reliable communications suited to the pressroom environment at low installation and maintenance cost and to further support operations for auxiliary controls and operator interfaces.

The communication system may support, for example, up to 56 stations representative of printing machines, accessories and/or auxiliaries. The system is configured into a plurality of "rings" ~1A, 1B. Each ring 1A, 1B may contain from 1 to 14 stations. For smaller auxiliary systems (14 stations or less), a single ring will suffice. For larger systems, multiple rings (2 to 4, supporting up to 28, 42 or 56 stations) may be joined through an intelligent hub 9 or arbiter (also referred to as a "ring manager" or concentrator).

An internal communication protocol is provided which is asynchronous and runs, for example, at 19200 baud (bits per second). Messages are composed of 9-bit characters (1 bit for identifying the last message frame and 8-bits for information) and consist of 2 functional parts—data and overhead. Data is the actual information being transferred from station-to-station. The overhead functional part provides routing, action and message integrity functions. When a conversion is performed to access through a channel external to the communication network, the protocol is similar; i.e., it is asynchronous, 300 to 19200 baud, and transmits 8-bit characters of information.

Advantageously, each ring may be self-configuring (i.e., it is automatically architected or logically "built") when "stations" are added or deleted from the printing press line, as during station power-up or power-down. The logical integrity of the ring may be automatically maintained during normal data transfers or by using special "keep alive" messages during idle message traffic periods. Contention for the use of a ring is resolved by allowing a station to transmit messages only when it possesses a special permissive "token" (hence the name "ring", short for "token ring"). Ownership of the token by a station is temporary. It is terminated by "passing" the token to the next active station at the next possible moment if no message is queued or at the completion of a single message transmission.

Advantageously, each ring may operate as a "standalone entity". This independent characteristic of the ring permits multiple (up to 4) rings to handle message traffic simultaneously. In multiple ring networks, the arbiter or hub appears to each ring as a 15th station. The hub is responsible for the proper routing of messages which transition from ring-to-ring.

Elements of Communication Network

The communication network according to the invention may be made up of three fundamental types of logical elements, including A) LINKS ~18, B) STATIONS 3, 5, 8, and C) a HUB 9 (for multiple ring networks only). The links 102 join stations 3, 5, 8 together through a hub 9 (when required). These elements will now be described in better detail, with reference hereafter made to FIG. 17 in conjunction with subsequent explanation.

A link 2 is comprised of 2 RS-422 channels. Although the communication network will function properly with only one channel, a second channel greatly enhances system reliability through redundancy; the inactive channel may be automatically selected when a station detecting the active channel is not functioning.

A station 3, 5, 8 is any piece of control equipment, such as a printing press, auxiliary and/or accessory, which includes an internal or external interface to the network link and whose logic (hardware and software) supports the network protocol, message structure and ring management features.

The communications system may be designed to accept three types of stations, typically dependent on the manufacturer of the station and whether such station can "communicate" with the communication system as configured, which includes:

a. Stations 3 whose network communication capability is integrated (physically and logically) with the control functions (hardware & software) associated with the particular control system being implemented. Examples include generic-based accessory or auxiliary control designs previously associated with such types of networks;

b. Stations 8 which do not have built-in communication capability and need to be adapted to the communications network through an external device. Examples include accessory or auxiliary control designs whose inputs and outputs are interfaced to the communications network using a translator means 8A; and c. Stations 5 which do have built-in communication capability, but with characteristics and protocol that do not match those of the communication network. For example, such stations might include PC's, Workstations, Laptop PC's with a serial communication port and modems using EIA RS-232 or 20 MA current loop interfaced to the communications network using a communication converter means 5A.

A hub 9, also known as a "ring arbiter," is a specific piece of equipment used to route communication network messages between communication rings. The hub may be physically modular and may support, for example, one communication network ring per module 12. Each module 12 provides a communication network link interface 13 and may optionally include a built-in communication converter or tap 14. A module 12 may be utilized in a "standalone" mode; in this capacity, it acts as a protocol converter (e.g. RS-422 to RS-232) rather than a part of the ring arbiter.

Physical Elements of the System

A variety of physical elements are used to satisfy the logic elements of the communication network system, such as the links 2, stations 3, 5, 8 and hubs 9. Not all physical or logical elements may be used in a particular communications application.

A. Communication System Links

The function of the links 2 is to join stations 3, 5, 8 and the hub 9 (if used) in a manner that insures reliable, noise free communications. Although the links 2 are described as joining individual stations 3, 5, 8, the wire connections are actually a "star" or "ring" (i.e., electrical continuity is integral through a ring). The physical link elements are connectors and cable which meet the electrical (not necessarily mechanical) characteristics of the EIA RS-422 and RS-232 standards.

1. Internal Link—All station 3, 5, 8 and hub 9 elements are joined using a link 102 which is comprised of 2 sets of shielded, twisted pair wires 2A, 2B whose electrical characteristics (capacitance, resistance, etc.) are consistent with the RS-422 EIA standard. The shielded, twisted pair may be supplied independently or as one cable. If conductors are no smaller than 18 AWG and the conductor-to-conductor/conductor-to-shield capacitance is no greater than 15 picofarads/foot, link lengths of 500 feet maximum are supported at the 19200 baud data transmission rate utilized by the communication network according to the invention.
2. External Link—While not actually part of the system, external links are used to join stations accessed through a standard serial port (PC's, modems, etc.). The communication system elements perform protocol conversion, to provide connection of these stations to the internal type of link. This type of link is provided using commonly available cable meeting EIA RS-232 standards. These links are run at varying data transmission rates which should not exceed 19200 baud. The length of these links should be no greater than 15 feet. If low capacitance type cable is selected, these links will support up to 50 feet.
3. Internal Link Connections—Connections to internal links can be made in the following ways:
   a. Terminal Blocks—Some stations and the hub may use, for example, 6 position, 2-piece terminal blocks. The pairs for each channel use 2 positions, terminal 1 and 2 for channel A and terminal 5 & 6 for channel B. Terminals 3 and 4 are ground and are used for shield connections.
   b. Connectors—Some stations using system generic designs may employ plastic, 9-pin receptacles made by AMP (CRC series connectors). These connectors also interface to a third, shielded, twisted wire pair which will carry unregulated DC power to stations which do not use independent power sources.
4. External Link Connections—External links support either EIA RS-232 or 20 milliampere current loop.
   a. Interface—External links are supported at the one end by the hub 9 or by standalone Communication Converters 14 (taps or protocol converters). The RS-232 interface is configured as a data terminal. It provides for transmit and receive data signals (TXD & RXD respectively), Data Terminal Ready (DTR), Request To Send (RTS) and Clear to Send (CTS). RS-232 signals are optional in a variety of ways using push-on jumpers. The Communication Converter 14 allows a choice of baud rates, number of stop bits and type of parity so as to more easily adapt to external devices. The 20 milliampere current loop interface is standard and is driven from a 10 to 12 VDC unregulated source. Connection to either option is made using 2-piece terminal blocks.

b. Station Device Interface—External links are supported at the using device end (PC's, modems, etc) by a variety of means which are not always predictable. The most common connection employed is the 9-pin "D-type" or 15-pin "D-type".

B. The Stations

The function of a station 3, 5, 8 is to provide the implementation point for operation of the controls for press auxiliaries and/or operator stations. Stations 2, 5, 8 are joined by links 2 which provide communication pathways for passage of command, status and parameter information. All stations 3, 5, 8 may provide a compatible interface with the communication system in one of 3 ways:

a. Full, built-in link interface providing for all electrical, logical and message capabilities including management of communication rings. This station type is found in most control designs.

b. Partial, built-in communication link interface providing only for message capabilities. This station type may be used with a Communication Converter 5A, 14 (tap or protocol converter) which provides the electrical and logical aspects of the interface including management of the ring. The Communications Converter 5A, 14 may be a standalone or may be incorporated as part of a hub 9. In either case, hardware and function are identical. If the standalone version is used, it requires a local source of 8–10 VAC, 60 Hz or 10–14 VDC and may occupy a space of approximately 2" high by 3" wide by 6" long.

c. No built-in link interface. This station type is used with a Translator 8A (or Translator Expander) to monitor inputs and activate outputs. The Translator 8A provides for all electrical, logical and message capabilities, including management of rings. The Translator requires a local source of 8–10 VAC, 60 Hz or 10–14 VDC and occupies a space approximately 2" high by 5" wide by 7" long and, if height must be opened, to approximately 4" high.

C. The Hub

The hub 9 is required if the system is designed to support more than one ring. The hub is used to route network messages between multiple rings. It is physically modular and supports one communication ring per module. Each module may provide a built-in Communication Converter 14. It may require a power source of 8–10 VAC, 60 Hz or 10–14 VDC and may occupy a space approximately 3" high by 6" wide by 12" long.

Description of Message Management Parameters

Certain message management parameters may be utilized to control the flow of information within communications system these parameters are contained in two maps—parameters and stations active. The parameter map is hard coded for each station utilizing an EEPROM or a hard disk drive. Each station 3, 5, 8 on a ring 1A, 1B is permitted to transmit messages to 6 other stations. The contents of each entry in the message parameter map are as follows:

DESTINATION RING—4 choices

DESTINATION ADDRESS—14 choices

MESSAGE TYPE NUMBER—256 choices

TRANSMISSION FREQUENCY—4 choices

In addition, the parameter map has entries for self-identification:

THIS STATION RING—4 choices

THIS STATION ADDRESS—14 choices

Certain PC based communications stations with a hard disk drive may utilize an expanded message parameter map which allows 55 stations plus the self-identification entry. The content of the PC type station map entries is identical to the normal station map. The active station map is dynamic and is kept in alterable memory. The map consists of 56 station active indicators organized as 4 rings of 14 stations each. It is automatically updated whenever a communication ring goes through its logical construction (i.e. the ring is 'built').

The message parameters determine the "what, when and where" for transmissions by each station. The key-in for queuing-up a message to send is the TRANSMISSION FREQUENCY. The choices for this parameter are somewhat application dependent, but for normal generic based products are as follows:

0.2 seconds—'real time'

2 seconds—frequent 1 minute—infrequent once only—at time of ring build.

Once the frequency timing indicates a message should be sent, the parameter is checked for a match. If the station active map indicates the station specified by the DESTINATION RING and DESTINATION ADDRESS exists, the MESSAGE TYPE NUMBER is loaded. The data required by that type (if any) is retrieved and loaded. The data count is calculated and loaded. Finally, the sum-zero checksum is calculated and loaded.

The flow of information within the communication system (exclusive of ring management exchanges) is generic in nature and is generally referred to as 'status' for a station. The content of status messages is governed by the application, but in general will conform to the following usage guidelines:

PC based communication stations with a hard disk drive utilize an expanded message parameter map which allows 55 stations with 8 message types per station plus the self-identification entry. The content of PC based map entries is identical to the normal message parameter map but adds station type and sub-type entries:

DESTINATION RING—4 choices

DESTINATION ADDRESS—14 choices

MESSAGE TYPE NUMBER—256 choices

TRANSMISSION FREQUENCY—4 choices

STATION TYPE IDENTITY—256 choices

STATION SUB-TYPE IDENTITY—256 choices

The active station map is dynamic and is kept in alterable memory. The map consists of 56 station active indicators organized as 4 rings 1A, 1B of 14 stations 3, 5, 8 each. It is automatically updated whenever a communications ring 1A, 1B goes through its logical construction (i.e. the ring is 'built'). Communicating, non-integrated stations 5 (e.g. PC's or laptops with a standard serial port) do not have direct access to the active map. For these stations, the map is passed whenever the supporting Communication Converter 5A, 14 (Tap) receives an "ARE YOU THERE?" message type.

The following definitions are applicable to the Message Management Parameters:

| | |
|---|---|
| 'REAL TIME' | that information which can change within the normal action/response time of a human operator. This includes button pushes and related indications. |
| 'FREQUENT' | that information which does not require action/response but depends on the random chance the operator may sense it. This |

-continued

| | |
|---|---|
| | includes those events and conditions which are warnings (not alarms). For example; solvent tank low, cloth warnings, etc. |
| 'INFREQUENT' | that information which is not critical to timely operator response or which represents conditions which change very slowly. For example = circulator temperatures, solvent usages, etc. |
| 'ONCE ONLY' | that information which is fixed and not changeable by the operator. Examples are auxiliary system configuration (# units, chill roll present, etc.) and built in program tables. |

Status messages are 'one way' by nature, providing data from the source for use by the destination. All status messages which are received error free are responded to with an 'ACKNOWLEDGE'. The interpretation of status message content depends totally on the needs of the application. If an application determines a functional response is required, it indicates this in its regularly scheduled status message to the sender.

C. Ring Management

The function of the ring management is to provide for orderly usage of the communication system by all participating stations. Included in the tasks of ring management are administration of channel usage, activating and de-activating the ring, adding/dropping stations and monitoring channel integrity.

1. THE TOKEN—The orderly usage of a ring and the guarantee of fairly apportioned priority for ring usage is assured by the use of a permissive token. The specific definition of the token is message type 01H (see FIG. 16). Whenever a station 3, 5, 8 receives this message, it is automatically granted the right to transmit one of its queued messages. The token is passed (message 01H transmitted) to the next station 3, 5, 8 if no messages are queued or the transmission of one queued message has been completed. The token is passed in simple rotation, proceeding at each step to the next higher address on the ring that is identified in the station active map.

2. BUILDING THE RING—In order for communication to proceed most efficiently, only those stations 3, 5, 8 (addresses) physically connected to the ring 1A, 1B and functioning correctly should use the facility. This is accomplished by identifying stations 3, 5, 8 in the station active map. Every station 3, 5, 8 creates its own map during the process of a ring build and updates it if another station 3, 5, 8 is added or dropped. A ring build will occur only when a station is power-up or if a faulty channel or station is detected. The following describes the ring build process:

When a station 3, 5, 8 is powered-up, it first determines whether or not the ring is currently active by looking for activity on the channel. If the ring is not active, a delay is timed and the build process started. The delay is calculated as follows:

build delay time-8 seconds+(0.5 seconds×station address)

The use of the station address in the delay calculation will yield a different delay for each station 3, 5, 8. This prevents transmission collisions during the start of the ring build. The station on the ring with the lowest physical address (shortest calculated build delay) will seize control of the ring to start the build. The ring build proceeds as follows:

a. Initiating station issues a broadcast (i.e. address 0H or 0) of message type 03H—LOSE THE TOKEN. All real stations receiving this broadcast are forced to abandon any attempt to transmit a message or to build a ring, which would have occurred when their ring build delay timed out. Since the LOSE THE TOKEN message is a broadcast, no response is required from any station.

b. Once the LOSE THE TOKEN broadcast is completed, the initiating station issues an ARE YOU THERE? (message type 05H) to the address which is one higher than its own. If there is no ACKNOWLEDGE (message type 81H) within the maximum response time (0.2 seconds), the initiating station issues an ARE YOU THERE? to the address which is 2 higher than its own. As long as no ACKNOWLEDGE is received, the initiating station continues, incrementing address of the ARE YOU THERE? at each attempt. NOTE: while proceeding with the search for an active unit, if last ring address (0FH or 15) is encountered, the 'next higher' is rolled over to the first ring address (1H or 1).

c. If no ACKNOWLEDGE was received from any of the 14 attempts, the initiating station is the only one on the ring and the search continues 'ad infinitum'. When an ACKNOWLEDGE is received, the search is successful. The initiating station updates its station active map for the station responding and issues a broadcast (address 0H or 0) of NOTIFY ADD (message type 07H) indicating the station found in the search so all other stations may update their station active maps.

d. Once the NOTIFY ADD broadcast is completed, the initiating station issues a JOIN RING (message type 06H) to the station just found. When the ACKNOWLEDGE to the JOIN RING is received from the station just found, the initiating station issues a BUILD RING (message type 04H) to that station, thus passing the responsibility for continuing the station search.

e. The found station receives the BUILD RING, issues an ACKNOWLEDGE to the initiating station and continues the process as described in steps a–d. The process is completed when the original, initiating station receives and acknowledges a BUILD RING from the station immediately preceding it. At this point, the original, initiating station issues a PASS TOKEN (message type 01H) to the next higher address in the active station map, starting the normal communication interchanges.

The above description is complete for a single ring with no hub. If a hub 9 is found (i.e. an ARE YOU THERE? to the hub—address 0FH or 15—resulted in an ACKNOWLEDGE) and more than one ring a!, 1B connected to the hub 9 has been built, the HUB 9 issues a NOTIFY ADD broadcast to allow all station active maps on all rings to be updated.

3. ADDING A STATION—Once the ring has been built and is operating normally, periodic searches are performed to determine if any new stations have been added to the ring. This search occurs every 16th time the token is received by any currently active station and proceeds as follows:

a. Upon receiving its 16th successive PASS TOKEN, a station will first transmit any queued messages. The station active map is then examined to determine if there are any inactive addresses between itself and the next active station. If there is at least one, an ARE YOU THERE? is issued. If no ACKNOWLEDGE is received, the new station inquiry is complete, and the PASS TOKEN is issued to the next station in the station active map. NOTE: If more than one inactive address exists between this station and the next active station, they will be searched for, in rotation, one at a time upon receiving 16 successive PASS TOKENS.

b. If an ACKNOWLEDGE is received during the search of new stations, the current station updates its station active map for the station responding and issues a broadcast (address 0H or 0) of NOTIFY ADD indicating the station found in the search so all other stations may update their station active maps.

c. Once the NOTIFY ADD broadcast is completed, the current station issues a JOIN RING to the station just found. When the ACKNOWLEDGE to the JOIN RING is received, the search is complete and the current station issues the PASS TOKEN to the next address in its station active map—the new station, just found.

The above description applies to a single ring 1A with no hub 9. If a hub 9 exists and the new station search was successful, the hub 9 will issue a NOTIFY ADD broadcast to all other active rings 1A, 1B so their station active maps may be updated.

4. LOSING A STATION—Any time a station issues a PASS TOKEN or a BUILD RING to a station currently in its station active map and fails to receive the ACKNOWLEDGE from the station, it senses the lack of activity on the current channel of the communications link and swaps over to the other channel—see CHANNEL MANAGEMENT below. If after four tries, there is still no activity on either channel, it starts its ring build delay. If the ring still has no activity when the delay has been timed, it proceeds with seizing and re-building the ring—see BUILDING THE RING above.

5. CHANNEL MANAGEMENT—The communication system may employ redundant links to interconnect stations. When a station transmits, it does so on both channels of the redundant link. When it receives, however, it only listens to one of the two channels. Each station continuously monitors its enabled channel for activity. A channel is declared inactive if it is not receiving any characters for at least 66.7 milliseconds or if the characters contain errors (e.g. framing—no stop bit). The station waits for 467 millisecs and if the channel is still inactive, it switches to the other channel.

The station keeps tracks of the number of times it has swapped channels. If the swaps exceed 4, a state of no communication exists and the station starts its ring build delay. If there still is no activity when the delay has timed, it proceeds seizing and re-building the ring as described above.

A. Description of the Message Structure for the Communications System

A common message structure is used in the communications network in order to standardize software and hardware designs. It provides a fixed set of 'rules' to be used in design activities such as choice of UART, error checking, character composition and meaning, message building, etc. With few exceptions, the message structure is identical for both internal (ring based) and external applications.

Figure 16:
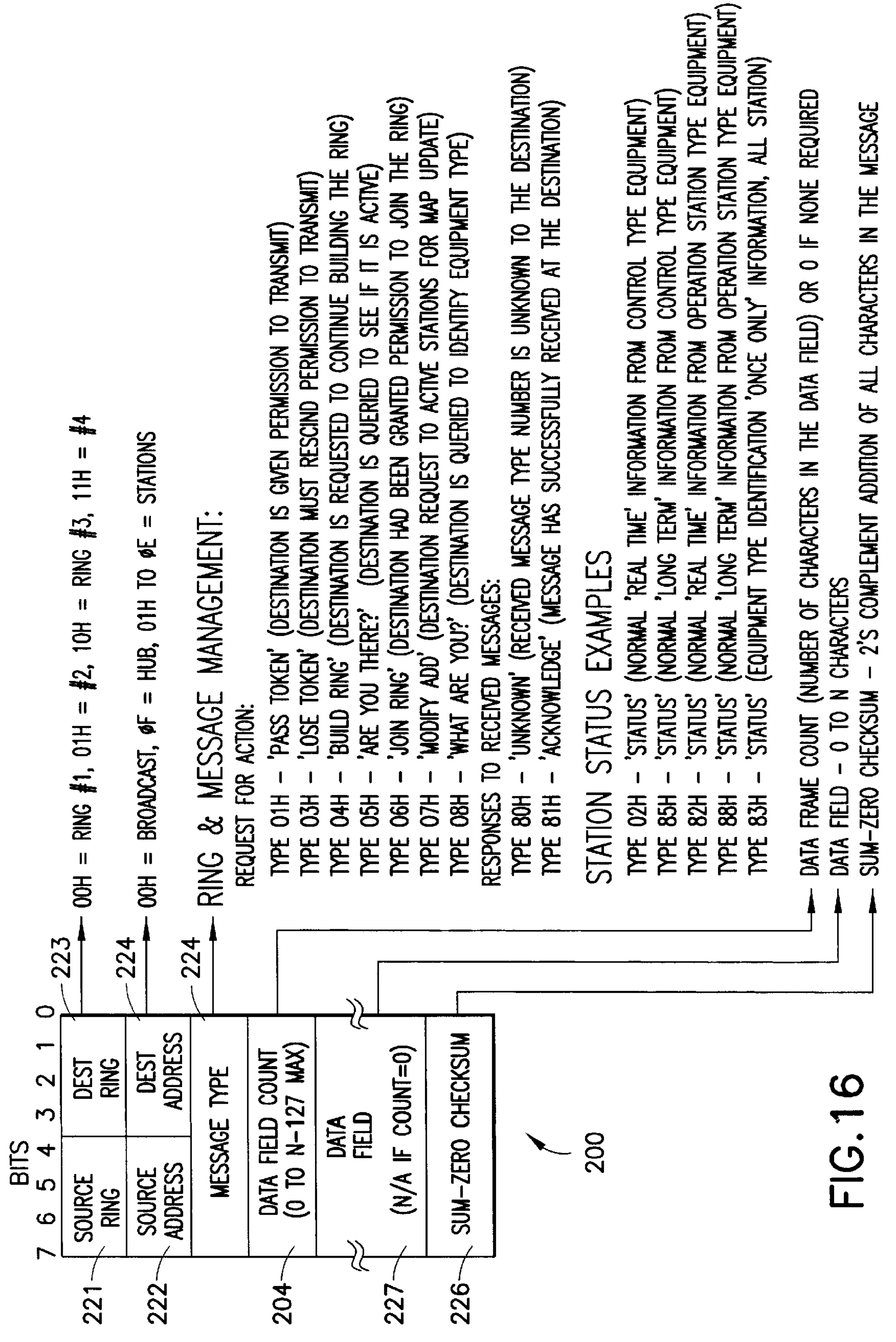
FIG. 16 depicts the network communications system message structure, including message types and meanings associated therewith.
Figures 17, 17A:
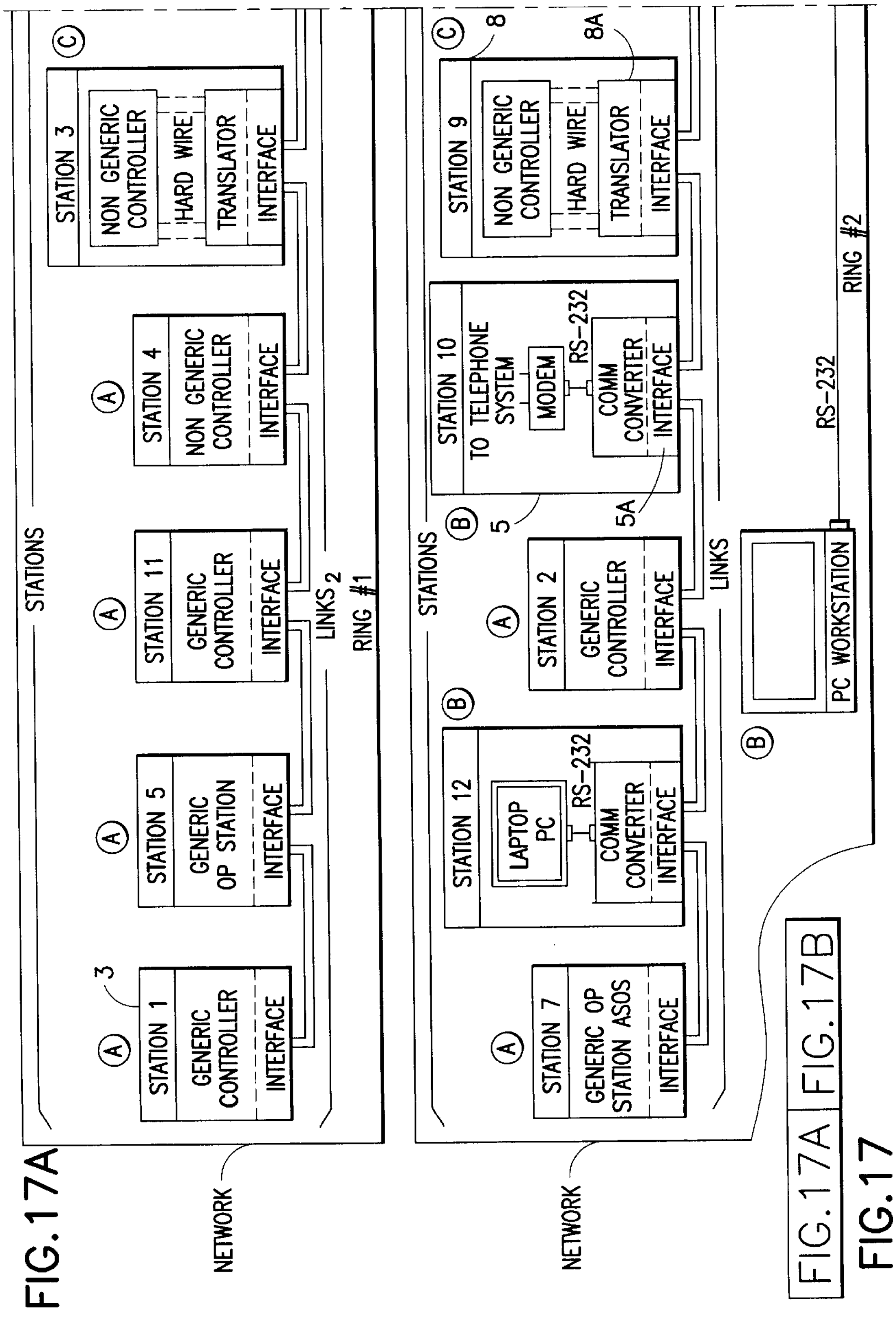
FIG. 17 depicts a block diagram for the communications system depicting the network rings, links, stations, hub and arbitor.
Figure 17B:
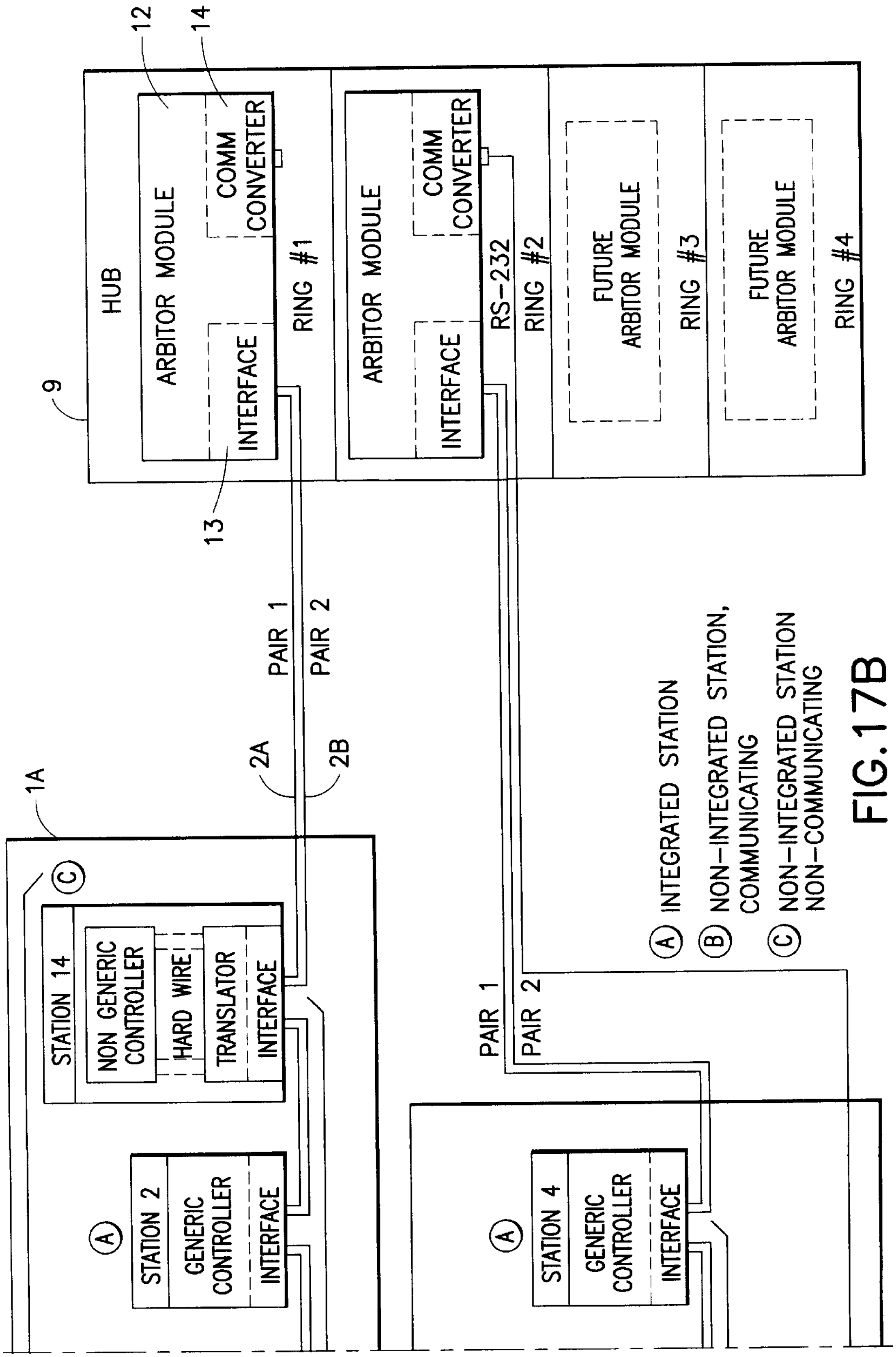

The structure of a message embodies 3 basic areas: character, content and overhead. The character uses a fixed composition which ultimately defines the choice of hardware elements (e.g. UART). The content is composed of characters and carries the message's application related data. The overhead is also composed of characters and carries the message's routing and action instructions. Reference is made to FIG. 16 for a description of the COMMUNICATIONS MESSAGE STRUCTURE 20D.

Figures 21, 21A:
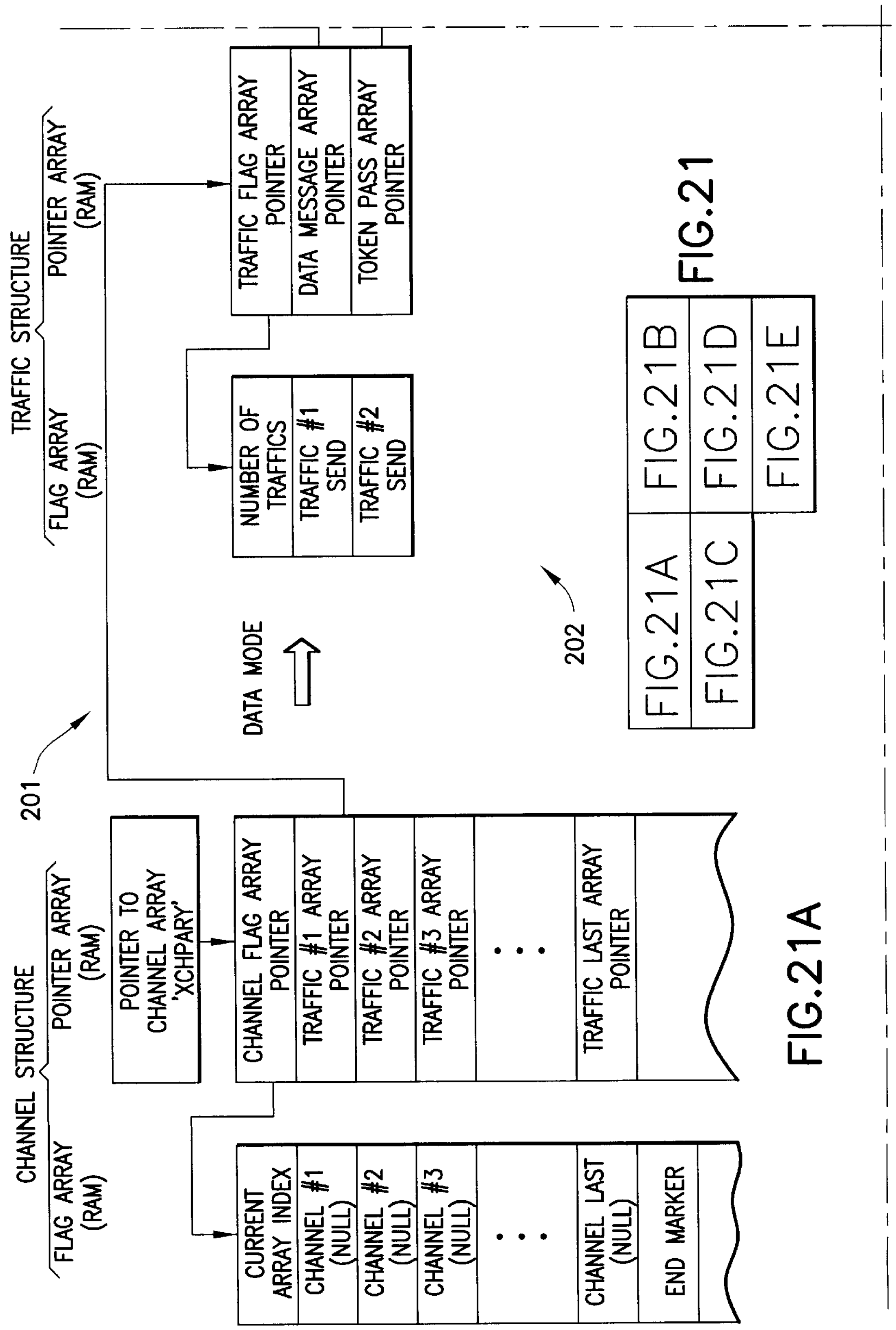
FIG. 21 depicts a flowchart of the message access hierarchy for the control system.
Figure 21B:
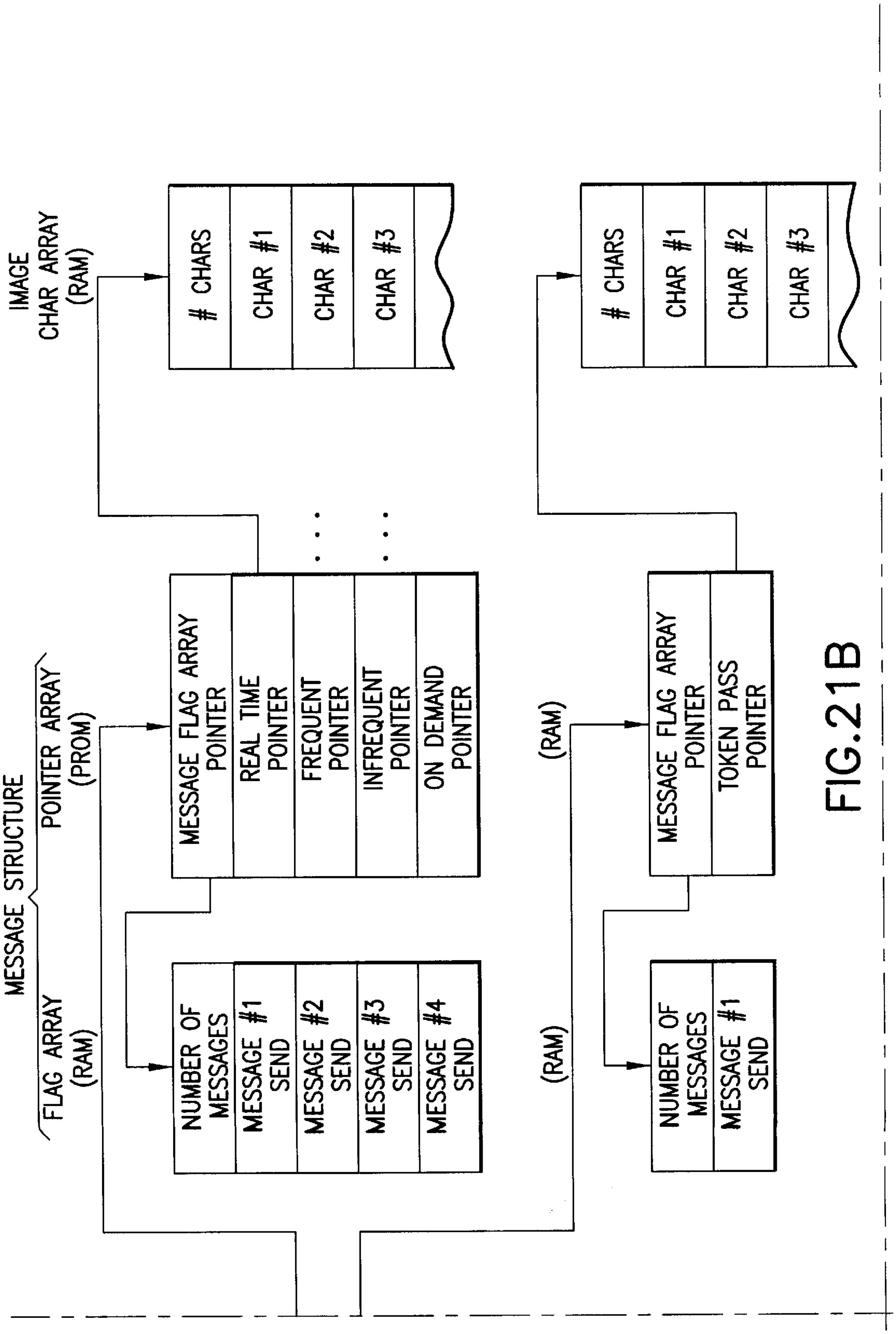
Figure 21C:
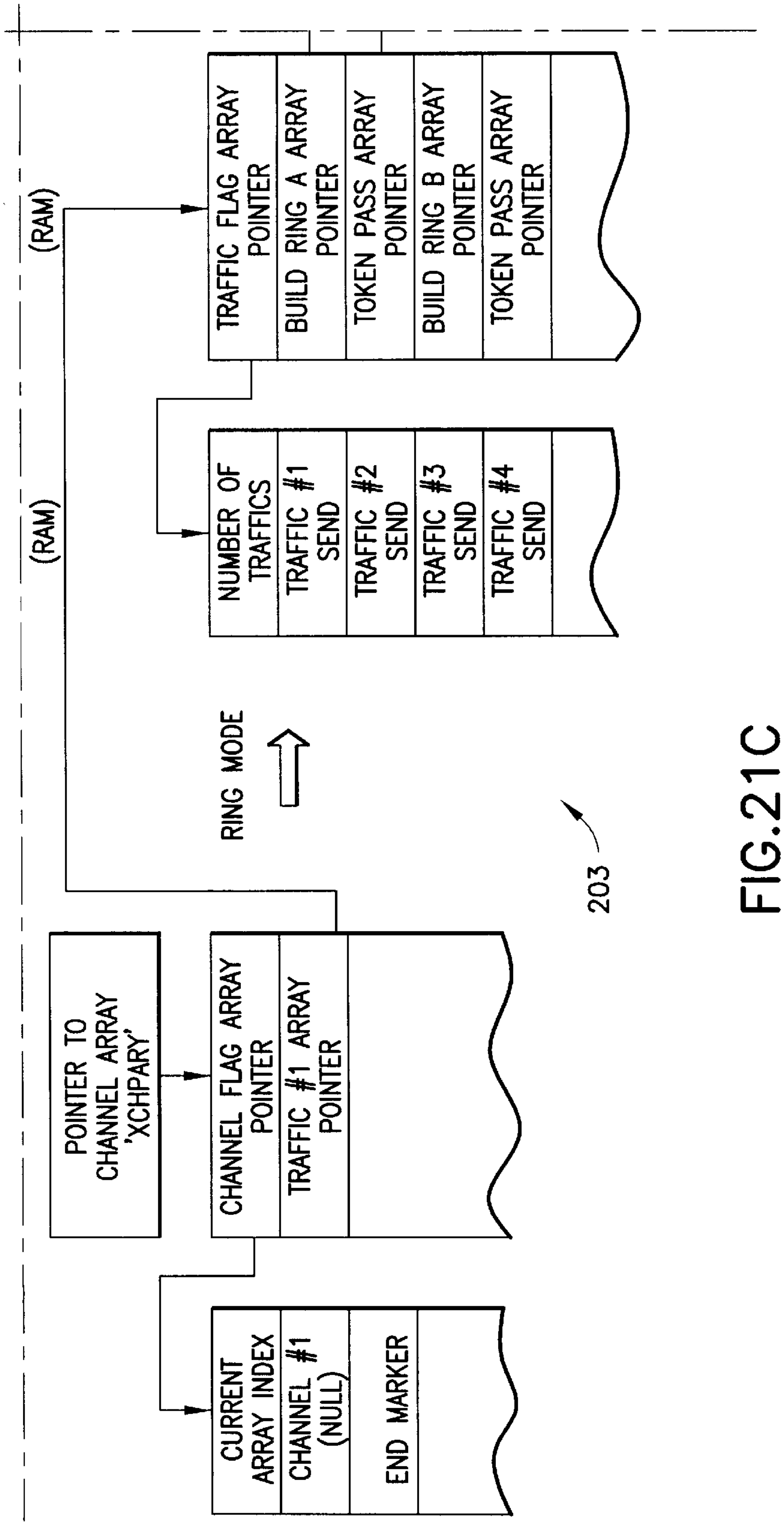
Figure 21D:
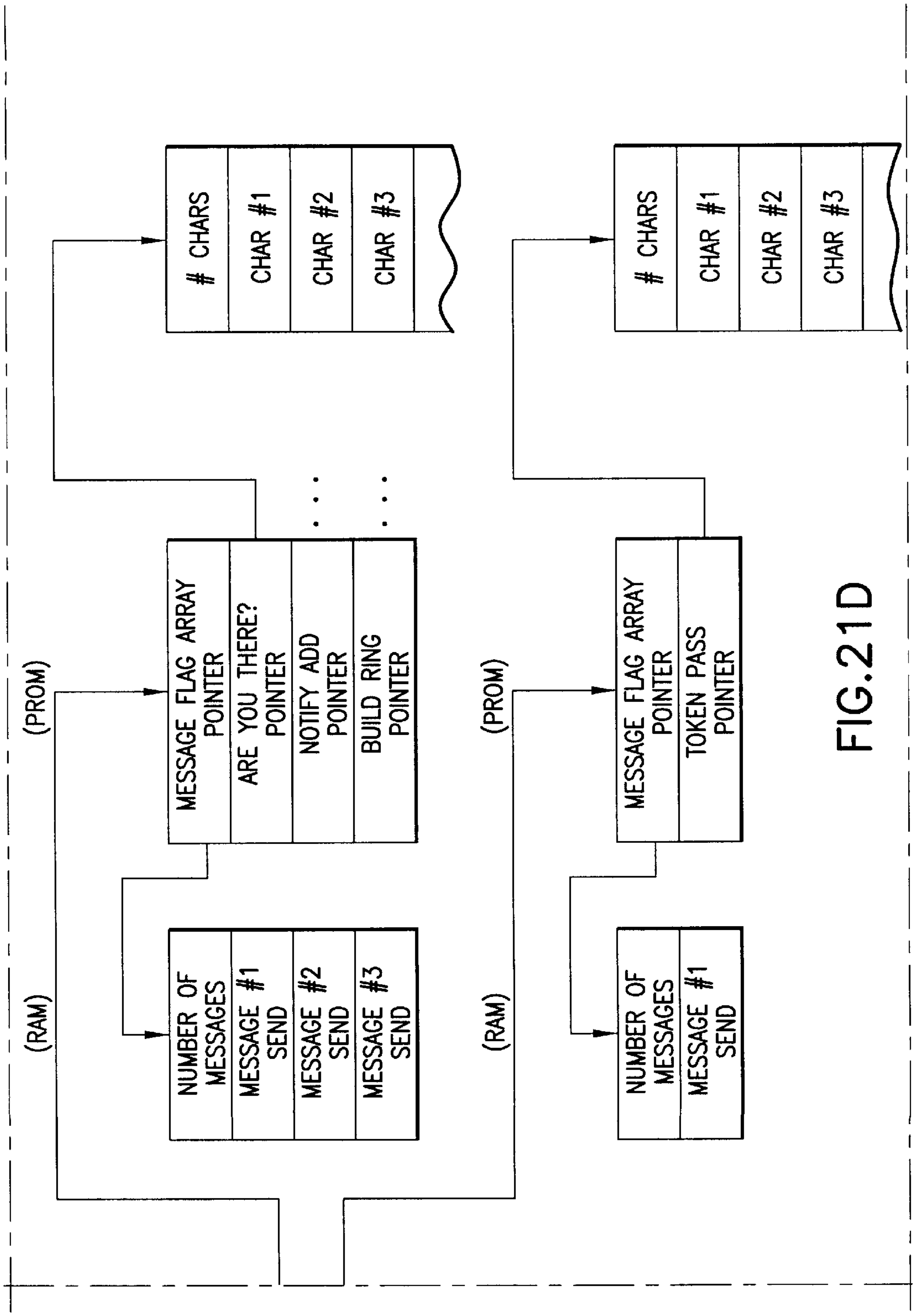

Reference is also made to FIG. 21 for an illustration of the message access hierarchy 201 employed by the communication network during message transmission. FIG. 21 illustrates how the system manages communication traffic data structure, and as such incorporates and understanding of the management and data transmission as previously described. Both the communications message structure and the message access hierarchy 201 will be readily understood and implemented by those skilled in the art. Briefly, two modes of communication message structure may be provided:

Ring Mode 202

This structure features a series of pointers and flags which indicate what messages are possible to send, and whether they should be sent in relation to the initialization of the token ring communication system.

All the possible messages that are needed to determine the next station on the ring and pass the token to that station are prebuilt for the communications system.

This structure is used upon the initialization of the communications system at power up and for ring recovery if a station drops out of or is added to the ring.

Data Mode 203

This structure features a series of pointers and flags which indicate what messages are possible to send; and whether they should be sent in relation to the passing of data from the origin station to any of several destination stations.

The data in the messages is prebuilt based on the current configuration of the actual system.

The data in the messages and which messages may be sent is maintained by the communications system routine which is part of the mainline code.

B. Frame Composition

The frame utilized for the communications network internal communication 210 is composed of individual "bits" whose definition is consistent with classic, asynchronous, non-return-to-zero (NRZ) format. This format is composed of the following elements and states:

IDLE STATE—MARKING

Continuous level indicating logic state 1 or true. Used to define an active, integral channel.

IDLE STATE—SPACING

Continuous level indicating logic state 0 or false. Used to define a broken or non-integral channel.

This state permits detection of channel defects (i.e. line "break").

START BIT

This is the first action occurring at the beginning of a character and is used to time synchronize or lock the pattern for the bits to follow.

FIRST FRAME BIT

The bit immediately following the START which, when 1 or true, identifies the character as the first in a message.

CHARACTER BITS 8 bits immediately following the FIRST FRAME whose 1 or 0 (true or false) levels contain the "intelligence" of the frame.

STOP BIT 1 bit immediately following the PARITY BIT used to complete or close the frame.

Figure 14:
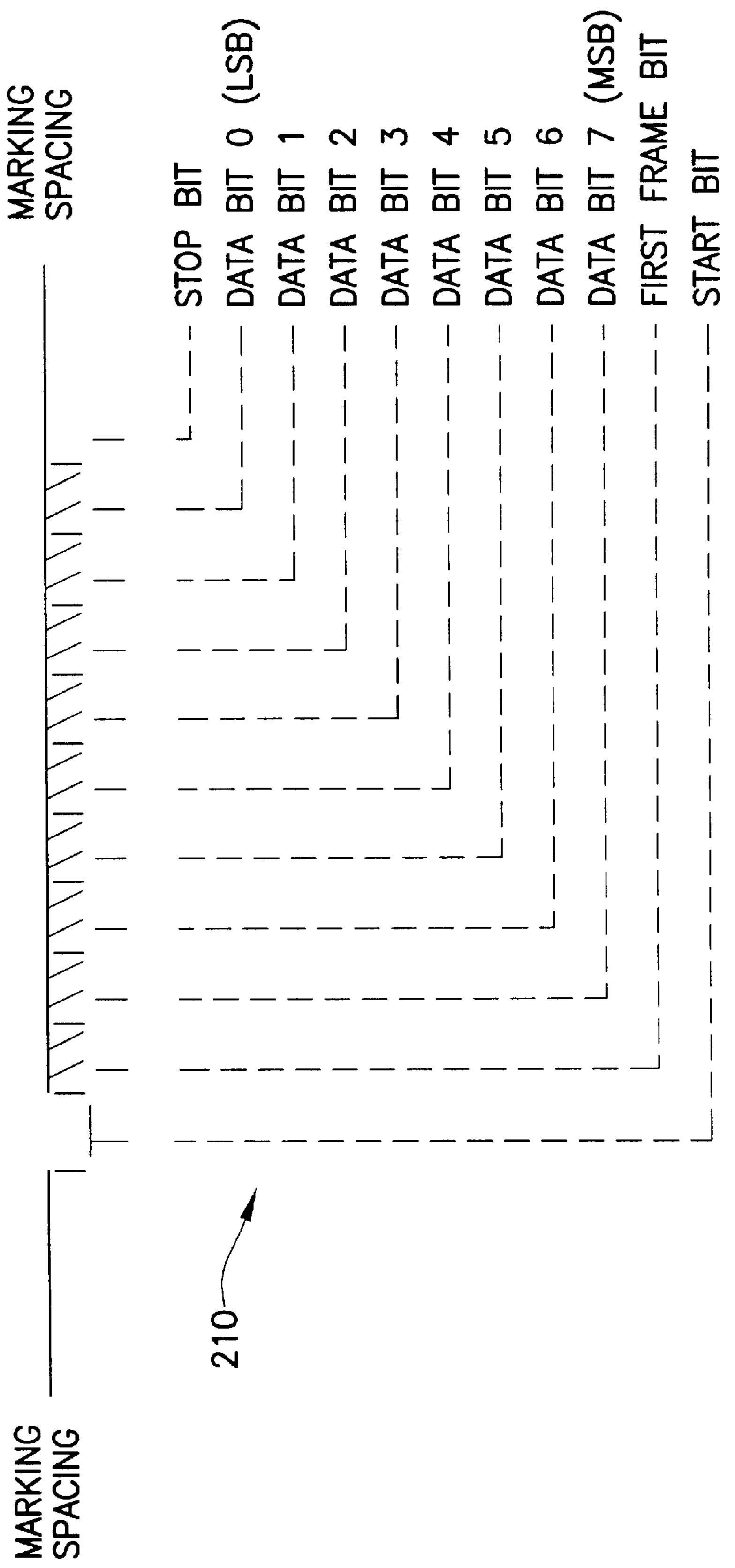
FIG. 14 depicts frame structuring for network internal communications.

Reference is made to FIG. 14 to depict structuring of the frame.

The frame utilized for external communication 211 through a converter or tap is composed of elements and states:

IDLE STATE—MARKING

Continuous level indicating logic state 1 or true. Used to define an active, integral channel.

IDLE STATE—SPACING

Continuous level indicating logic state 0 or false. Used to define a broken or non-integral channel.

This state permits detection of channel defects (i.e. line 'break').

START BIT

This is the first action occurring at the beginning of a character and is used to time synchronize or lock the pattern for the bits to follow.

CHARACTER BITS 8 bits immediately following the START BIT whose 1 or 0 (true or false) levels contain the 'intelligence' of the frame.

PARITY BIT

The bit immediately following the CHARACTER BITS used for detecting character transmission integrity.

STOP BIT(S)

1 bit (or 2 bits) immediately following the PARITY BIT used to complete or close the frame.

Figure 15:
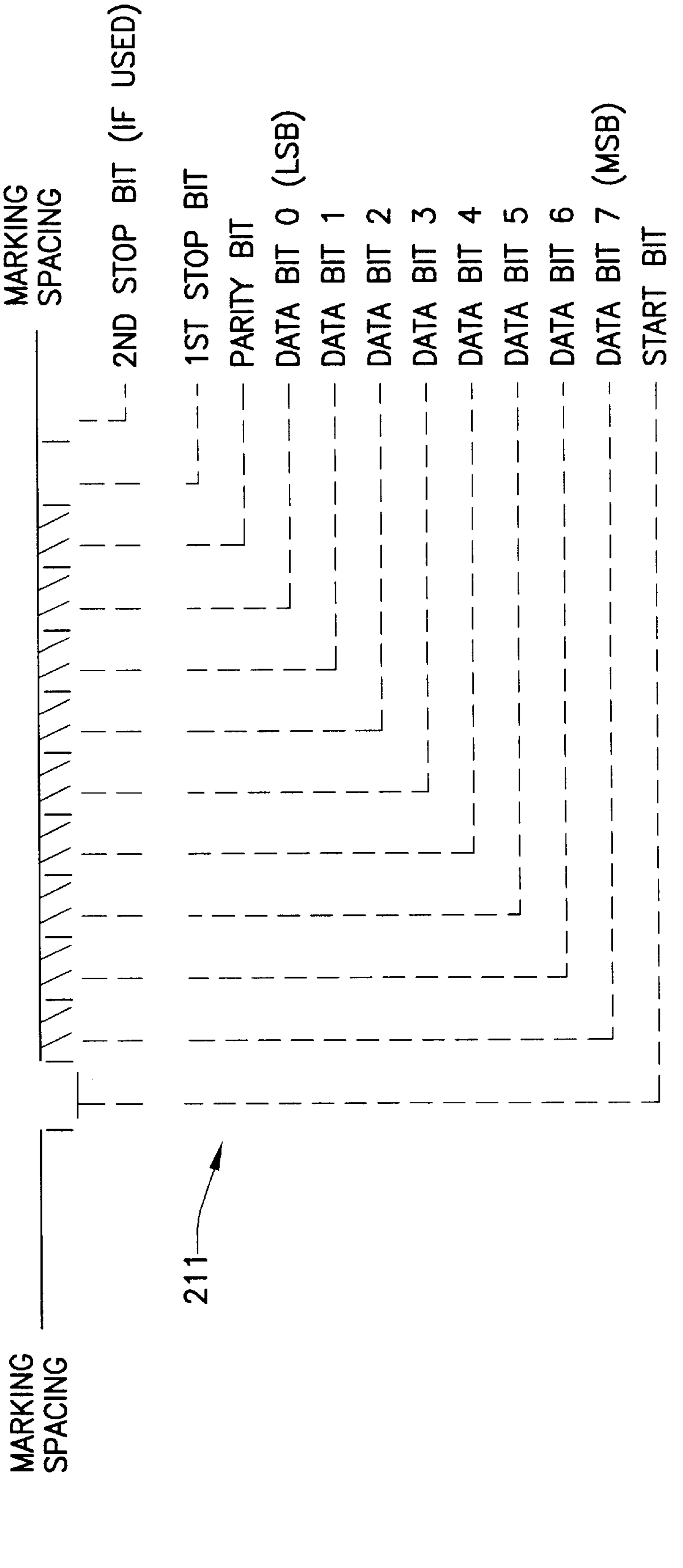
FIG. 15 depicts frame structuring for network external communications.

Reference is made to FIG. 15 to depict structuring of the frame.

C. INFORMATION CONTENT

The data (if any is required) a message carries is contained in a variable number of frames (characters). See FIGS. 10 and 21. Although the maximum sized data field is 127, the use of field sizes above 32 may not be recommended, as large data fields 227 (i.e. long messages) tend to imbalance network throughput toward the station transmitting them.

The first frame 204 of the data field 227 (4th frame in the message 200) always contains a total count of frames in the data field, not counting the count or size frame itself. Message types not requiring a data field (e.g. ring management messages) still carry the 1st data field frame (count or size) and it is set to 0 to indicate no data frames follow.

D. Message Overhead

The routing, action intention (type) and integrity of a message 200 are contained in the message overhead 220. See FIGS. 16 and 21. The message routing is accomplished by identifying the source 221, 222 and destination 223, 224 as expressed by the ring ID and the address on the ring. The action intention or message type indicates to the destination how to interpret the message and what action to take. Message integrity is provided to protect against unintentional alteration of messages during transmission.

The routing function is fulfilled by 2 frames; 1 for the source and destination ring IDs and 1 for the source and destination addresses. The 1st frame in every message is the source and destination ring IDs. The lower half of the 8-bit character (i.e. the first 4 bits) is the destination ring 223 and the upper half (i.e. the last 4 bits) is the source ring 221. The address mark (ninth bit) is always set to 1 or true for this frame in order to notify the destination receiver to wake-up.

The 2nd frame in every message is the address frame. The lower half of the 8-bit character (i.e. the 1st 4 bits) is the destination address 224 and the upper half (i.e. the last 4 bits) is the source address 222. The address mark (ninth bit) is always set to 0 or false for this and all subsequent frames in a message. While sixteen, 4-bit address are defined, address 0 is reserved for broadcast to all stations (broadcasts do not require a response) and address 15 is reserved for communications with the hub or ring arbitor. The 3rd frame in every message is the type frame 225. The contents of this frame specify the action required by the receiver of the message. There are two categories of message type—those utilized in the management of the ring and those utilized in data transmission.

The last frame in every message is the checksum frame 226. The checksum is used to detect violation of message content during transmission. The value of the checksum is the 2's complement, sum-zero of all characters (not frames—ninth bit is excluded) in the message. It is calculated by simple addition, starting with the 1st character (ring ID) and ending with the last character (last in data field or data field count of there is no data field content). The addition result is 2's complemented to yield the sum-zero checksum. When the message is received, the character content is summed then added to the received checksum. If the result is 0, the message is intact. If the result is anything other than 0, the message has been violated and is rejected.

Design Guidelines

A station 3, 5, 8 is control equipment for a press auxiliary which includes either a built-in interface or a supplied, external interface to the communications systems. Regardless of which station configuration is used (integrated or external interface), it should satisfy the requirements of communication system protocol, message structure and ring management features—in both the hardware and the software designs.

The 3 types of stations 3, 5, 8 which may be utilized in a supported system designs according to the invention are:

A. Integrated Stations 3—Stations whose communication interface is designed directly into the control for a press auxiliary. This type of station is typically a control design based on its generic hardware and software components. This definition also includes control designs working in cooperation with other designs.

B. Communicating, Non-Integrated Stations 5—Stations with a communication interface that is not electrically compatible with a specific generic design but satisfies the protocol and functions of the system of this invention. Such stations include specifically RS-232 or current loop and control designs based on PC's, workstations or laptops that are connected to an internetting network through a compatible Communication Converter 5A, 14 (Tap), using a standard serial port.

C. Non-Communicating, Non-Integrated Stations 8—Stations which do not have a communication interface. This includes any manufacturer's control design employing physical inputs and outputs (switches, relays, contacts, indicators, solenoids along with digital and analog signals) which can be connected to an internetting network according to this invention through a compatible translator 8A (with or without a companion translator expander).

A. Integrated Stations 3

Designers working with integrated stations 3 should comply with all aspects of the invention including the Physical elements, logical elements and message structure.

B. Communicating, Non-Integrated Stations 5

Designers working with communicating, non-integrated stations 5 should comply with all aspects of the invention that relate to status messages.

The Communication Converter 5A, 14 (Tap) can be supplied as an integral part of the Hub 9, or as a standalone device. The standalone style device requires 8 to 10 VAC at 60 Hz or 10 to 14 VDC (unregulated is acceptable) from a local source. Style choice should be made as follows:

a. RS-232—standard cable (conductor pair capacitance is 50 pf/foot or less) is used and the station serial port is located within 15 cable feet of the Hub 9—use Hub style Tap.

b. RS-232—low capacitance RS-232 cable (conductor pair capacitance is 15 pF/foot or less) is used and the station serial port is located within 50 cable feet of the Hub 9—use Hub style Tap.

c. RS-232—neither a. or b. can be satisfied—use standalone style Tap.

d. CURRENT LOOP—supports runs up to 200 cable feet use—either Hub or standalone style Tap.

3. While one designing the communication system according to the invention need not be concerned with issues dealing with actual management of the ring, he must be aware that during the ring build (on system power-up, automatic station addition, faulty channel detection, etc.) a response to a message transmitted by a non-integrated station may be delayed by 10 to 15 seconds. Also, it is to be noted that the transmitted message is not ignored or discarded (unless, of course, the Tap is not powered) during this time but is queued until the ring build is completed.

A designer should also be aware of message roundtrip transit times. For a typical transmitted message consisting of about 30 information characters expecting a received response of the same size, utilizing a multi-ring system where all internal and external links operate at 19200 baud, the transit time is in the range of 250 to 350 milliseconds.

C. Non-Communicating, Non-Integrated Stations 8

For designers working with non-communicating, non-integrated stations 8 detailed knowledge of the system is not required. In this type station, the internetting system of this invention is interfaced through a translator 8A such as described hereinabove.

FIG. 20 diagrammatically illustrates a flowchart of the logic employed in the communications software according to the invention. The chart is exemplary of the logic flow for the communications software, including the functioning of the token and transmission of message traffic (see FIG. 21) and, as such, will be readily implemented and understood by those skilled in the art. A brief synopsis of the components illustrated in the flow chart follows to aid the reader in better understanding character transmission in the communications system according to the invention.

Timer Interrupt Logic (COMM TIMERS) 230

This routine is entered each time the communications interval timer (used to time communications in the system) times out.

Some of the various aspects of communications which can be timed are checked here by the system. A list of those aspects includes:

a. Has a first character of a message been received within the maximum allowed "begin to receive message time"?

b. Has a character been received within the maximum allowed time between characters?

c. Has a character been transmitted within the maximum allowed time between characters?

This routine is exited by one of three paths:

1. The ESC TOK 231 (escape token) path exits into the Receive Interrupt Logic.
2. The TURN RCVR 232 (turn the tranceiver around from transmit to receive) path exits into the Transceiver Turn Around logic (at R).
3. The END INT 233 path exits so that program control returns to main line code which was interrupted so that this routine could be executed.

Receive Interrupt Logic 240 (CHAR RECEIVE)

This routine is entered each time a character is received by the serial port of the CPU.

Each received character is checked for certain basic problems such as framing errors.

If the received character is the first character of a message 241, the contents of the character is checked to determine if the following message is for this station 242 (on the communications ring).

If the received character is the third character of a message 243, the message type code is saved 244.

If the received character is the fourth character of a message 245, the number of characters remaining to be received is calculated 246.

Each received character is used to calculate the message checksum 247, which is used to confirm the receipt of a good message when the last character is received 248.

The knowledge of the message type is used to determine if the token has been passed to this station.

This routine is exited by one of three paths:

1. The TURN RCVR 232 (turn the tranceiver around from transmit to receive) path exits into the Tranceiver Turn Around logic (at R).
2. The TURN XMIT 247 (turn the tranceiver around from receive to transmit) path exits into the Tranceiver Turn Around logic (at X).
3. The END INT 233 path exits so that program control returns to main line code which was interrupted so that this routine could be executed.

XMit Interrupt Logic 250 (CHAR TRANSMIT)

This routine is entered each time a character is transmitted.

A count of the number of characters being sent is kept to determine when the last character of a message has been sent 251.

If this is the first character of a message 252 the wakeup (ninth) bit of the character is set 253 otherwise the wakeup bit is reset 254.

If the message being transmitted is a pass token type message 255, this knowledge is saved 256.

The next character is sent 257.

This routine is exited by one of two paths.

1. The last character sent exits to the XMIT DONE portion 260 of the Xmit Interrupt Logic.
2. The END INT path 233 exits so that program control returns to main line code which was interrupted so that this routine could be executed.

Xmit Interrupt Logic 260 (XMIT DONE)

This routine is entered from the CHAR TRANSMIT interrupt service routine 250 each time the last character of a message has been sent.

The logic in in routine sets various flags and exits via TURN XMIT 249 if the token has not been passed. Otherwise, it exits via TURN RCVR 232.

This routine is exited by one of two paths:

1. The TURN XMIT 249 (turn the transceiver around from receive to transmit) path exits into the Transceiver Turn Around logic (at X).
2. The TURN RCVR 232 (turn the transceiver around from transmit to receive path exits into the Transceiver Turn Around logic (at R).

Transceiver Turn Around 270

This routine is only entered via the Timer 230, Receive 240, or Xmit Interrupt Logic 260 routines.

This routine converts the transceiver from receive to transmit or from transmit to receive as needed.

This routine tracks the next character and the next message to send.

This routine is exited by a single path:

1. The END INT 233 path exits so that program control returns to main line code which was interrupted so that this routine could be executed.

B. The Control System

Apart from the network communication system, the software control means fundamentally includes operator station control logic to provide "rules" governing the actions and responses which flow between the pressman and the auxiliary/accessory controls.

The major thrust of the operator station is to:

1. Permit the pressman hands-on control of auxiliary products through adjustment of print parameters and through initiation of action;
2. Annunciate product status and prompt the pressman to take appropriate corrective action, and
3. Collect historical data to give the pressman access to auxiliary performance measurements and provide the means for improving product performance.

Figure 18:
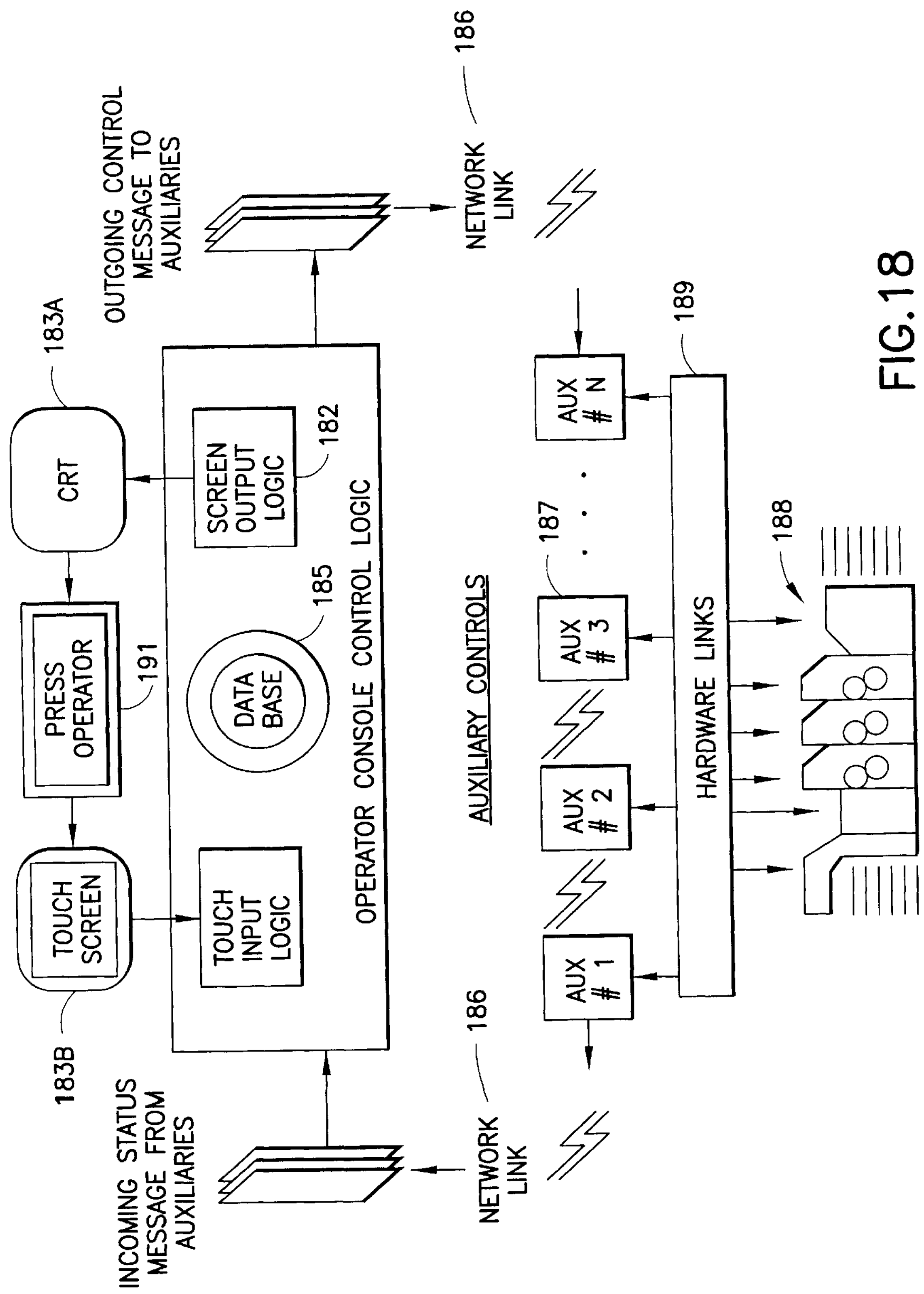
FIG. 18 depicts an overall block schematic diagram of the system for controlling printing press accessories and auxiliaries.

A diagrammatic representation of the functioning of the control system and flow of the control logic in conjunction with the operator station is shown in FIG. 18. Logically, the press operator 191 will receive information regarding the system from the CRT 183A, and will be able to enter desired information via the touch screen CRT 183B. The operator console 184 also contains the historical databases 185 of printing conditions and preset machine specific conditions which, collectively, are subjected to a parametric conversion matrix (see FIG. 19) in order to match the desired set of print specific conditions with the appropriate machine specific data that will be transmitted to the press accessories and auxiliaries. Messages which are thus transmitted through the network link 186 to the individual auxiliary controls 187, which are themselves hardwired or otherwise linked 189 to the printing press auxiliaries and accessories 188 that form the system to be controlled. Likewise, messages and data will be forwarded back from the auxiliary controls 187 through the network link 186 to the operator console 184, and such will be translated through the screen output logic 182 and displayed to the operator 181 via the CRT 183A. Control logic descriptions for specific press auxiliaries and accessories 188 as may be implemented according to the invention will be described herein.

Figure 19:
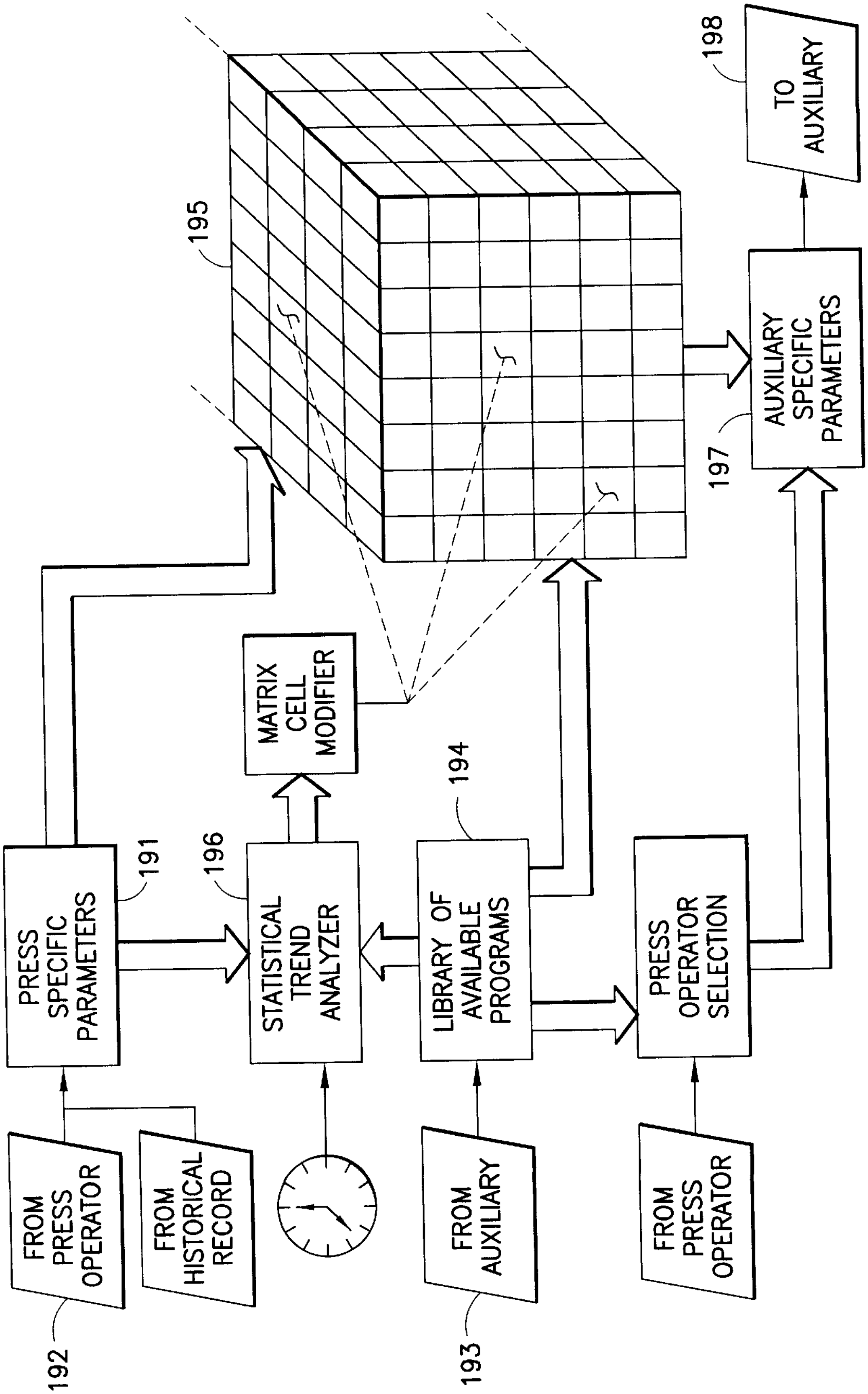
FIG. 19 depicts a schematic block diagram of the parametric conversion which occurs in the matrix historical database.
Figure 20A:
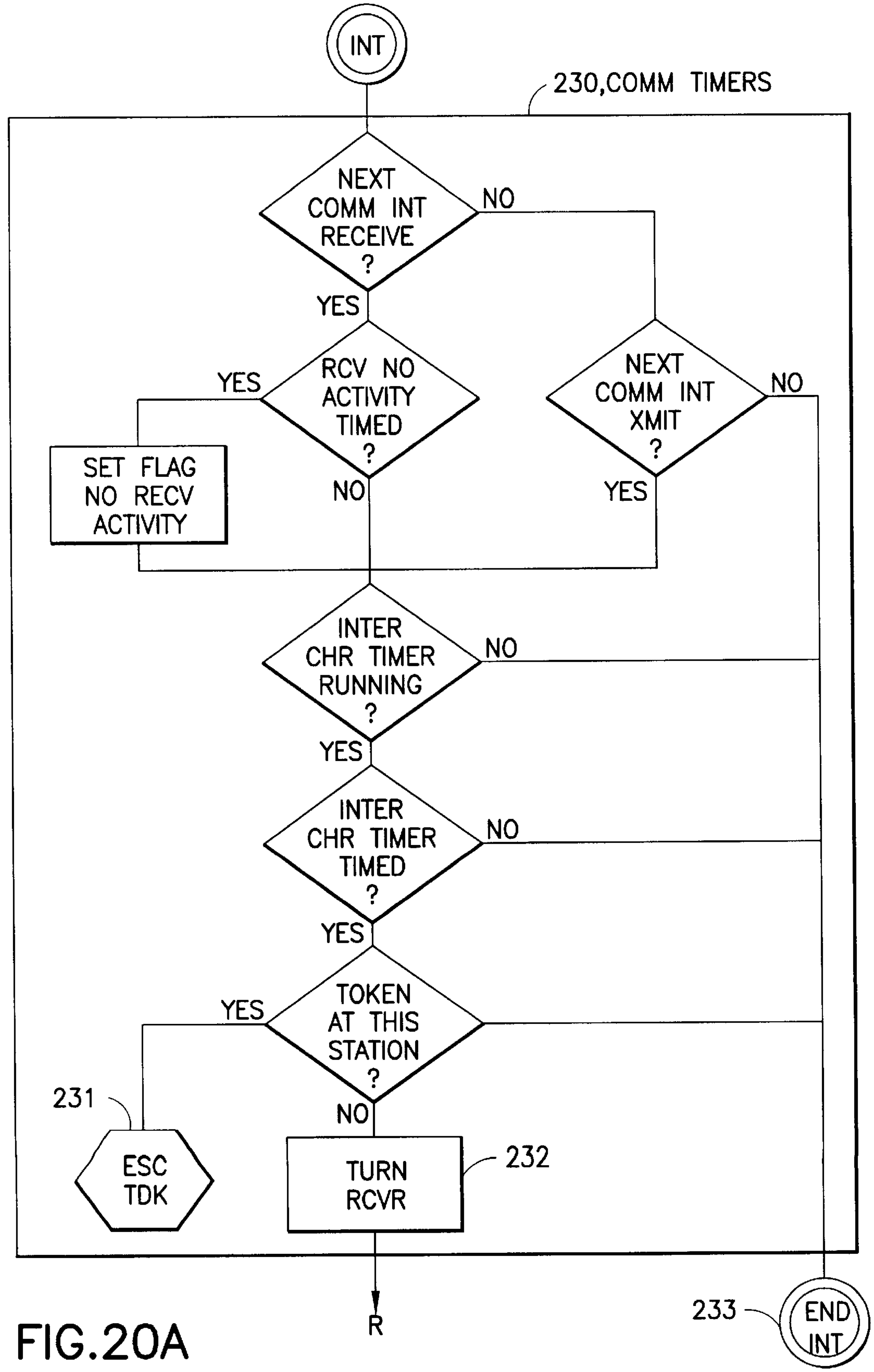
FIG. 20 illustrates a flowchart of the logic employed in the communications network of the invention.
Figures 1, 2, 3, 20B:
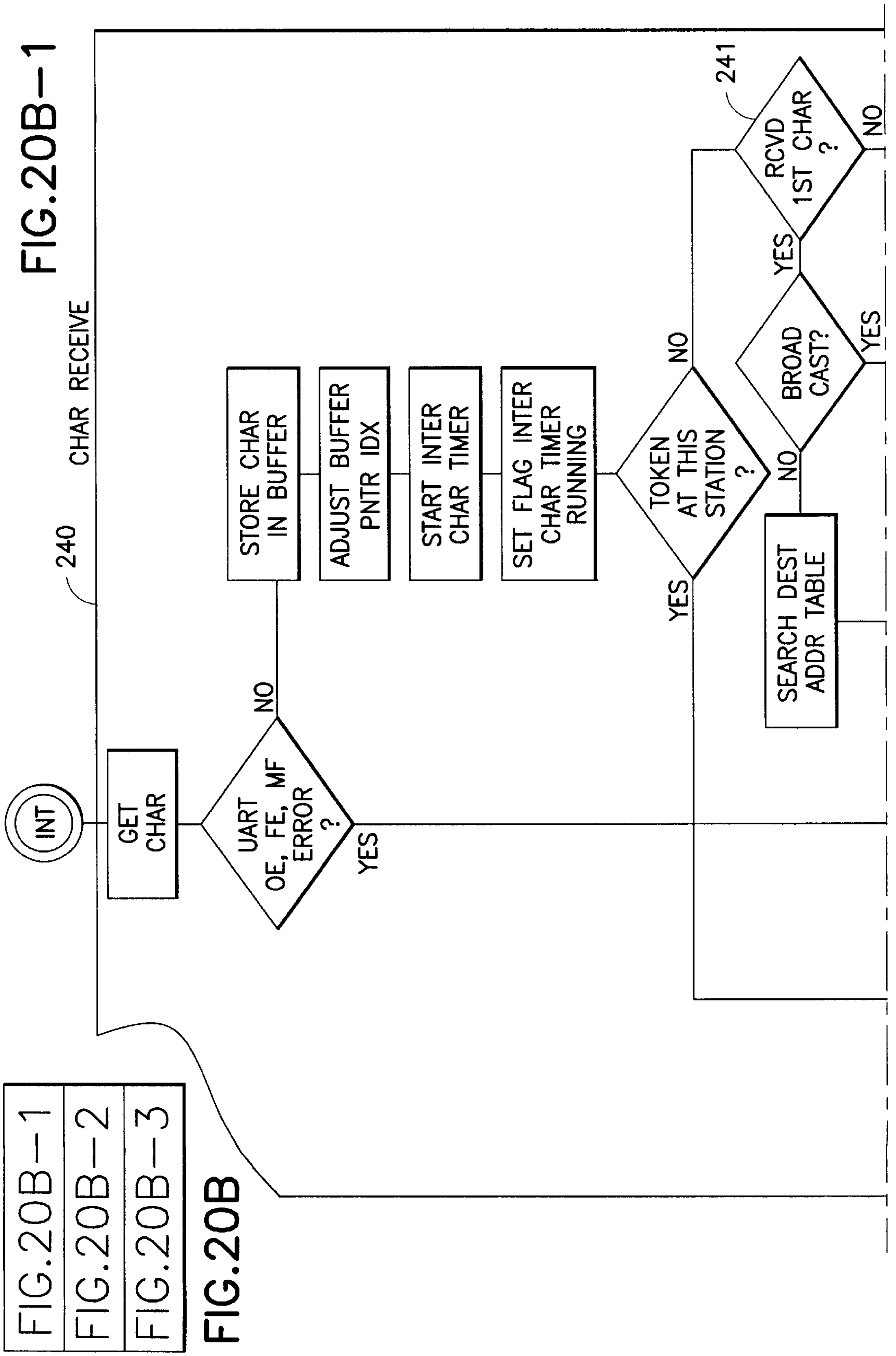
Figures 2, 20B:
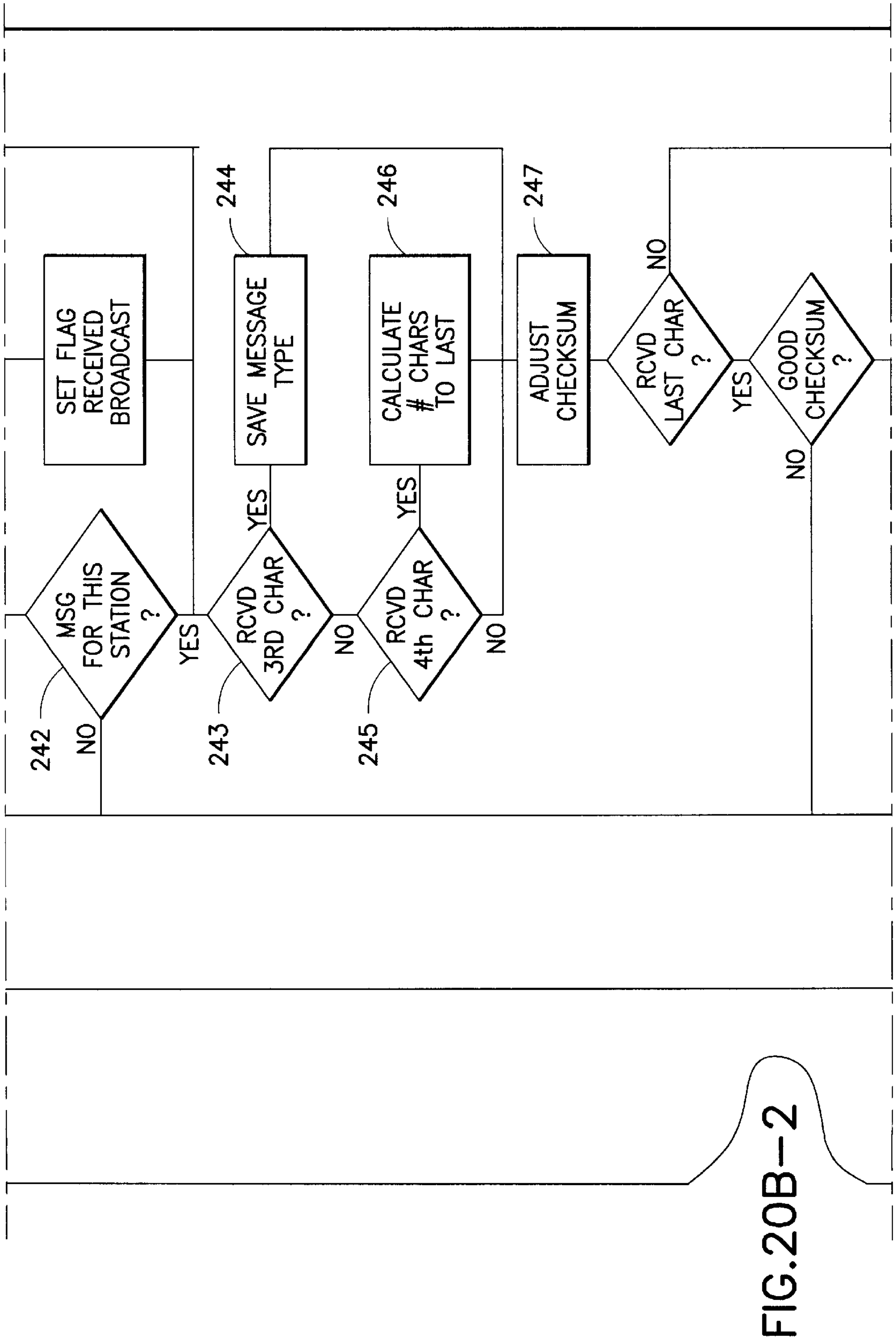
Figures 3, 20B:
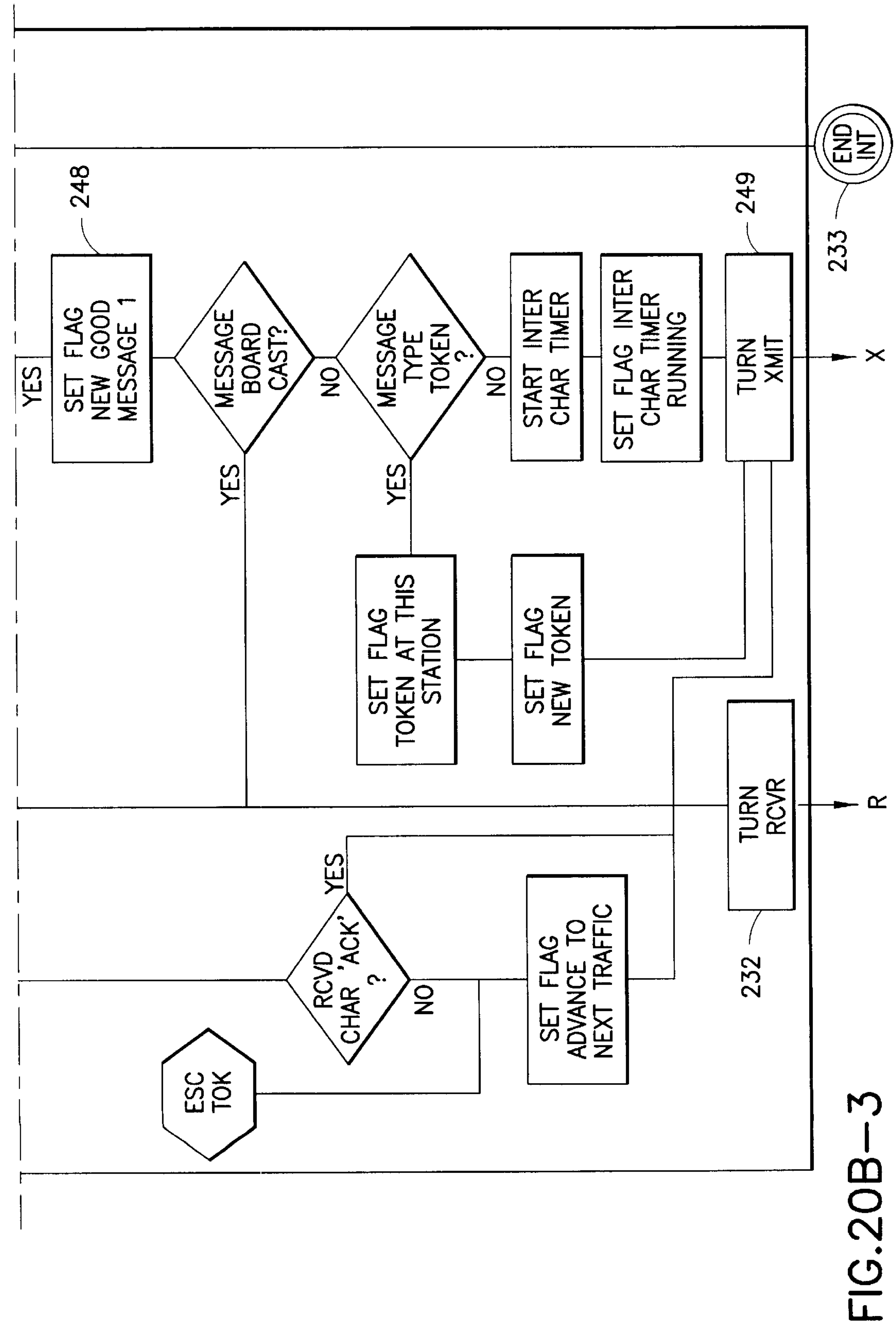
Figures 1, 20C:
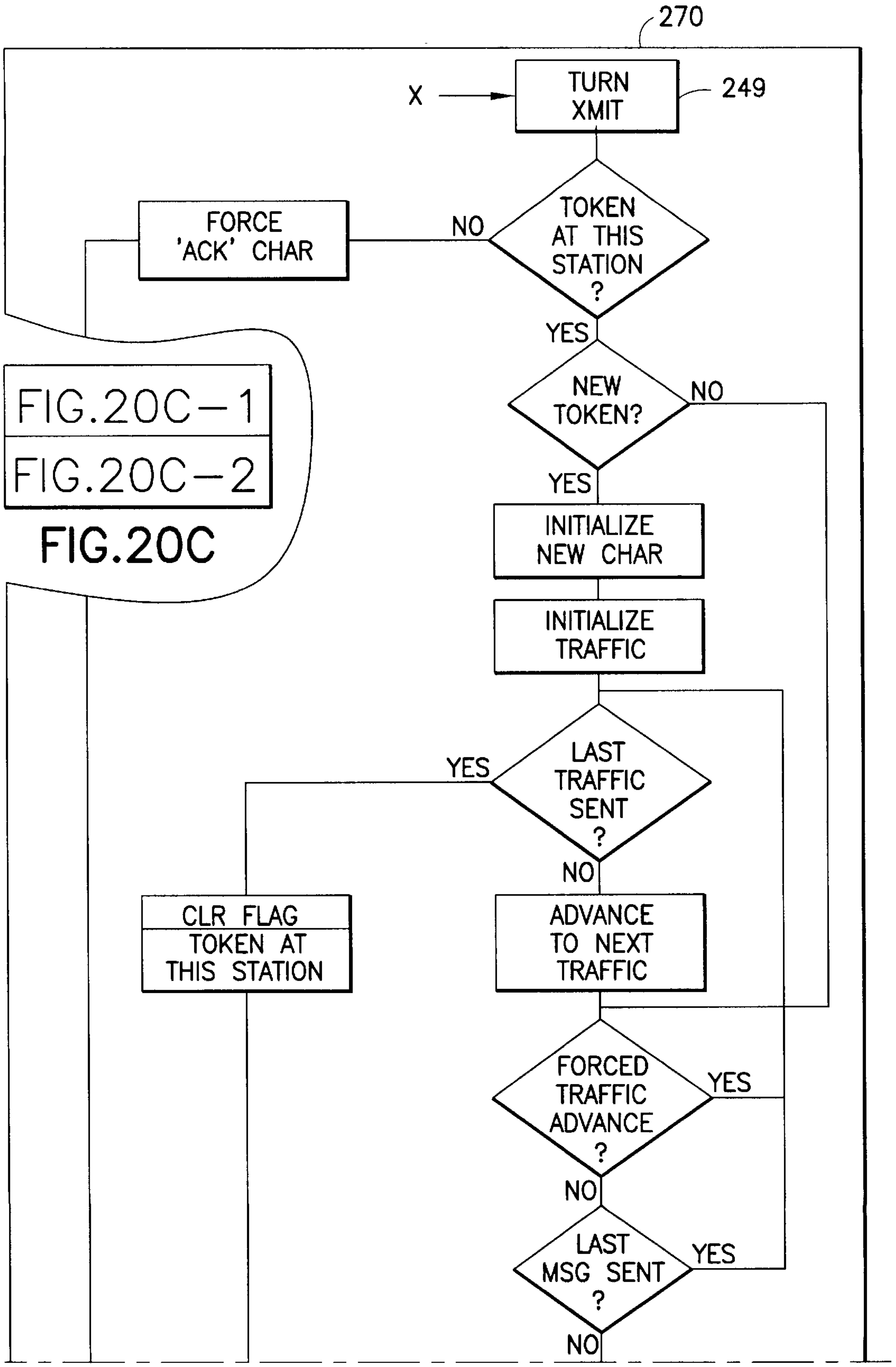
Figures 2, 20C:
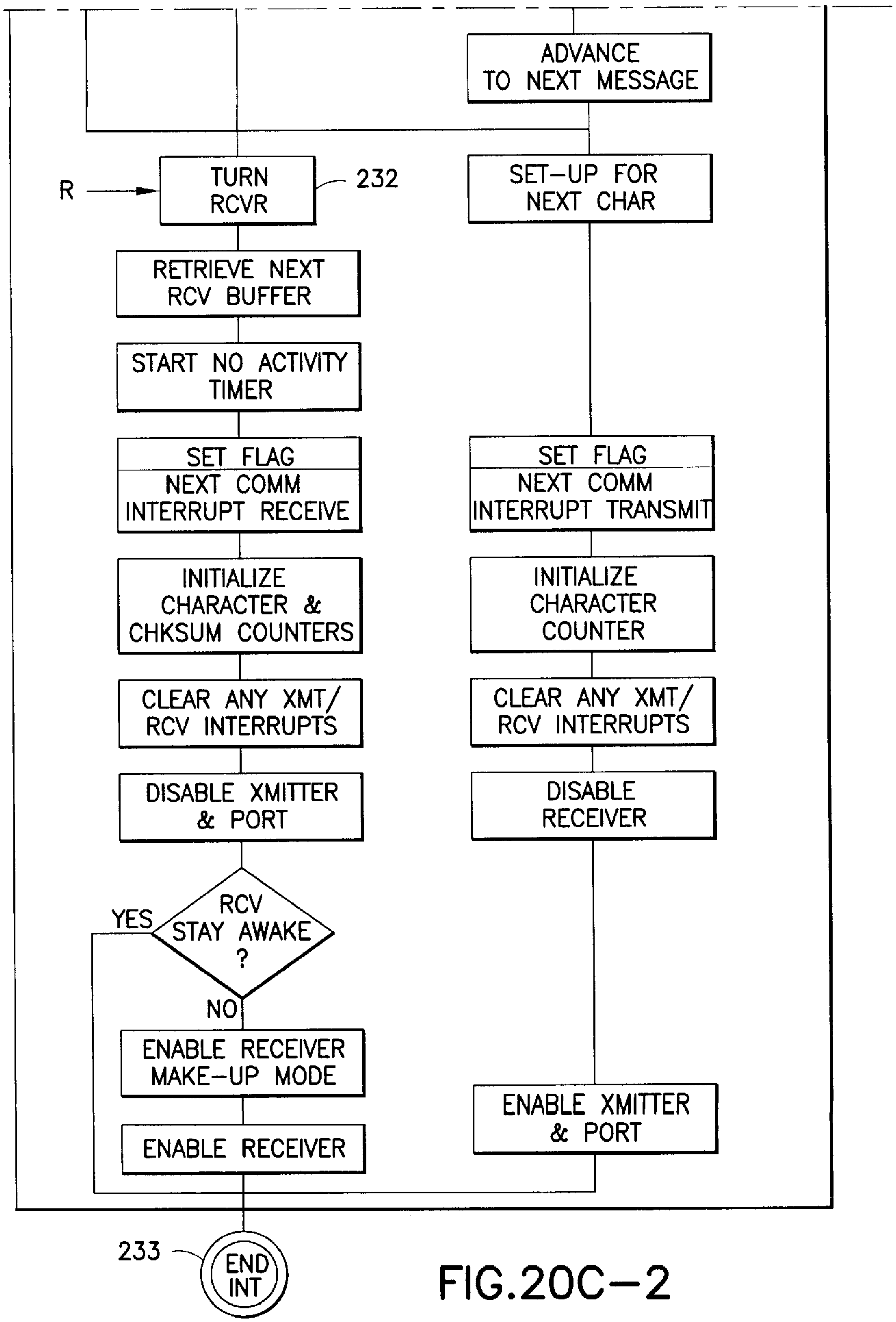
Figures 2, 20D:
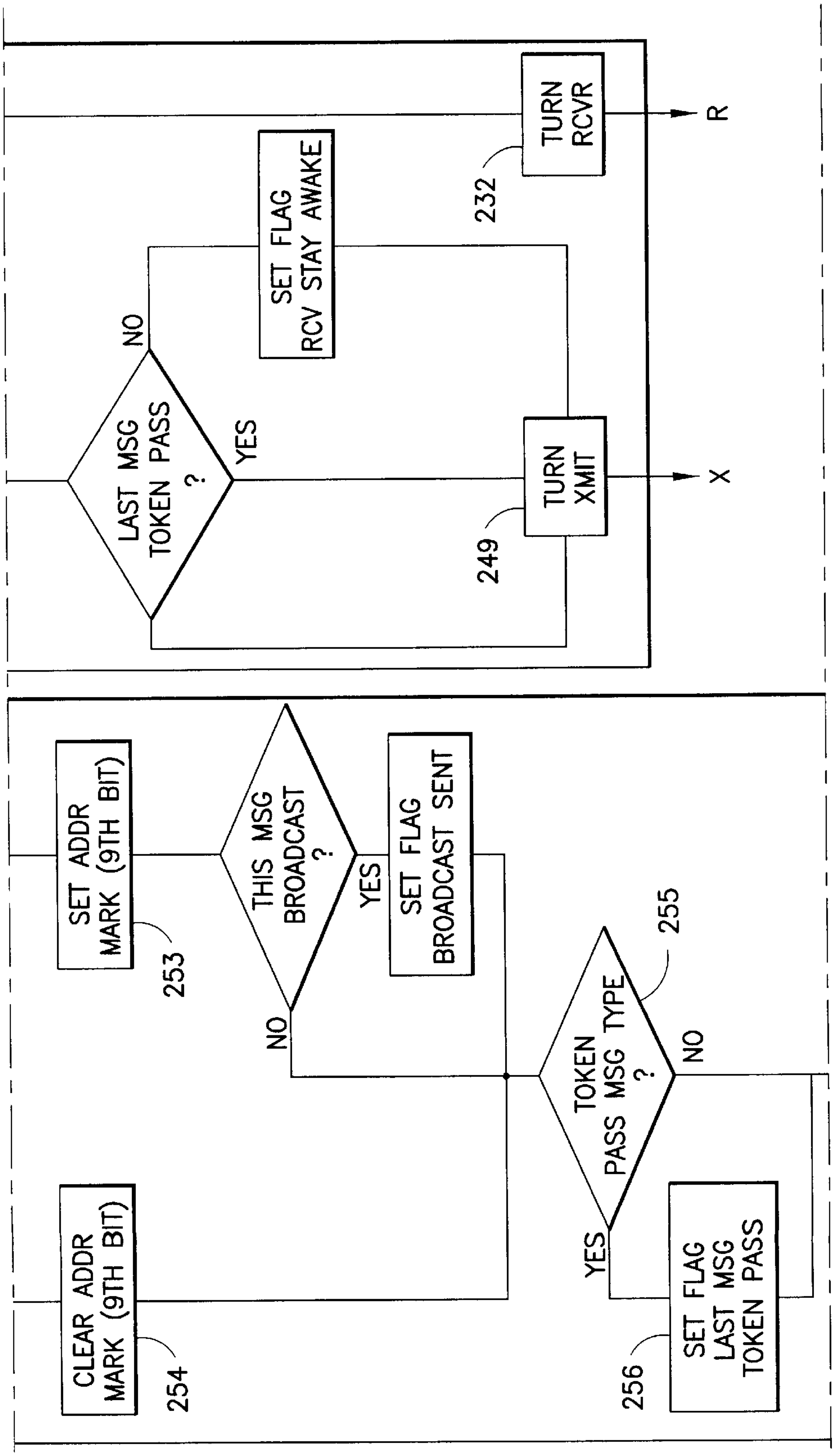
Figure 20D:
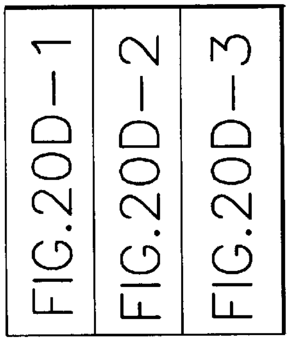
Figures 3, 20D:
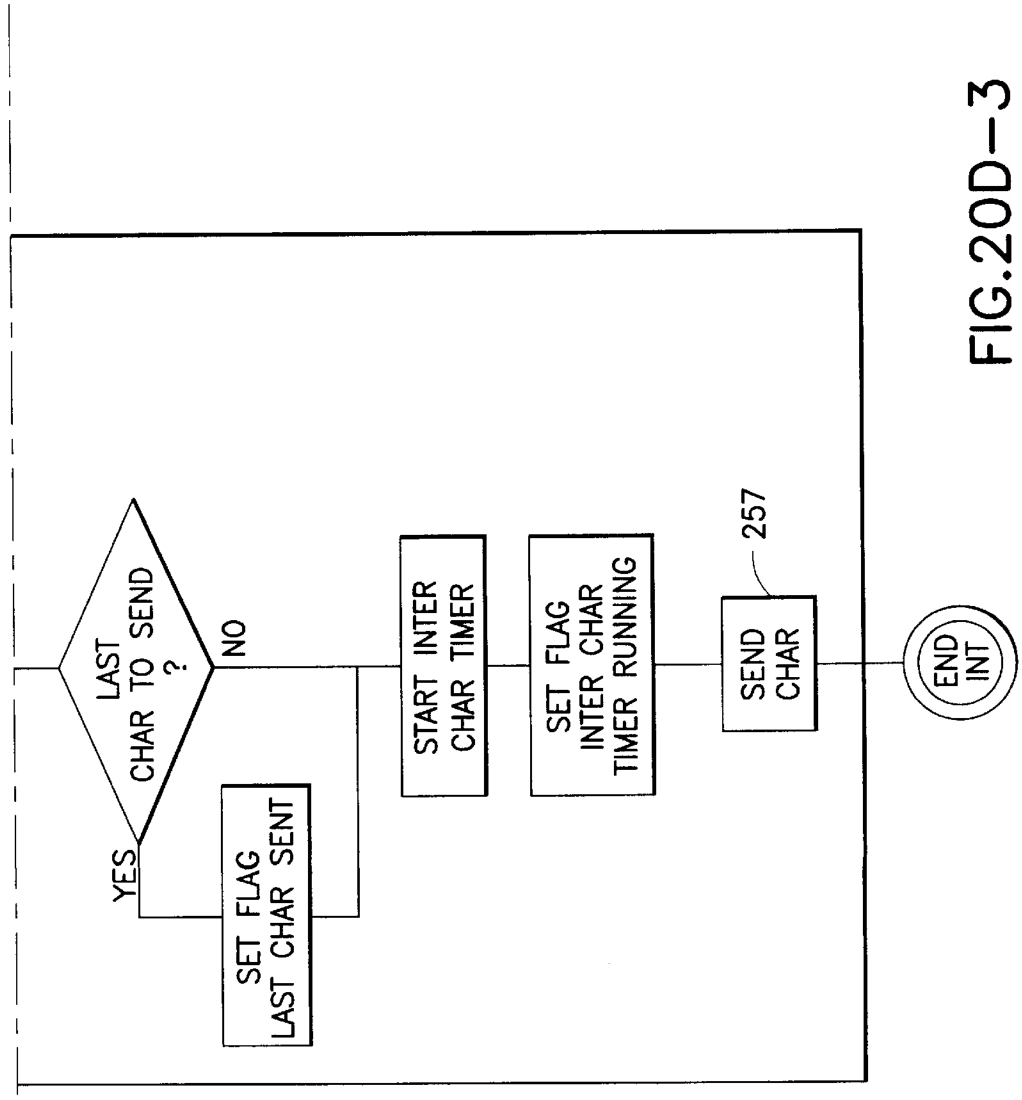

Logically, the historical databases 185 of the present machine specific data and printing or job specific conditions will undergo a parametric conversion matrix. FIG. 19 is a schematic representation of that process. This logic is necessary in order to match a desired set of print specific parameters or conditions 191 to the appropriate set of machine conditions (accessory or auxiliary specific parameters) which are transmitted to the accessory or auxiliaries 198 to produce the desired printing conditions. A description of the parametric conversion which occurs has previously been described in the "Brief Overview of Detailed Description" which . . .

As will be further explained, each control item that the operator station must deal with is detailed, function by function, in an explanation of control logic which follows. The format of each specification item is as follows:

1. The first line or group of lines identifies the item(s) or "variable" along with a shorthand notation of its destination shown in parenthesis.
2. The lines that follow exhibit two characteristics:
   a. The last word(s), shown in capital letters is a logic or action identifier (e.g., AND, IF, OR, AND NOT, ACCESS, RETRIEVE, etc.)
   b. The remaining word(s) describe the source of input shown in parenthesis.

The outputs are directed to the following sources:

OUTGOING MESSAGES TO CONTROLLER TYPE STATIONS

OPERATOR STATION DISPLAYS

INTERNAL OPERATOR STATION FUNCTIONS

HISTORICAL DATA BASE INFORMATION

The inputs to the operator station logic are gathered from the following sources:

INCOMING MESSAGES FROM CONTROLLER TYPE STATIONS

OPERATOR STATION UNDER SELECTIONS

INTERNAL OPERATOR STATION FUNCTIONS

PARAMETRIC AND HISTORICAL DATA BASE INFORMATION

C. Definitions

The following definitions are to be used as a guide for interpreting the intention of control logic statements:

CONTINUOUS—a product type that is active at all times while the press is printing (e.g., fluid circulators, fountain management systems, dryers, agitators, ink levelers) and is integral to the printing process.

NON-CONTINUOUS—a product type that is activated occasionally to perform a specific "spot" task (e.g., blanket cleaners, ink roller train cleaners, impression cylinder cleaners) and which will disrupt the printing process.

READY—a logical state indicating that a start for a non-continuous product may be initiated. The ready state is the logical inversion of the wash interlock, an input provided by the controller to indicate no faults exist.

FAULT—a physical condition or event which will terminate the active state of a product or prevent starting the product (e.g., solvent too low, selected unit out of cloth, press not at washing speed, controller in test mode, communications failure, product air pressure too low, etc).

ALARM (WARNING)—a condition which alerts the operator to take an action but does not prevent use of the product (e.g., unit cloth supply is low, water temperature too low/high, ink fountain level low, etc.).

WASH INTERLOCK—a condition provided by the controller indicating a fault exists and that a non-continuous product can not be started.

WASHING—a condition provided by the controller indicating a non-continuous product is currently active.

In the logic description for each controller type, shorthand conventions will be utilized to indicate the source and destination of information, as follows:

'CTLIN'—INCOMING MESSAGES FROM STATIONS

'CTLOUT'—OUTGOING MESSAGES TO STATIONS

'OPIN'—USER SELECTIONS AT OPERATOR STATION

'OPOUT'—DISPLAYS AT OPERATOR STATION

'OP-DATE', 'OP-TM', 'OP-FLH', 'OP-CNT', ETC. INTERNALLY GENERATED FUNCTIONS SUCH AS TIMERS, FLASH INTERVALS, COUNTERS, ETC.

'OPARM'—PARAMETER STORED IN OPERATOR STATION DATA BASE

'OPHIST'—HISTORY ENTRY IN OPERATOR STATION DATA BASE

D. Logic Overview

In very general terms, the following functions may be performed by the operator station:

1. Turn product power on or off—continuous products.
2. Start or stop product action—non-continuous products.

3. Provide indication of analog (ph, speed, temperature, etc.) and digital (equipment status, faults, alarms, etc.) signals.
4. Provide logic for warning conditions—analog thresholds, specific equipment status signal combinations.
5. Provide means for equipment parameter correction.

The hierarchy for operator station control logic is organized as follows:

I. Product Selection Level
1. Selection of product.
2. Display of operational status for each product. For example, referring to certain products produced by Baldwin Technology Corporation:
   NON-CONTINUOUS PRODUCTS
   a. "ABC(APW, AIC) READY"
   b. "ABC(APW,AIC) READY-ALARM"
   c. "ABC(APW,AIC) NOT READY-FAULT"
   CONTINUOUS PRODUCTS
   a. "FSMS(INK LEVEL, IR DRYER) RUNNING"
   b. "FSMS(INK LEVEL, IR DRYER) RUNNING-ALARM"
   c. "FSMS(INK LEVEL, IR DRYER) NOT RUNNING"
3. Annunciation (with visual/audio effects) of selected critical faults. A limited number of faults from each product is assigned to a global critical fault table at the time of installation. For example:
   !!!HEADER DISCONNECTED—UNIT #4, ABC!!!
   !!!ABNORMAL LEVEL—UNIT #7, INK LEVELER"!!!
   !!!OVERHEAT IMMINENT—IR DRYER!!!

II. Product Level
1. Selection of units within product.
2. Display of operational status for product and units:
   NON-CONTINUOUS PRODUCTS
   a. "ABC(APW,AIC) READY"
   b. "ABC(APW,AIC) READY—UNIT #4 LOW CLOTH"
   c. "ABC(APW,AIC) NOT READY—SOLVENT TANK #1 EMPTY"
   CONTINUOUS PRODUCTS
   a. "FSMS(INK LEVEL,IR DRYER) RUNNING"
   b. "FSMS(INK LEVEL,IR DRYER) RUNNING—TO 80% OVERHEAT
   c. "FSMS(INK LEVEL, IR DRYER) NOT RUNNING"

As previously noted, FIG. 18 illustrates in diagrammatic form the Operator Station Control Logic Flow.

Message Catalog

The mode of information transfer for system stations according to the invention is via the communications network using the "status" type of message. The data in a message is organized by character and by bits within characters (see FIG. 21 for an illustration of the message access hierarchy structure employed in conjunction with the system). The following serves to detail the content and function of all status messages and is organized by product. The following products produced by Baldwin Technology Corporation of Stamford, Conn. may be included. However it is to be understood that the invention is not so limited and is broadly applicable to a wide range of printing auxiliaries manufactured by various companies and known to those skilled in the art.

A. Q-90, SHEETFED AUTOMATIC BLANKET CLEANER (ABC)
B. Q-90, SHEETFED AUTOMATIC PRESS WASHER (APW)—PRELIMINARY NOTE: THE APW IS ALSO REFERRED TO AS "INK ROLLER TRAIN CLEANER" OR IRTC.
C. Q-90, SHEETFED AUTOMATIC IMPRESSION CYLINDER CLEANER (AIC)—PRELIMINARY
D. IVT INFRARED DRYER
E. FOUNTAIN SOLUTION MANAGEMENT SYSTEM (FSMS)

Reference is made to the following description to describe the data field character bit assignments for each of the products.

Control Logic for Control System

The software control means includes CONTROL LOGIC, whose function in the system operator station is to examine inputs, apply logic rules then update outputs. The control logic is schematically represented at FIG. 18. For simplicity of explanation, the control logic specifications are organized by product (as described above), as follows. However, it is to be understood to those skilled in the art that the invention is broadly applicable to a wide range of printing press auxiliaries and accessories as manufactured by known companies and, as such, control logic for such products may be implemented in accordance with the principles of the invention.

II. Q-90, Sheetfed Automatic Blanket Cleaner (ABC)

A. Logic for outgoing messages to controller:
1. START (CTLOUT)—IF start (OPIN) activated AND NOT wash interlock (CTLIN) AND NOT washing (CTLIN)
2. STOP (CTLOUT)—IF stop (OPIN) activated
3. UNIT #N (1–9), SELECTED FOR WASH (CTLOUT)-IF unit selected=printing unit select (OPIN) activated AND selected unit is in system configuration (CTLIN)
4.
   UNIT #N (1–9 & coater) PROGRAM NUMBER (CTLOUT),
   UNIT #N (1–9 & coater) FLUID AMOUNT (CTLOUT),
   UNIT #N (1–9 & coater) FLUID TYPE (CTLOUT),
   RETRIEVE values from wash tables (OPRAM) using ACCESS—ink type (OPIN) for UNIT #N, coverage (OPIN) for UNIT #N, paper (OPIN)
   OR RETRIEVE values from history (OPHIST) using ACCESS—job code (OPIN)
5. UNIT #N (1–9 & coater) DRYING ENABLED (CTLOUT)—IF air dry (OPIN) activated
   OR RETRIEVE enable from history (OPHIST) using ACCESS—job code (OPIN)

B. Logic for system indications to the operator station user:
1. NOT READY FOR WASH (OPOUT) with descriptor
   a. CONTROLLER IN TEST MODE (OPOUT)—IF wash interlock (CTLIN)
      AND NOT washing (CTLIN)
      AND test mode (CTLIN)
   b. PRESS NOT AT WASH SPEED (OPOUT)—IF wash interlock (CTLIN)
      AND NOT washing (CTLIN)
      AND speed interlock (CTLIN)
   c. PRIMARY SOLVENT TANK EMPTY (OPOUT)—IF wash interlock (CTLIN)
      AND NOT washing (CTLIN)

AND IF ANY printing units selected (OPIN)
AND in system configuration (CTLIN)
AND solvent supply #1 low d. COATER SOLVENT TANK EMPTY (OPOUT)—IF wash interlock (CTLIN)
AND NOT washing (CTLIN)
AND IF coater unit selected (OPIN)
AND coater is enabled (CTLIN)
AND solvent supply #2 low e. CLOTH UNIT #N OUT OF CLOTH (OPOUT)—IF wash interlock (CTLIN)
AND NOT washing (CTLIN)
AND IF ANY printing units selected (OPIN)
AND in system configuration (CTLIN)
AND out of cloth (CTLIN)
AND NOT low cloth warning (CTLIN)
OR IF coater unit selected (OPLIN)
AND coater is enabled (CTLIN)
AND out of cloth (CTLIN)
AND NOT low cloth warning (CTLIN)

f. CLOTH UNIT #N HEADER DISCONNECTED (OPOUT)—IF wash interlock (CTLIN)
AND NOT washing (CTLIN)
AND IF ANY printing units selected (OPIN)
AND in system configuration (CTLIN)
AND out of cloth (CTLIN)
AND low cloth warning (CTLIN)
OR IF coater unit selected (OPIN)
AND coater is enabled (CTLIN)
AND out of cloth (CTLIN)
AND low cloth warning (CTLIN)

g. NO UNITS SELECTED FOR WASH (OPOUT)—IF NOT wash interlock (CTLIN)
AND NOT washing (CTLIN)
AND IF NO printing units selected (OPIN)
AND in system configuration (CTLIN)
OR IF coater unit NOT selected (OPIN)
AND coater is enabled (CTLIN)

h. UNKNOWN FAULT (OPOUT)—IF wash interlock (CTLIN)
AND NOT washing (CTLIN)
AND NOT test mode (CTLIN)
AND NOT speed interlock (CTLIN)
AND IF ANY printing units selected (OPIN)
AND in system configuration (CTLIN)
AND NOT solvent supply #1 low (CTLIN)
AND NOT out of cloth (CTLIN AND IF coater unit selected (OPIN)
AND coater is enabled (CTLIN)
AND NOT solvent supply #2 low (CTLIN)
AND NOT out of cloth (CTLIN)

C. Logic for unit indications to the operator station user:

1. UNIT SELECTED FOR WASH (OPOUT)—IF printing unit selected (OPIN)
AND in system configuration (CTLIN)

2. UNIT CLOTH STATUS (OPOUT)

a. OUT OF CLOTH (OPOUT)—IF in system configuration (CTLIN)
AND out of cloth (CTLIN)
AND NOT low cloth warning (CTLIN)
OR IF coater is enabled (CTLIN)
AND out of cloth (CTLIN)
AND NOT low cloth warning (CTLIN)

b. HEADER DISCONNECTED (OPOUT)—IF in system configuration (CTLIN)
AND out of cloth (CTLIN)
AND low cloth warning (CTLIN)
OR IF coater is enabled (CTLIN)
AND out of cloth (CTLIN)
AND low cloth warning (CTLIN)

c. LOW CLOTH WARNING(OPOUT)—IF in system configuration (CTLIN)
AND NOT out of cloth (CTLIN)
AND low cloth warning (CTLIN)
OR IF coater is enabled (CTLIN)
AND NOT out of cloth (CTLIN)
AND low cloth warning (CTLIN)

d. CLOTH SUPPLY NORMAL (OPOUT)—IF in system configuration (CTLIN)
AND NOT out of cloth (CTLIN)
AND NOT low cloth warning (CTLIN)
OR IF coater is enabled (CTLIN)
AND not out of cloth (CTLIN)
AND NOT low cloth warning (CTLIN)

3.
UNIT NUMBER OF DISPENSES=_(OPOUT),
UNIT NUMBER OF PADONS=_(OPOUT),
UNIT FLUID AMOUNT=_(OPOUT),
UNIT FLUID TYPE=_(OPOUT),
UNIT AIR DRY IS_(OPOUT),
IF printing unit selected (OPIN)
AND in system configuration (CTLIN)
OR If coater unit selected (OPIN)
AND coater is enabled (CTLIN)
AND IF display wash parameters (OPIN)
RETRIEVE values from wash tables (OPRAM)
using ACCESS—ink type (OPIN) for UNIT #N, coverage (OPIN) for UNIT #N, paper (OPIN) air dry (OPIN)

D. Logic for entries into the history portion of the data base.

1.
UNIT #N (1–9 & coater) PROGRAM NUMBER (OPHIST),
UNIT #N (1–9 & coater) FLUID AMOUNT (OPHIST),
UNIT #N (1–9 & coater) FLUID TYPE (OPHIST),
UNIT #N (1–9 & coater) AIR DRY ENABLED (OPHIST),
UNIT #N (1–9 & coater) INK TYPE (OPHIST),
UNIT #N (1–9 & coater) COVERAGE (OPHIST),
UNIT #N (1–9 & coater) PAPER TYPE (OPHIST),
IF printing unit selected OPIN)
AND in system configuration (CTLIN)
OR IF coater unit selected (OPIN)
AND coater is enabled (CTLIN)
AND enter job code identification (OPIN)
AND activate save job code (OPIN)
AND using—ink type (OPIN) for UNIT #N, coverage (OPIN) for UNIT #N, paper type (OPIN)
ACCESS—program number (OPRAM), fluid amount (OPRAM), fluid type (OPRAM), air dry enabled (OPRAM)
APPEND time/date stamp (OP_DATE)
STORE values in newest history (OPHIST)
IF total history entries GREATER THAN 5
DELETE oldest history (OPHIST)

2. UNIT #N (1–9 & coater ) WASHED (OPHIST)—IF printing unit selected (OPIN)
AND in system configuration (CTLIN)
OR IF coater unit selected (OPIN)
AND coater is enabled (CTLIN)

AND IF washing (CTLIN)
THEN NOT washing (CTLIN)
APPEND time/date stamp (OP_DATE)
INCREMENT count in newest history for all statistical time periods (OPHIST)

E. Logic for entries into the parameter portion of the data base: NONE

The following logic is active at all times, whether or not the ABC is selected or user control:

A. Logic for outgoing messages to controller: NONE

B. Logic for system indications to the operator station user:

1. READY FOR WASH (OPOUT)—IF NOT wash interlock (CTLIN)
AND NOT washing (CTLIN)

2. NOT READY FOR WASH (OPOUT)—IF wash interlock (CTLIN)

C. Logic for unit indications to the operator station user: NONE

D. Logic for entries into the history portion of the data base.

1. UNIT #N (1–9 & coater ) CLOTH ROLL REPLACED (OPHIST)—IF press unit in system configuration(CTLIN)

OR If coater unit is enabled (CTLIN)

AND NOT maintenance hold (OPIN)
AND out of cloth (CTLIN)
THEN NOT out of cloth (CTLIN)
APPEND time/date stamp (OP_DATE)
INCREMENT count in newest history for all statistical time periods (OPHIST)

E. Logic for entries into the parameter portion of the data base:

1.
PROGRAM #N (1–12) NUMBER OF DISPENSES (OPRAM),
PROGRAM #N (1–12) NUMBER OF PADONS (OPRAM)
STORE program #N number of dispenses (CTLIN) corrected by adding 1
STORE program #N number of dispenses (CTLIN) corrected by adding 3

Q—90, SHEETFED AUTOMATIC PRESS WASHER (APW) The following logic is active when the APW is selected for user control:

A. Logic for outgoing messages to controller:

1. START (CTLOUT)—IF start (OPIN) activated
AND NOT wash interlock (CTLIN)
AND NOT washing (CTLIN)

2. STOP (CTLOUT)—IF stop (OPIN) activated

3. UNIT #N (1–9), SELECTED FOR WASH (CTLOUT)—IF unit selected=printing unit select (OPIN) activated
AND selected unit is in system configuration (CTLIN)

4.
UNIT #N (1–9) PROGRAM NUMBER (CTLOUT),
UNIT #N (1–9) FLUID AMOUNT SELECT (CTLOUT),
RETRIEVE values from wash tables (OPRAM) using ACCESS—program table identification (CTLIN) ink type (OPIN) for UNIT #N, coverage (OPIN) for UNIT #N,
OR RETRIEVE values from history (OPHIST) using ACCESS—job code (OPIN)

B. Logic for system indications to the operator station user:

1. NOT READY FOR WASH (OPOUT) with descriptor a. CONTROLLER IN TEST MODE (OPOUT)—IF wash interlock (CTLIN)
AND NOT washing (CTLIN)
AND NOT test mode (CTLIN)

b. PRESS NOT AT WASH SPEED (OPOUT)—IF wash interlock (CTLIN)
AND NOT washing (CTLIN)
AND speed interlock (CTLIN)

c. SOLVENT TANK #1 EMPTY (OPOUT) IF wash interlock (CTLIN)
AND Not washing (CTLIN)
AND IF ANY printing units selected (OPIN)
AND in system configuration (CTLIN)
AND wash table is using fluid #1 for any dispense cycle (OPARM)
AND solvent supply #1 low d. SOLVENT TANK #2 EMPTY (OPOUT)—IF wash interlock (CTLIN)
AND NOT washing (CTLIN)
AND IF ANY printing units selected (OPIN)
AND in system configuration (CTLIN)
AND wash table is using fluid #2 for any dispense cycle (OPARM)
AND solvent supply #2 low e. SOLVENT TANK #3 EMPTY (OPOUT)—IF wash interlock (CTLIN)
AND NOT washing (CTLIN)
AND IF ANY printing units selected (OPIN)
AND in system configuration (CTLIN)
AND wash table is using fluid #3 for any dispense cycle (OPARM)
AND solvent supply #3 low f. NO UNITS SELECTED FOR WASH (OPOUT)—IF NOT wash interlock (CTLIN)
AND NOT washing (CTLIN)
AND IF NO printing units selected (OPIN)
AND in system configuration (CTLIN)

h. UNKNOWN FAULT (OPOUT)—IF wash interlock (CTLIN)
AND NOT washing (CTLIN)
AND NOT test mode (CTLIN)
AND NOT speed interlock (CTLIN)
AND IF ANY printing units selected (OPIN)
AND in system configuration (CTLIN)
AND IF wash table is using fluid #1 (OPARM)
AND NOT solvent supply #1 low (CTLIN)
OR IF wash table is using fluid #2 (OPARM)
AND NOT solvent supply #2 low (CTLIN)
OR IF wash table is using fluid #3 (OPARM)
AND NOT solvent supply #3 low (CTLIN)

C. Logic for unit indications to the operator station user:

1. UNIT SELECTED FOR WASH (OPOUT) -
IF printing unit selected (OPIN)
AND in system configuration (CTLIN)

2. UNIT DISPENSE CYCLE #1 FLUID TYPE = (OPOUT)
UNIT DISPENSE CYCLE #1 NUMBER OF SPRAYS = (OPOUT),
UNIT DISPENSE CYCLE #2 FLUID TYPE = (OPOUT),
UNIT DISPENSE CYCLE #3 FLUID TYPE =

-continued (OPOUT),
⋮ ⋮ ⋮
UNIT DISPENSE CYCLE #N FLUID TYPE
(OPOUT),
UNIT FLUID AMOUNT = SELECT = (OPOUT),
IF printing unit selected (OPIN) AND in system configuration (CTLIN)
AND IF display wash parameters (OPIN)
RETRIEVE values from wash tables (OPRAM)
using ACCESS -
program table identification (CTLIN),
ink type (OPIN) for UNIT #N,
coverage (OPIN) for UNIT #N D. Logic for entries into the history portion of the data base.

1.

UNIT #N (1–9) PROGRAM NUMBER (OPHIST),
UNIT #N (1–9) FLUID AMOUNT SELECT (OPHIST),
UNIT #N (1–9) INK TYPE (OPHIST),
UNIT #N (1–9) COVERAGE (OPHIST),
IF printing unit selected (OPIN)
AND in system configuration (CTLIN)
AND enter job code identification (OPIN)
AND activate save job code (OPIN)
AND using—ink type (OPIN) for UNIT #N, coverage (OPIN) for UNIT #N,
ACCESS program table identification (CTLIN) program number (OPRAM), fluid amount select (OPRAM),
APPEND time/date stamp (OP_DATE)
STORE values in newest history (OPHIST)
IF total history entries GREATER THAN 5 DELETE oldest history (OPHIST).

2. UNIT #N (1–9) WASHED (OPHIST)—IF printing unit selected (OPIN)
AND in system configuration (CTLIN)
THEN NOT washing (CTLIN)
APPEND time/date stamp (OP_DATE)
INCREMENT count in newest history for all statistical time periods (OPHIST)

E. Logic for entries into the parameter portion of the data base: NONE

The following logic is active at all times, whether or not the APW is selected for user control:

A. Logic for outgoing messages to controller: NONE

B. Logic for system identifications to the operator station user:

1. READY FOR WASH (OPOUT)—IF NOT wash interlock (CTLIN)
AND NOT washing (CTLIN)

2. NOT READY FOR WASH (OPOUT)
If wash interlock (CTLIN)

C. Logic for unit indications to the operator station user: NONE

D. Logic for entries into the history portion of the data base. NONE

E. Logic for entries into the parameter portion of the data base:

1.

PROGRAM TABLE IDENTIFICATION (OPARM),
PROGRAM #M (1–16), # SPRAYS, DISPENSE CYCLE #1 (OPARM),
PROGRAM #M (1–8), DISPENSE CYCLE #N FLUID TYPE (OPARM),
PROGRAM #M (9–16), DISPENSE CYCLE #N FLUID TYPE (OPARM),
STORE program table identification (CTLIN)
STORE program #M number of sprays, 1st dispense cycle (CTLIN) corrected by adding 1
STORE program #M dispense cycle #N fluid type (CTLIN) interpreted as:
0=not used
1=fluid #1
2=fluid #2
3=fluid #3

Q-90, Sheetfed Automatic Impression Cylinder Cleaner (AIC)

The following logic is active when the AIC is selected for user control:

A. Logic for outgoing messages to controller:

1. START (CTLOUT)—IF start (OPIN) activated
AND NOT wash interlock (CTLIN)
AND NOT washing (CTLIN)

2. STOP (CTLOUT)—IF stop (OPIN) activated

3. START WITH ABC (CTLOUT)—IF ABC W/AIC wash (OPIN)
AND IF start (OPIN) activated
AND NOT wash interlock (CTLIN)
AND NOT washing (CTLIN)

4. UNIT #N (1–9), SELECTED FOR WASH (CTLOUT)—IF unit selected=printing unit select (OPIN) activated
AND selected unit is in system configuration (CTLIN)

5.
UNIT #N (1–9) PROGRAM NUMBER (CTLOUT)
UNIT #N (1–9) FLUID AMOUNT (CTLOUT)
RETRIEVE values from wash tables (OPARM) using ACCESS—paper (OPIN)
OR RETRIEVE values from history (OPHIST) using ACCESS—job code (OPIN)

6. UNIT #N (1–9) DRYING ENABLED (CTLOUT)—IF air dry (OPIN) activated
OR RETRIEVE enable from history (OPHIST) using ACCESS—job code (OPIN)

B. Logic for system indications to the operator station user:

1. NOT READY FOR WASH (OPOUT) with descriptor a. CONTROLLER IN TEST MODE (OPOUT)—IF wash interlock (CTLIN)
AND NOT washing (CTLIN
AND test mode (CTLIN)

b. PRESS INTERLOCK ACTIVE (OPOUT)—IF wash interlock (CTLIN)
AND NOT washing (CTLIN)
AND press interlock (CTLIN)

c. SOLVENT TANK EMPTY (OPOUT)—IF wash interlock (CTLIN)
AND NOT washing (CTLIN)
AND IF ANY printing units selected (OPIN)
AND in system configuration (CTLIN)
AND solvent supply low d. WASH SYSTEM AIR PRESSURE TOO LOW (OPOUT)—IF wash interlock (CTLIN)
AND NOT washing (CTLIN)
AND IF ANY printing units selected (OPIN)
AND in system configuration (CTLIN)
AND low air e. CLOTH UNIT #N OF CLOTH (OPOUT)—IF wash interlock (CTLIN)

AND If NOT washing (CTLIN)
AND IF ANY printing units selected (OPIN)
AND in system configuration (CTLIN)
AND out of cloth (CTLIN)
AND NOT low cloth warning (CTLIN)

f. CLOTH UNIT #N HEADER DISCONNECTED (OPOUT)—IF wash interlock (CTLIN)
AND NOT washing (CTLIN)
AND IF ANY printing units selected (OPIN)
AND in system configuration (CTLIN)
AND out of cloth (CTLIN)
AND low cloth warning (CTLIN)

g. CLOTH UNIT #N FEED FAULT (OPOUT)—IF wash interlock (CTLIN)
AND NOT washing (CTLIN)
AND IF ANY printing units selected (OPIN)
AND in system configuration (CTLIN)
AND cloth feed fault (CTLIN)

h. CLOTH UNIT #N POSITION DOWN (OPOUT)—IF wash interlock (CTLIN)
AND NOT washing (CTLIN)
AND IF ANY printing units selected (OPIN)
AND in system configuration(CTLIN)
AND unit position down (CTLIN)

i. CLOTH UNIT #N GUIDE DOWN (OPOUT)—IF wash interlock (CTLIN)
AND NOT washing (CTLIN)
AND IF ANY printing units selected (OPIN)
AND in system configuration (CTLIN)
AND guide down (CTLIN)

j. NOT UNITS SELECTED FOR WASH (OPOUT)—IF NOT wash interlock (CTLIN)
AND NOT washing (CTLIN)
AND IF NO printing units selected (OPIN)
AND in system configuration (CTLIN)

k. UNKNOWN FAULT (OPOUT)—IF wash interlock (CTLIN)
AND NOT washing (CTLIN)
AND NOT test mode (CTLIN)
AND NOT speed interlock (CTLIN)
AND IF ANY printing units selected (OPIN)
AND in system configuration (CTLIN)
AND NOT solvent supply #1 low (CTLIN)
AND NOT out of cloth (CTLIN)
AND NOT cloth feed fault (CTLIN)
AND NOT unit position down (CTLIN)
AND NOT guide down (CTLIN)

C. Logic for unit indications to the operator station user:

1. UNIT SELECTED FOR WASH (OPOUT)
IF printing unit selected (OPIN)
AND in system configuration (CTLIN)

2. UNIT APPLIANCE STATUS (OPOUT) with descriptor a. OUT OF CLOTH (OPOUT)—IF in system configuration (CTLIN)
AND out of cloth (CTLIN)
AND NOT low cloth warning (CTLIN)

b. HEADER DISCONNECTED (OPOUT)—IF in system configuration (CTLIN)
AND out of cloth (CTLIN)
AND low cloth warning (CTLIN)

c. LOW CLOTH WARNING (OPOUT)—IF in system configuration (CTLIN)
AND NOT out of cloth (CTLIN)
AND low cloth warning (CTLIN)

d. CLOTH SUPPLY NORMAL (OPOUT)-IF in system configuration (CTLIN)
AND NOT out of cloth (CTLIN)
AND NOT low cloth warning (CTLIN)

e. CLOTH FEED FAULT (OPOUT)—IF in system configuration (CTLIN)
AND NOT cloth feed fault (CTLIN)

f. POSITION DOWN (OPOUT)—IF in system configuration (CTLIN)
AND NOT unit portion down (CTLIN)

g. GUIDE DOWN (OPOUT)—IF in system configuration (CTLIN)
AND NOT guide down (CTLIN)

3.
UNIT NUMBER OF DISPENSES=_(OPOUT),
UNIT NUMBER OF PADONS=_(OPOUT),
UNIT WATER DISPENSES ARE_(OPOUT),
IF printing unit selected (OPIN)
AND in system configuration (CTLIN)
AND IF display wash parameters (OPIN)
RETRIEVE values from wash tables (OPARM) using ACCESS—paper (OPIN)

D. Logic for entries into the history portion of the data base.

1.
UNIT #N (1–9) PROGRAM NUMBER (OPHIST),
UNIT #N (1–9) FLUID AMOUNT (OPHIST),
UNIT #N (1–9) PAPER TYPE (OPHIST)—IF printing unit selected (OPIN)
AND in system configuration (CTLIN)
AND enter job code identification (OPIN)
AND activate save job code (OPIN)
AND using—paper type (OPIN)
ACCESS—program number (OPARM), fluid amount (OPARM), water enabled (OPARM)
APPEND time/date stamp (OP_DATE)
STORE values in newest history (OPHIST)
IF total history entries GREATER THAN 5 DELETE oldest history (OPHIST)

2. UNIT #N (1–9) WASHED (OPHIST)—IF printing unit selected (OPIN)
AND in system configuration (CTLIN)
AND IF washing (CTLIN)
THEN NOT washing (CTLIN)
APPEND time/date stamp (OP_DATE)
INCREMENT count in newest history for all statistical time periods (OPHIST)

E. Logic for entries into the parameter portion of the data base: NONE

111

The following logic is active at all times, whether or not the AIC is selected for user control:

A. Logic for outgoing messages to controller: NONE

B. Logic for system indications to the operator station user:

1. READY FOR WASH (OPOUT)—IF NOT wash interlock (CTLIN)
AND NOT washing (CTLIN)

C. Logic for unit indications to the operator station user: NONE

D. Logic for entries into the history portion of the data base.

1. UNIT #N (1–9) CLOTH ROLL REPLACED (OPHIST)—IF press unit in system configuration (CTLIN)
AND NOT maintenance hold (OPIN)
AND out of cloth (CTLIN)
THEN NOT out of cloth (CTLIN)

APPEND time/date stamp (OP_DATE)

INCREMENT count in newest history for all statistical time periods (OPHIST)

E. Logic for entries into the parameter portion of the data base:

1.

PROGRAM #N (1–12) NUMBER OF DISPENSES (OPARM),

PROGRAM #N (1–12) NUMBER OF PADONS (OPARM)—PROGRAM #N (1–12) # WATER DISPENSES (OPARM)—STORE program #N number of dispenses (CTLIN) corrected by adding 3

STORE program #N number of padons (CTLIN) corrected by multiplying by 2 and adding 13

STORE program #N number of water dispenses (CTLIN) interpreted as:

0=none

1=1st dispense in water, rest are solvent

2=1st and 2nd dispenses are water, rest are solvent

7=1st thru 7th dispenses are

.

.

. water, rest are solvent.

3. The Screen Layout System

Advantageously, the software control means also includes a plurality of individual "screens" that appear on the touch screen CRT 183A. It is through the screen that the pressman 182 is able to enter various print parameters and by which the pressman manipulates the press auxiliaries and accessories 183 (and, hence, the print conditions) so as to operate the invention.

The following will describe the format of each screen and individual graphical controls within each screen and describe the screen specifications form the point of view of the pressman.

The screens that generally form the operator's console are as follows:

Equipment selection 40

Printing Parameters 50

System Display 100

Operator Panels 120

Context Sensitive Help

A number of different graphical user interface "(GUI)" components may be used in the system. Some of these components are used to display information to the pressman, some are used to get information from the user, and in many cases, a control will perform both tasks. For simplicity, the term "widget" will be used to refer to GUI components.

(1) Text Widget 10

A Text widget 10 is used to display textual information. Each text widget will be wrapped in a boarder and will display one or more lines of text. The appearance of the text will change based on the following:

1. Font
2. Font Size
3. Color
4. Blinking/Normal

An example of a text field is shown in FIG.

(2) Button Widget

Buttons are used to perform an action. A button can be identified by the use of a raised three-dimensional area. Pressing the button and releasing it will activate the function. Pressing the button, dragging one's finger off the button, and then releasing will NOT activate the function. A button will either contain a text message or a graphical symbol. For ease of use, a minimum size of a button may be, for example, ½"×½".

(3) Scroll Bar Widget 20

Figure 2:
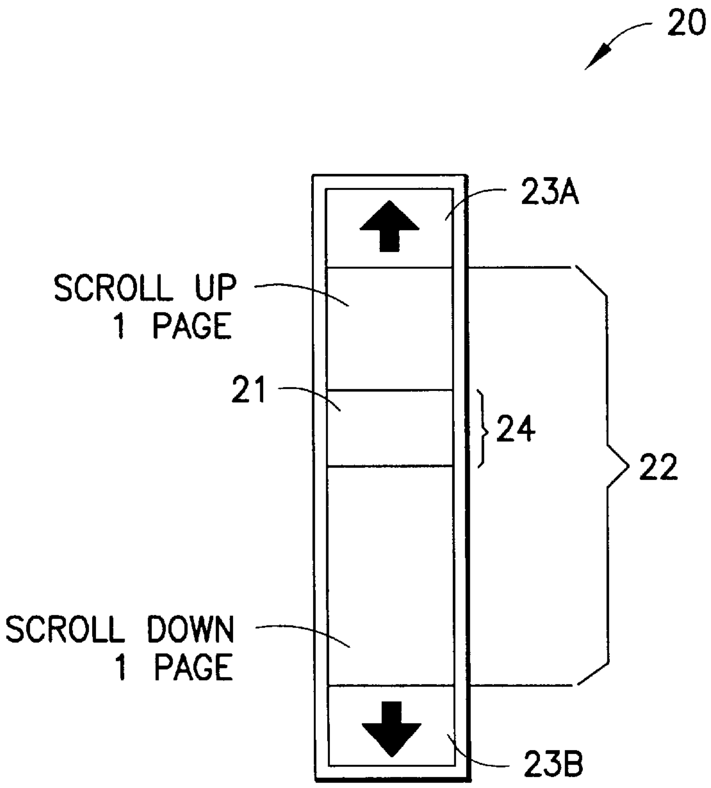
FIG. 2 depicts a vertical scroll bar for navigating data on the screen.

Scroll bars 20 are used to navigate through data that can not be completely displayed on the screen. A scroll bar 20 is composed of a slider 21, moving within an element 22 that indicates the full size of the scrolled data, and two buttons 23A, 23B with arrow graphics for moving the slider 21. The slider 21 indicates the relative position and size of the visible area 24 of the scrolled data. A vertical scroll bar 20 is illustrated at FIG. 2.

The width of the scroll bar 20 can be ½". The size of the data 22 being scrolled is represented in the scroll bar 20 in the form of a bar that extends from the up arrow 23A to the down arrow 23B. The slider 21 serves three purposes. Its first use is to scroll to an arbitrary position in the data 22. To do this, one many press the slider button 21 and drag it up or down, and then release the button when one has seen the desired data. The location of the slider 21 represents the position of the visible data 24. For example, if the slider 21 is located just above the down arrow 23B, the visible data 24 is located toward the end of the data 22. For concurrence, one can configure the slider 21 in a manner to represent the ratio of the size of the visible data to size of all the data. A very small slider 21 means one is scrolling through a lot of data.

Figure 3:
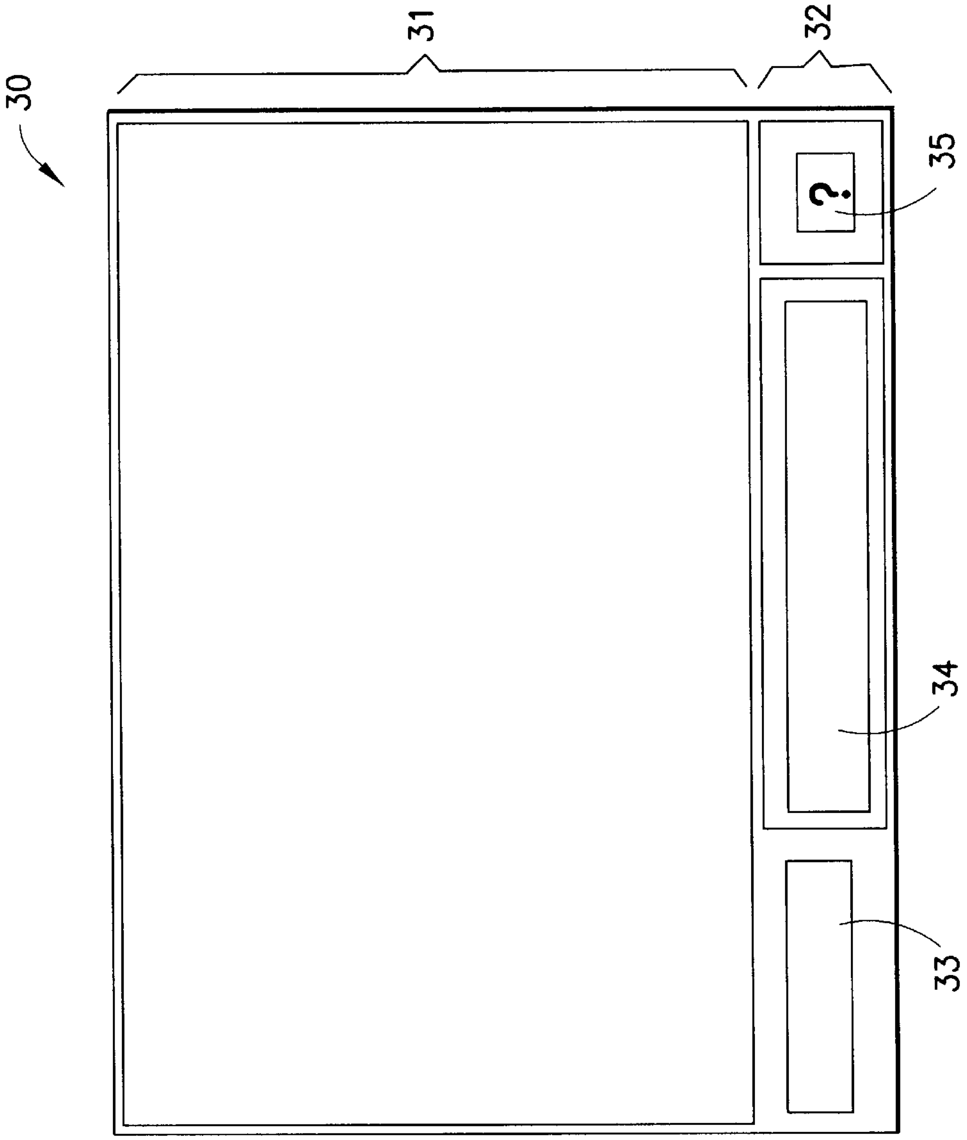
FIG. 3 depicts the general screen layout, including the work and common areas.

The General Screen Layout 30 will now be described, referring to FIG. 3.

Each screen may consist, for example, of two areas: 1) the work area 31; and 2) the common area 32. The work area 31 is where most of the user's interactions with the device will take place. This area may be broken down into subareas, depending on the characteristics of a particular screen. The common area will be available on all screens and will contain the following fields:

The screen navigation button 33

The message box 34

The help button 35

Screen Navigation

The screen navigation button 33 which is located at the bottom left of the screen 30 may serve two purposes. The first is to display the title of the current screen. The second is to navigate to other screens. When the button is pressed, the operator will be presented with a list of accessible screens.

Message Area 34

The message area 34 will be used when a message needs to be presented to the user. The message area 34 will be a text wide.

Help Button 35

The help button 35 will access the context sensitive help facility.

Figure 4:
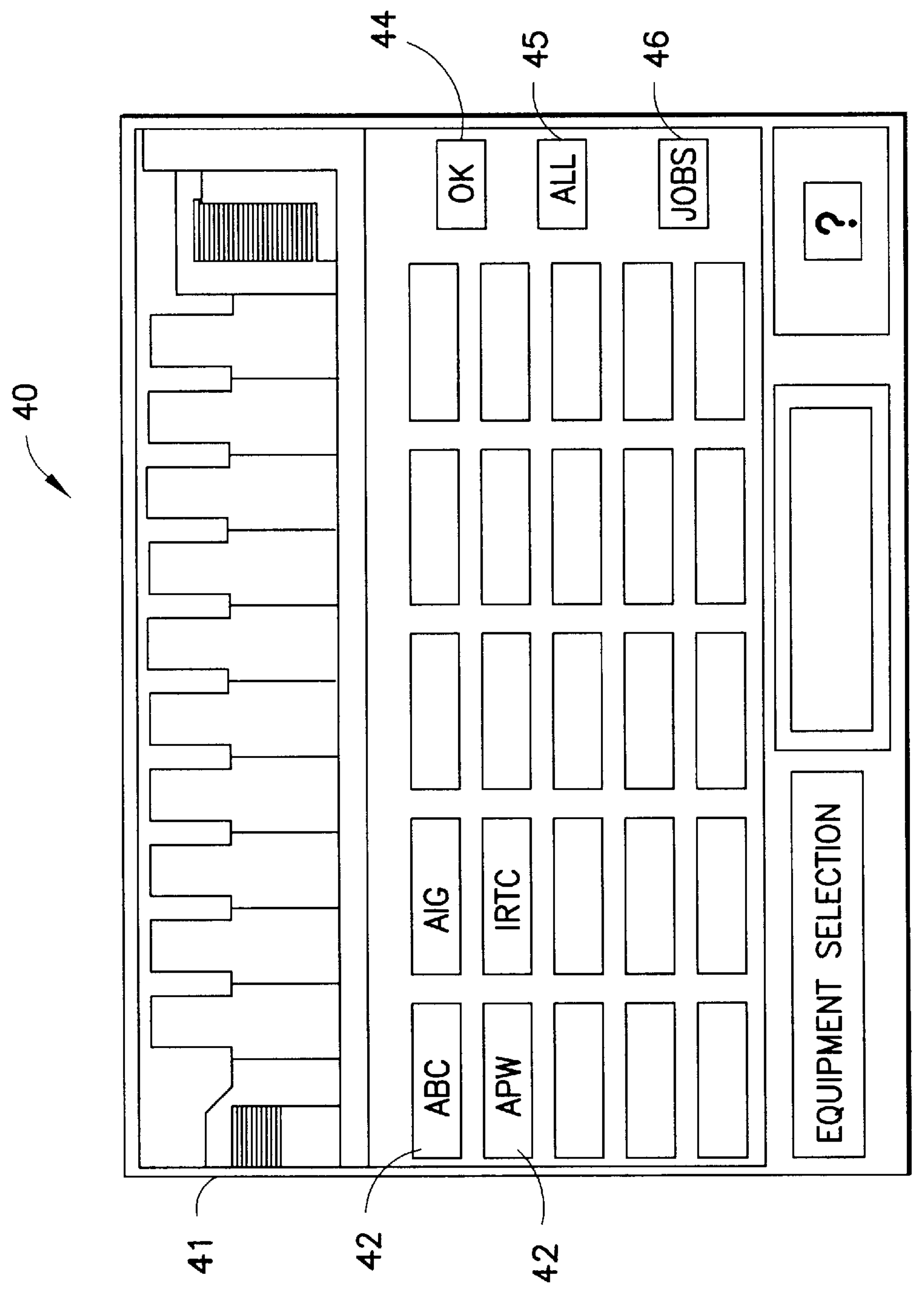
FIG. 4 illustrates an equipment selection screen employed to configure press auxiliaries and accessories.

An Equipment Selection Screen 40 is also provided for selective equipment selection (see FIG. 4)

This screen 40 is used to configure the press auxiliaries for a particular job. The number of devices on the press as depicted by the screen may be to the capacity of the network which, as described infra, provides address space for 56 devices. However, one skilled in the art will realize that more or less devices may appear, as necessary. Other screens will make use of the list of active auxiliaries to reduce the work required to configure the press auxiliaries. For example, if one does not select any ABC devices, the printing parameters screen will not display parameters that are required by the ABC. The work area of this screen contains three parts:

Press picture 41

One button for each auxiliary device 42

A column of function buttons 44, 45, 46

Press Picture 41

As seen at the top of FIG. 4, the press picture 41 will be displayed at the top of the screen 40. Each unit of the press will be implemented as a button and therefore will be selectable by passing on it. The graphical images that make up the press image are, for example, the:

Coater unit

Extended delivery unit

Printing unit

Infeed

Delivery

The press picture 41 may allow for a maximum of 10 units plus one infeed and one delivery component, although those skilled in the art will realize that greater depictions are possible (facilitated, of course, where a larger size CRT is employed). The images used to represent the press picture 41 may be configurable by the designer to facilitate the requirements of a particular press manufacturer.

Device Buttons 42 Matrix

The area in the center of the screen will contain one button 42 per auxiliary device on the press. The buttons 42 will resize themselves to fit the space allocated to them. As more and more devices are added, the buttons 42 will get smaller. When a minimum button size is reached, scroll bars may be displayed. These buttons 42 are used in the selection and deselection of auxiliary devices. Each button 42 may contain either a picture of the device or the device name or a combination of both, as desired.

"Selecting" & "Deselecting"

A device described as being selected is one that will be configured and monitored by the invention. The term "deselected" is not meant to indicate a device that is not installed on the press or powered down. Rather, the term indicates that a device will not be handled by the system in other screens. Certain screens will make use of the active list to reduce the amount of configuration required to setup the press auxiliaries.

Selecting/deselecting All Devices on a Unit

Each of the units in the press picture may be selectable by pressing on it. When a unit is pressed, all the auxiliary devices attached to that unit will become selected. If any device for a unit is on and the unit is pressed, all the devices on that unit will be deselected. Messages will appear in the message box to help the user through the selection process.

Selecting/deselecting Particular Devices on a Unit

The selection of individual devices is a three part process. First, one may select all the devices one wishes to select or deselect. Second, one may select the unit or units that one wishes the selection to apply. And finally, one may press OK 44 to finish the operation. Any devices that were selected will be deselected and any deselected devices will be selected. Messages will appear in the message box to help the user through the selection process.

BUTTON: All 45

The all button 45 may select all devices on each unit in the press. This button should be used when the operator wants to quickly select all auxiliary devices on the press.

BUTTON: Saving and Loading Configurations

To make the job of setting up the press easier and faster, press configurations will be stored to disk. Each configuration will be identified by a name typed in by the operator. A keyboard will be displayed for the purposes of typing in the configuration's identification. The following information will be stored in a configuration file:

1. Which devices are active
2. The value of each printing parameter
3. The value of each device parameter Pressing the jobs button 46 will present the operator with the options to: 1) Load a configuration, 2) Save a configuration, and 3) Delete a configuration.

Figure 5:
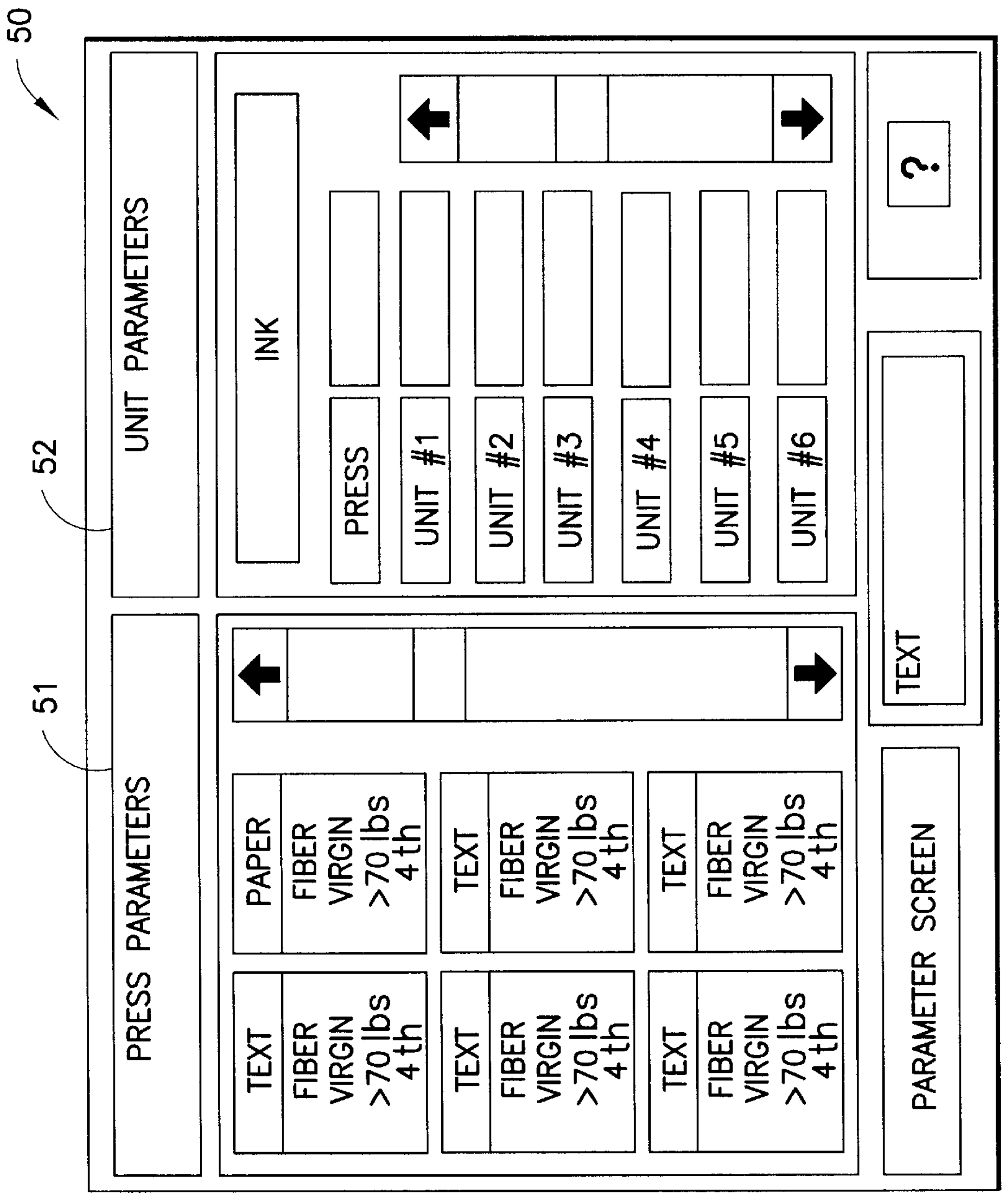
FIG. 5 illustrates a printing parameters screen employed to set varying print parameters for the screen.

A Printing Parameters Screen 50 is also provided (FIG. 5).

This screen 50 is used to set the printing parameters. Two types of parameters are presently contemplated: 1) Press wide 51 and 2) Unit specific 52, but those skilled in the art will realize that others may be devised or necessary. The press wide parameters 51 are located on the left portion of the screen 50 and unit specific 52 on the right.

Press Wide Parameters 51

Figure 6:
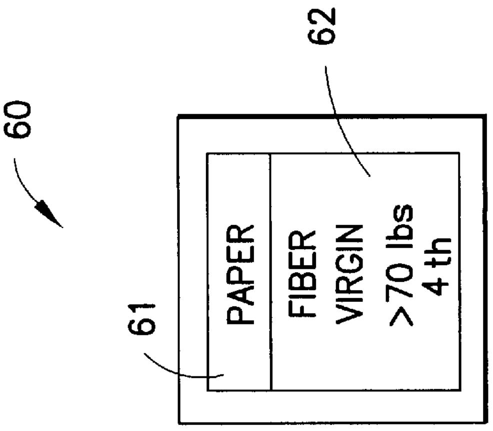
FIG. 6 depicts a print parameter as displayed on the screen.
Figure 9:
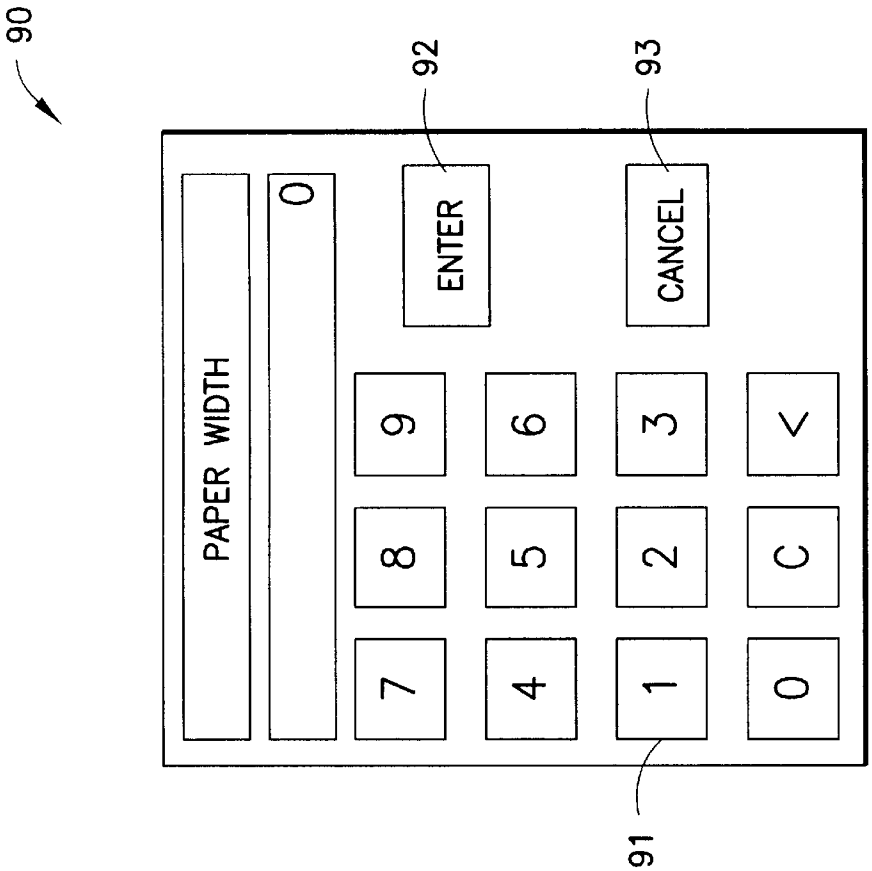
FIG. 9 illustrates a keypad input screen for inputting parameter values.

Press wide parameters 51 are those that apply to the entire press. An example of a parameter of this type would be paper. All devices, independent of the unit in which it is located, will get the same value for a given parameter of this type. The widget used to graphically display a parameter is structured as illustrated in FIG. 6.

The parameter name will be displayed in a button widget 61. The current value of the parameter will be displayed in a text widget 62 located just below the parameter name button 61. To change the value of a parameter, one may press the button. One will then be presented with one or more dialog boxes that will prompt the pressman through the valid values.

Unit Specific Parameters 52

Figure 7:
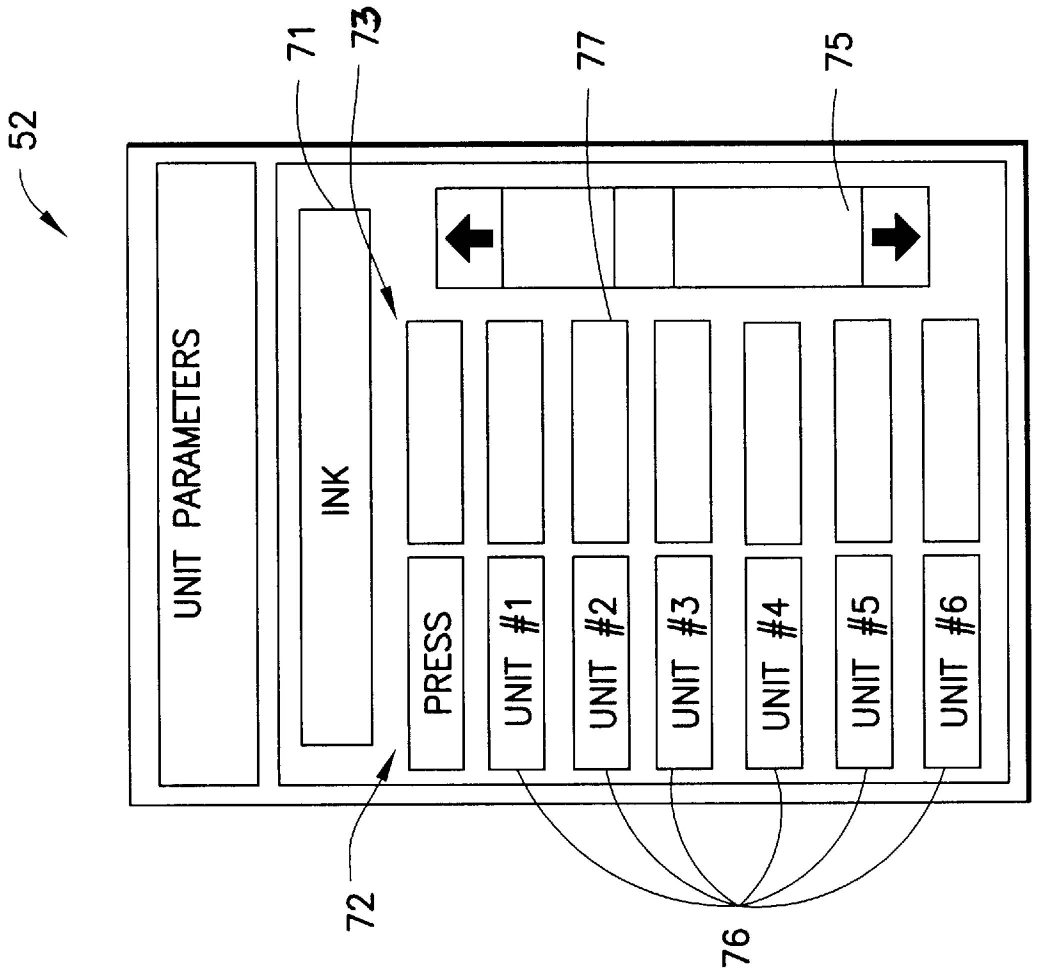
FIG. 7 illustrates a unit parameter screen according to the invention.

A unit parameter is one that can change from unit to unit. A typical unit specific parameter 52 is ink. The printing parameters screen will display only 1 unit specific parameter at a time. The structure of this portion of the screen is depicted at FIG. 7.

The parameter selection button 71 is used to select which parameter to display. When this button 71 is pressed, the operator will be presented with a list of valid options.

The scrollable area below the parameter selection button is used to display the current parameter settings. This area is made up of two columns of data 72, 73. The first column 72 is a button 76 and the second column 73 is a text widget 77 that displays the current value. Each button 76 will have a label in the form: Unit #n. For example, pressing the button labeled Unit #4 will change the value of the parameter for unit #4. A press wide value may be provided to make the setting of a unit parameter easier. If a particular parameter has a press wide value and a unit specific value, the unit value will take precedence. If a parameter has no unit specific value, the press wide value will be used.

A scroll bar 75 may be used if there is not enough space to display all 10 unit specific and 1 press wide parameters.

Changing Values

Regardless of whether the parameter being set forth is a press wide or unit specific, the same dialog boxes will be used to set the values. There are two types: 1) A list of values 80 and 2) A keypad 90.

List of Values 80

Figure 8:
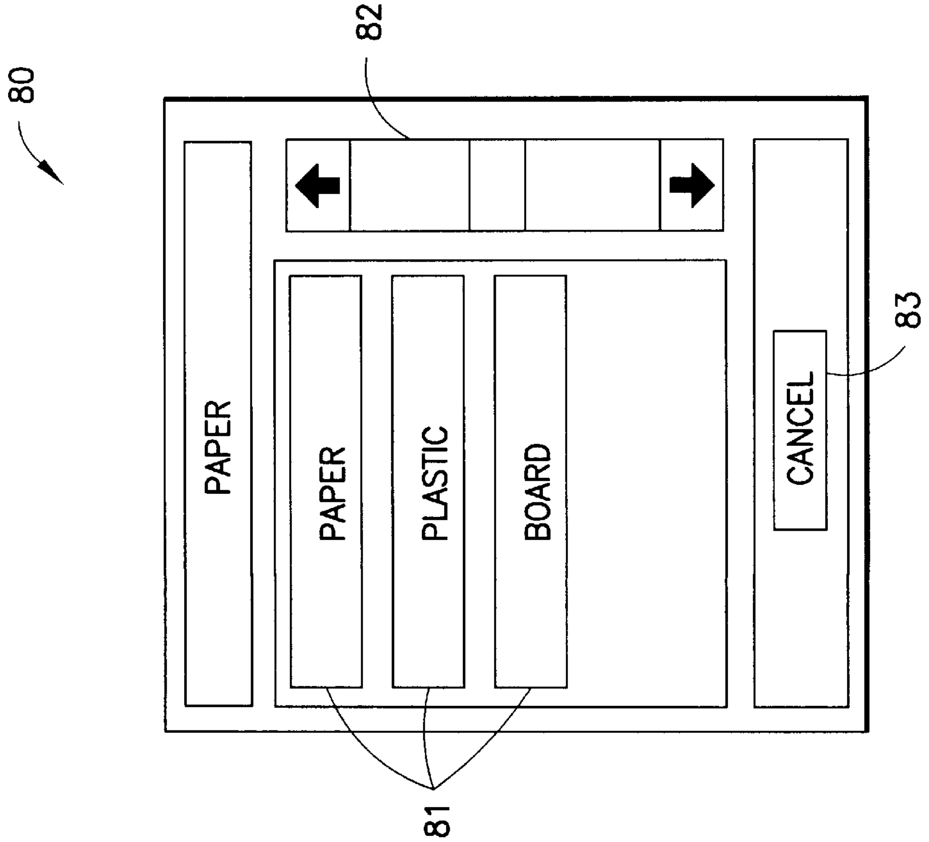
FIG. 8 depicts a screen for selecting values for the invention.

A list of values dialog 80 is used when the parameter value type is one of many. The dialog 80 contains a list of valid values 81 (each value is pressable button), a scroll bar 82, and a cancel button 83. It may appear as depicted at FIG. 8.

To select a value, one need just press the appropriate button 81. One may need to use the scroll bar 82 to gain access to the desired value. In many cases, after selecting a value, one will be presented with another list of options dialog or keypad 90. This is done because of the complex nature of some of the parameters. At any point one may press cancel 83 and the parameter will not be changed. Values will be listed in alphabetical or numerical value order.

Keypad 90

A keypad dialog 90 is used when the parameter value type is a number. The dialog contains a keypad 91, an enter button 92, and a cancel button 93. A sample keypad is shown in FIG. I.

In many cases, after selecting a value (pressing the enter button), one will be presented with another keypad 90 or a list of options dialog. This is done because of the complex nature of some of the parameters. At any point one may press cancel 93 and the parameter will not be changed.

Figure 10:
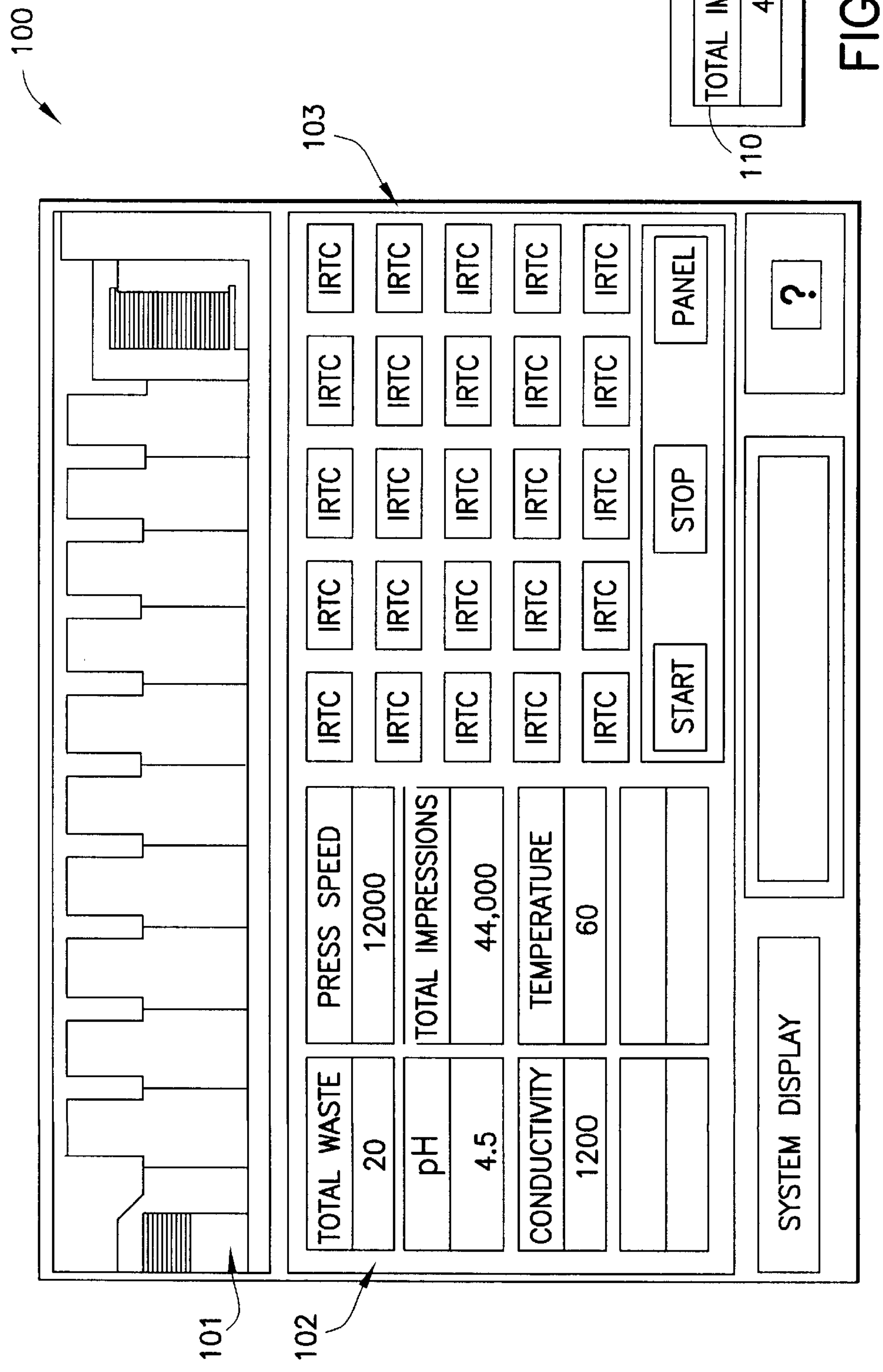
FIG. 10 depicts a system display screen wherein a pressman can monitor operation of the auxiliary devices.
Figure 11:
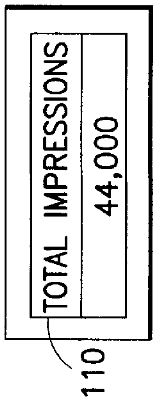
FIG. 11 depicts a screen for displaying process variables and current values.
Figure 12:
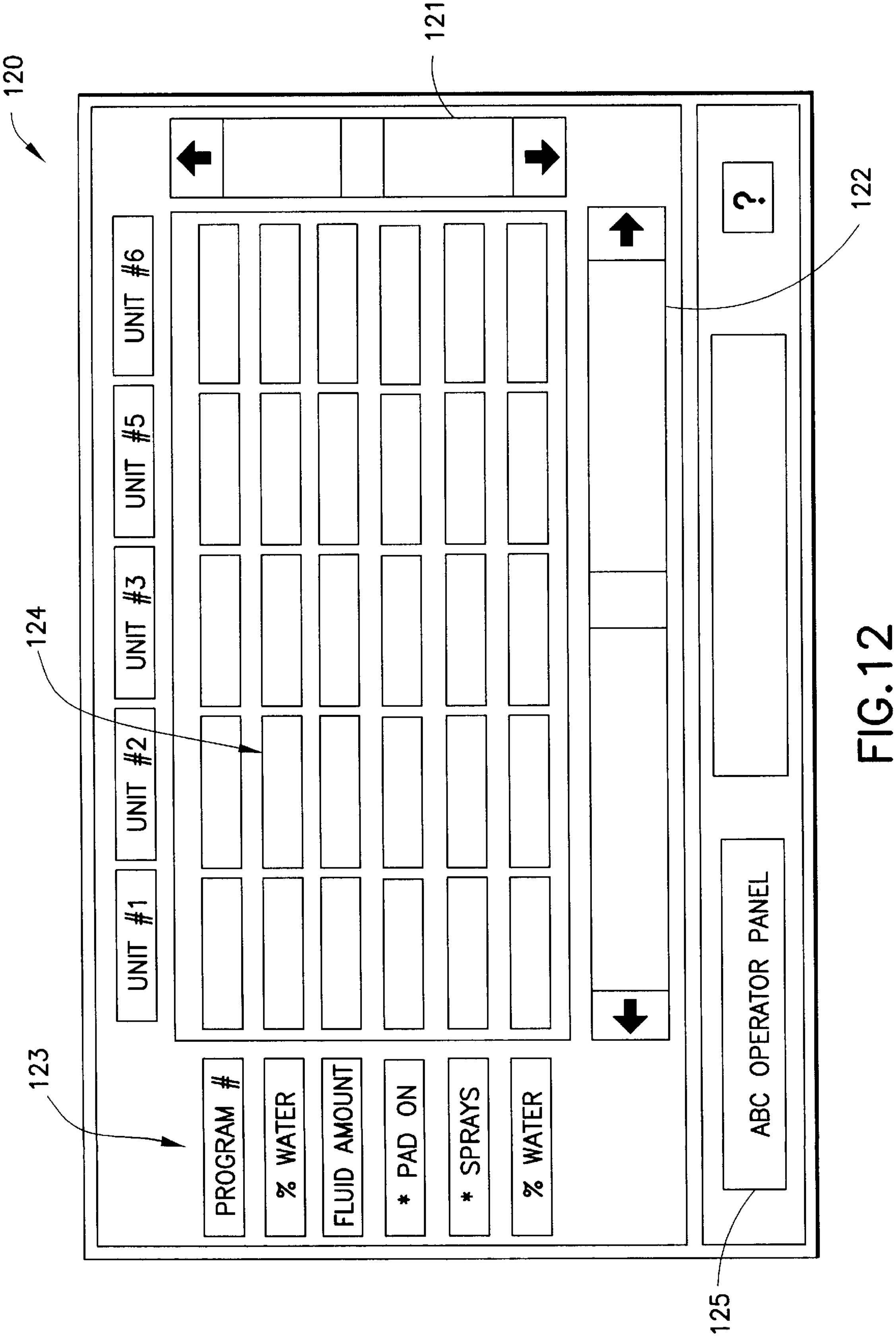
FIG. 12 depicts an operator panel screen.
Figure 13:
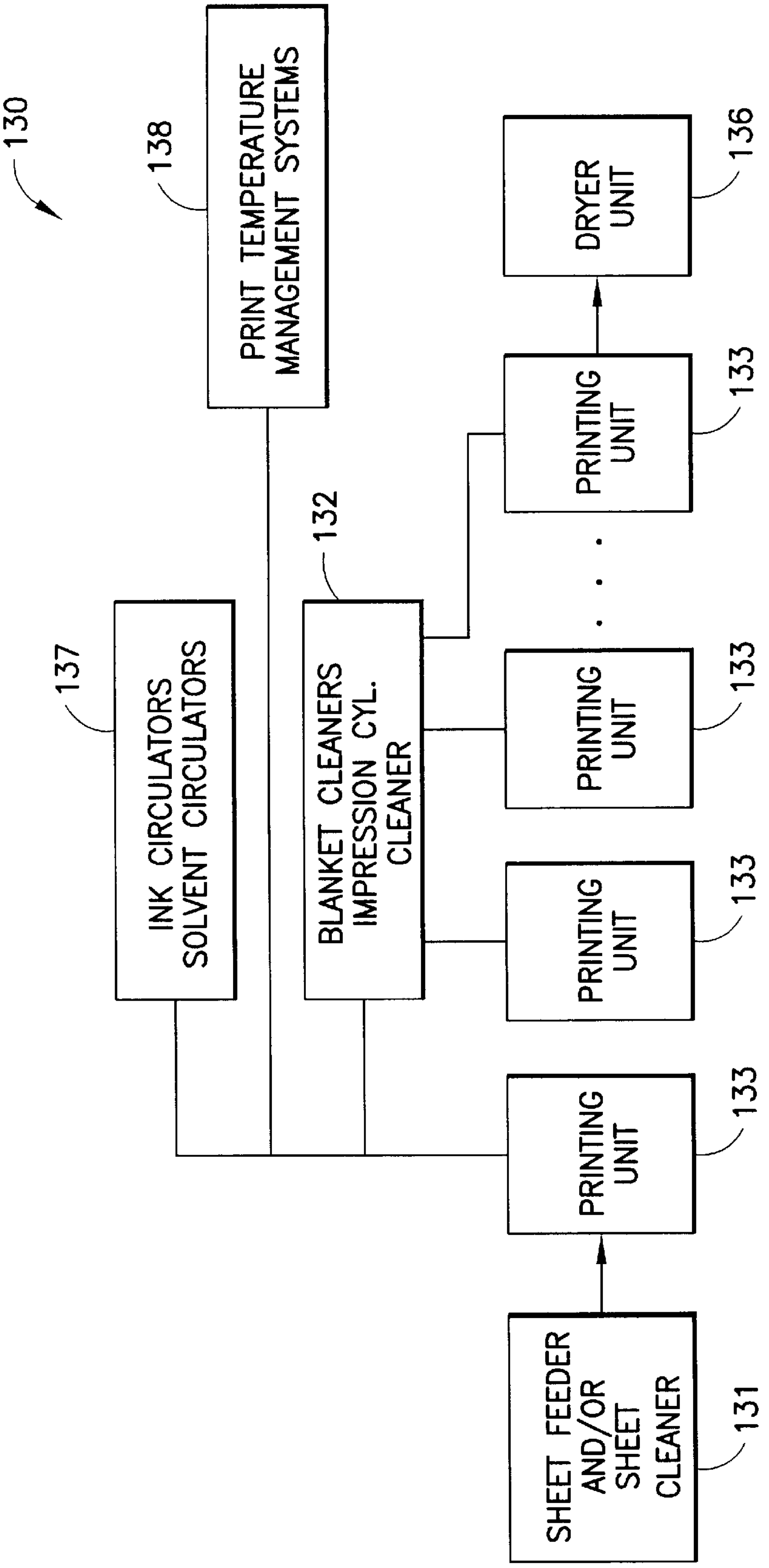
FIG.13 PRIOR ART
FIG. 13 is a schematic representation of a typical offset printing production line.

A System Display screen 100 is also provided (see FIG. 10).

The system display 100 is the screen where the operator can monitor the operation of the auxiliary devices. The work area 31 of this screen contains three parts:

Press picture 101

Process variable monitoring 102 (typically 9 Maximum of 8)

1 button for each auxiliary device 103 (typically a Maximum of 25)

Press Picture 101

The press picture 101 will be used for several purposes. First, it will display a colored square for each auxiliary that is active. The color of the square will indicate the state of the auxiliary. The following lists sample color schemes:

| Color | Meaning |
|---|---|
| Orange | Ready |
| Red | Off (Not active) |
| Blinking Red | Fault condition |
| Green | Continuous device on |
| Blinking Green | Non-continuous device operating |

Process Variable Monitoring 102

The system display screen 100 may allow, for example, up to eight process variables 102 to be monitored at one time. The eight positions are configurable. In other words, the operator may choose which eight process variables he/she wants to monitor and where they should be displayed. Each process variable is displayed in a widget 110 of the following form (see FIG. 11).

To change the process variable displaced in any particular location, the operator may press the button associated with that area. The operator will be provided with a list of valid options. It is possible to display the same process variable in several locations.

Device Buttons

The devices buttons, typically one per device, have several functions attached to them. The buttons will be displayed in the same manner as the equivalent buttons on the Equipment Selected Screen. They are as follows:

Start/Stop a device

Access the operator panel of a device

Indicate the status of a device

Start/Stop a Device

To start a device, press the device or devices you wish to start. Then press the start button.

Operator Panel 120

The access the operator panel 120, first select the device. The press the Panel button.

Device Status

The buttons will be displayed using the color scheme described earlier. This is done so that an operator standing away from the screen 100 will be able to detect a problem without actually walking up to the monitor. An Operator Panel 120 is also shown (see FIG. 12).

The above figure illustrates the format that every operator panel will take. Each row in the matrix will used to: 1) display a changeable device parameter with a button widget 123, 2) display a read only device parameter with a text widget 124, or 3) provide a button to activate a device function 125 (i.e. ABC start washing). The screen 120 will provide space for 6 rows and 5 columns. The scroll bars 121, 122 will be used if there is too much information for the screen to hold.

It is of course understood and will be apparent to those skilled in the art that other and further forms of the invention may be devised without departing from the spirit and scope of the appended claims, it being of course understood that this invention is not to be limited to the specific embodiments shown.

What is claimed is:

1. A system for producing a finished printed product exhibiting print specific conditions by controlling at least one printing press machine and auxiliaries therefor to produce said print specific conditions and form said finished printed product, comprising in combination:

(a) at least one printing press machine and auxiliaries therefor which operate according to machine-specific conditions and having connected thereto (b) means for commanding said at least one printing press machine and said auxiliaries and (c) software means for controlling said at least one printing press machine and said auxiliaries;

(d) said software means comprising (1) a first preset historical database of varied print specific conditions and (2) a second preset historical database of machine specific conditions;

(e) means for introducing a desired set of print specific conditions into said software means and coordinate the same with a set of print specific conditions of said first preset historical database, said software means matching said set of print specific conditions to a set of machine specific conditions of said second preset historical database and to determine from said historical data bases a given set of machine specific conditions necessary to implement said desired set of print specific conditions; and (f) means for relaying said given set of machine specific conditions interposed between said commanding means and said software means and passing said given set of machine specific conditions to said commanding means and to said at least one printing press machine and said auxiliaries to produce a finished printed product exhibiting said desired set of print specific conditions.

2. A system according to claim 1, wherein the means for introducing a desired set of print specific conditions into the software means is a CRT.

3. A system according to claim 2, wherein the CRT is a touch-activated CRT.

4. A system according to claim 2, wherein the CRT is a key-based actuated CRT.

5. A system according to claim 1, including a plurality of printing press machines and auxiliaries therefor.

6. A system according to claim 1, wherein at least one printing press machine and auxiliaries therefor includes at least one ink supply system.

7. A system according to claim 1, wherein said software means further comprises:

a. a communication network portion for allowing said at least one printing press machine and auxiliaries therefor to communicate with said system;

b. a control logic portion for manipulating logic commands associated with said at least one printing press machine and auxiliaries so as to control the same; and c. a screen display portion for generating interactive information displays in cooperation with said means for introducing a desired set of print specific conditions into said communication network portion and said control logic portion.

8. A system according to claim 7, wherein said communication network portion comprises:

a. a linking portion for routing data through said communication network portion; and b. A station portion for each of said at least one printing press machine and auxiliaries which is interfaced with said linking portion so as to facilitate communication between said at least one printing press machine and auxiliaries and said control system.

9. A system according to claim 7, wherein said communication network portion is configured into a plurality of user-definable ring portions, a user-definable number of at least one printing press machine and auxiliaries therefor is operatively connected to one of said plurality of user-definable ring portions.

10. A system according to claim 9, wherein the communication network further comprises a hub portion for routing data between the plurality of user-definable ring portions.

11. A system according to claim 1, wherein said software means further comprises a historical database update means for updating said first preset historical database and said second preset historical database based on said present print specific conditions, said present machine specific conditions, and an input regarding success of said present print specific conditions and present machine specific conditions.

12. A system according to claim 1, wherein said first preset historical database and said second preset historical database undergo a parametric conversion matrix.

13. A system according to claim 7, wherein said screen display portion comprises:

a. an equipment selection means for selecting and deselecting said at least one printing press machine and auxiliaries therefor;

b. a printing parameter means for displaying a parameter of said at least one printing press machine and auxiliaries therefor and for changing a parameter of said at least one printing press machine and auxiliaries therefor;

c. a system display means for monitoring the operation of said at least one printing press machine and auxiliaries therefor; and d. a context sensitive help means for providing information.

14. A system for producing a finished printed product characterized by a set of print specific conditions, and for controlling a plurality of printing machines and auxiliaries to attain said finished printed product, comprising, in combination:

(a) a plurality of printing press machines and auxiliaries therefor, said printing press machines and auxiliaries operating according to corresponding machine-specific conditions;

(b) software control means for controlling said plurality of printing press machines and auxiliaries;

(c) means for introducing a desired set of said print specific conditions into said software control means;

(d) said software control means including a first preset historical database of varied print specific conditions and a second preset historical database of machine specific conditions;

(e) said software control means further including means for comparing said desired set of print specific conditions to said first historical database of varied print specific conditions to determine from said first historical database a given set of machine specific conditions necessary to implement said desired set of print specific conditions;

(f) means for relaying said given set of machine specific conditions to one or more of said plurality of printing press machines and auxiliaries; and (g) means for commanding said one or more printing press machines, and auxiliaries according to said relayed set of given machine specific conditions to produce said finished printed product.

15. A system according to claim 14, wherein said software control means further comprises:

a. a communication network portion for transmitting data from the plurality of printing press machines and auxiliaries to said software control means, and b. a control logic portion for assigning logic commands to said plurality of printing press machines and auxiliaries via said communication network portion so as to manipulate the same according to said desired set of print specific conditions entered into said software control means.

16. A system according to claim 15, wherein said communication network portion further comprises:

a. a linking portion for routing data in said communication network portion; and b. a station portion associated with each of the plurality of printing press machines and auxiliaries which is interfaced with said linking portion to transmit data between said plurality of printing press machines and auxiliaries and said control system.

17. A system according to claim 14, wherein the communication network portion includes a plurality of user-definable ring portions and a user-definable number of the plurality of printing press machines and auxiliaries is interfaced with each of said ring portions.

18. A system as defined in claim 17, wherein the plurality of user-definable ring portions are interfaced via a hub portion for routing data between said plurality of user-definable ring portions.

19. A system according to claim 14, wherein said software means further comprises historical database update means for updating said first preset historical database based on said present print specific conditions, said present machine specific conditions, and an input regard success of said present print specific conditions and said present machine specific conditions.

20. A system according to claim 14, wherein said first present historical database undergoes a parametric conversion matrix.

* * * * *